(12) United States Patent
Amano et al.

(10) Patent No.: US 10,226,399 B2
(45) Date of Patent: Mar. 12, 2019

(54) MEDICINE SORTING APPARATUS

(71) Applicant: YUYAMA MFG. CO., LTD., Toyonaka-shi, Osaka (JP)

(72) Inventors: Hirokazu Amano, Toyonaka (JP); Akitomi Kohama, Toyonaka (JP); Masatoshi Warashina, Toyonaka (JP); Junichi Iwaya, Toyonaka (JP); Hiromichi Tsuda, Toyonaka (JP); Takashi Ueno, Toyonaka (JP); Hidenori Tsuji, Toyonaka (JP); Keigo Nakamura, Toyonaka (JP); Mei Zhang, Toyonaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 0 days.

(21) Appl. No.: 15/310,087

(22) PCT Filed: May 8, 2015

(86) PCT No.: PCT/JP2015/063371
§ 371 (c)(1),
(2) Date: Nov. 9, 2016

(87) PCT Pub. No.: WO2015/170762
PCT Pub. Date: Nov. 12, 2015

(65) Prior Publication Data
US 2017/0246083 A1    Aug. 31, 2017

(30) Foreign Application Priority Data

May 9, 2014  (JP) .................................. 2014-097933
Sep. 25, 2014  (JP) .................................. 2014-195843

(Continued)

(51) Int. Cl.
*A61J 1/06* (2006.01)
*A61J 3/00* (2006.01)
(Continued)

(52) U.S. Cl.
CPC . *A61J 1/06* (2013.01); *A61J 3/00* (2013.01); *G06K 7/10732* (2013.01);
(Continued)

(58) Field of Classification Search
CPC .............. G06F 19/322; G06F 19/3456; G06K 19/06028; G06K 7/1413; G06K 7/10732;
(Continued)

(56) References Cited

U.S. PATENT DOCUMENTS

2007/0185615 A1* 8/2007 Bossi .................. G06F 19/3462
700/244
2009/0294467 A1* 12/2009 Yuyama .................. G07F 11/62
221/8

FOREIGN PATENT DOCUMENTS

JP     2004-345837 A    12/2004
JP     2011-104188 A    6/2011
(Continued)

OTHER PUBLICATIONS

ISA/JP, International Search Report dated Aug. 11, 2015 in International Application No. PCT/JP2015/063371, total 5 pages with English translation.

*Primary Examiner* — Sonji N Johnson
(74) *Attorney, Agent, or Firm* — Masuvalley & Partners

(57) ABSTRACT

An object of the present invention is to automatically identify a direction, a posture and characteristics such as a shape, a size, a type and an expiration date of a medicine and store the medicine with ensuring a high degree of freedom. A medicine supplying apparatus 1 includes an identifying part and a storing part. A storing area is defined at the time
(Continued)

of storing the medicine according to a size of a medicine contained in characteristics of the medicine identified by the identifying part. The medicine is stored in the storing part in a state that identification information of the medicine is associated with the storing area. Further, the medicine supplying apparatus has a determination processing part which can determine whether or not the medicine is a target to be treated based on the characteristics of the medicine identified by the identifying part.

9 Claims, 51 Drawing Sheets

(30) Foreign Application Priority Data

| Sep. 25, 2014 | (JP) | 2014-195845 |
| Sep. 25, 2014 | (JP) | 2014-195846 |
| Nov. 13, 2014 | (JP) | 2014-230991 |

(51) Int. Cl.
*G06K 7/10* (2006.01)
*G06K 7/14* (2006.01)
*G06K 19/06* (2006.01)
*G06Q 10/08* (2012.01)
*G07F 17/00* (2006.01)

(52) U.S. Cl.
CPC ..... *G06K 7/1413* (2013.01); *G06K 19/06028* (2013.01); *G06Q 10/087* (2013.01); *G07F 17/0092* (2013.01); *A61J 2205/10* (2013.01)

(58) Field of Classification Search
CPC .. A61J 1/06; A61J 3/00; A61J 2205/10; G07F 17/0092; G06Q 10/087
See application file for complete search history.

(56) References Cited

FOREIGN PATENT DOCUMENTS

| JP | 2013-148454 A | | 8/2013 |
| JP | 2013-215343 A | | 10/2013 |
| JP | 2013215343 A | * | 10/2013 |
| JP | 2013-226182 A | | 11/2013 |

* cited by examiner

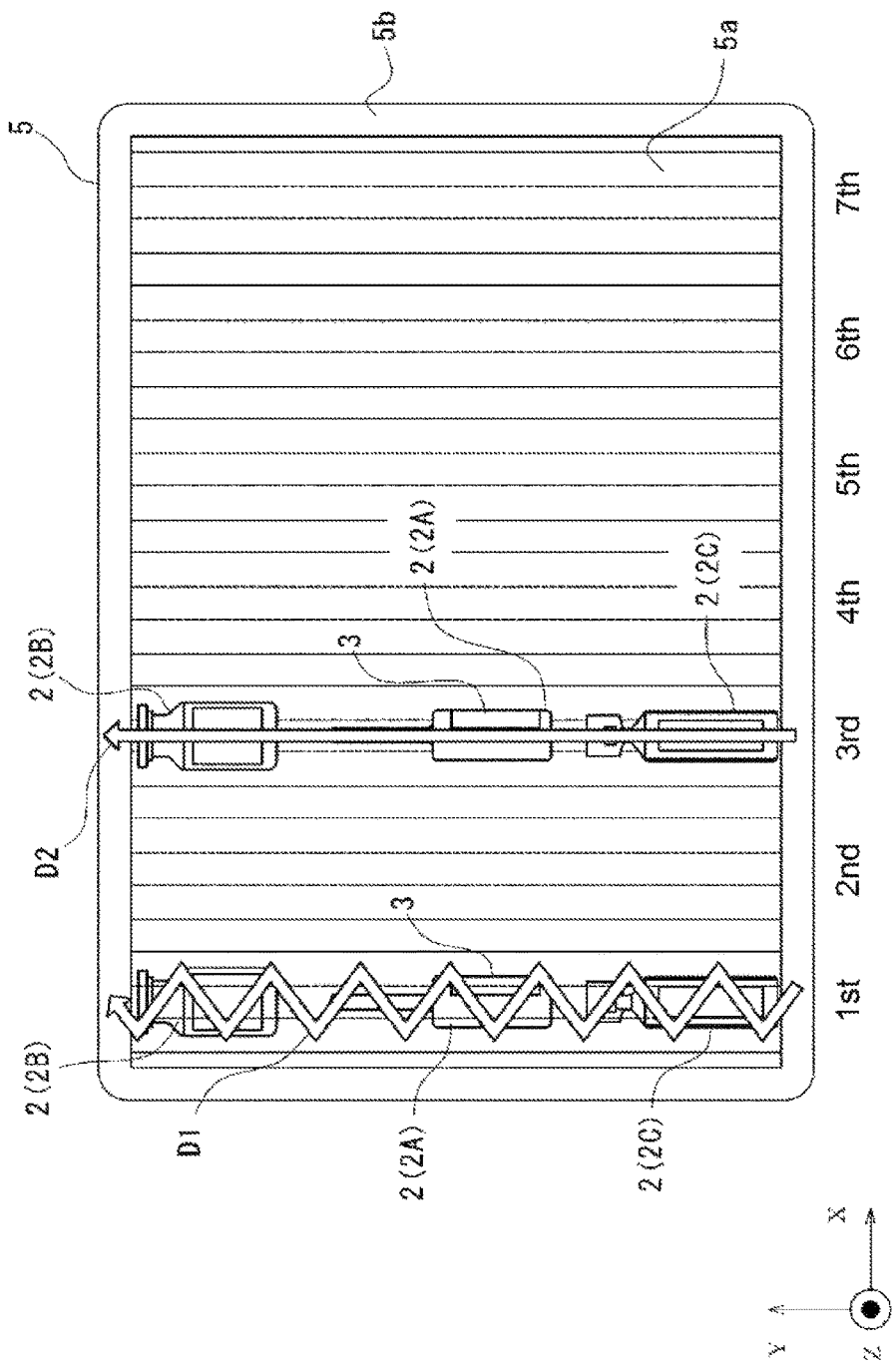

FIG. 37
(Step 1)
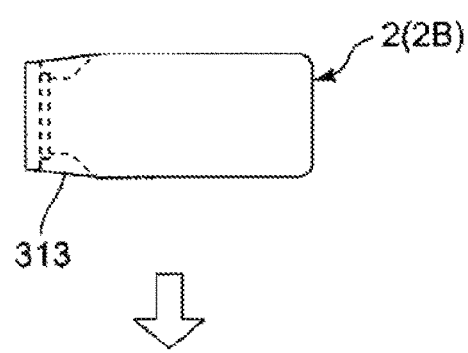
(Step 2)
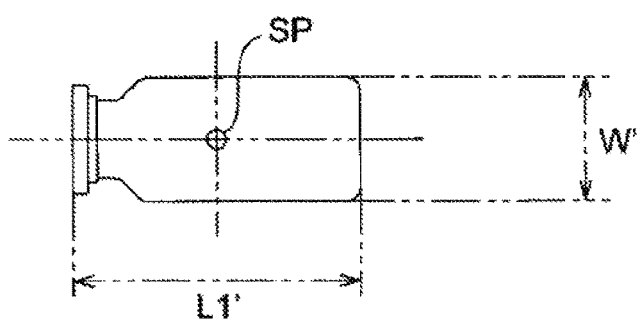

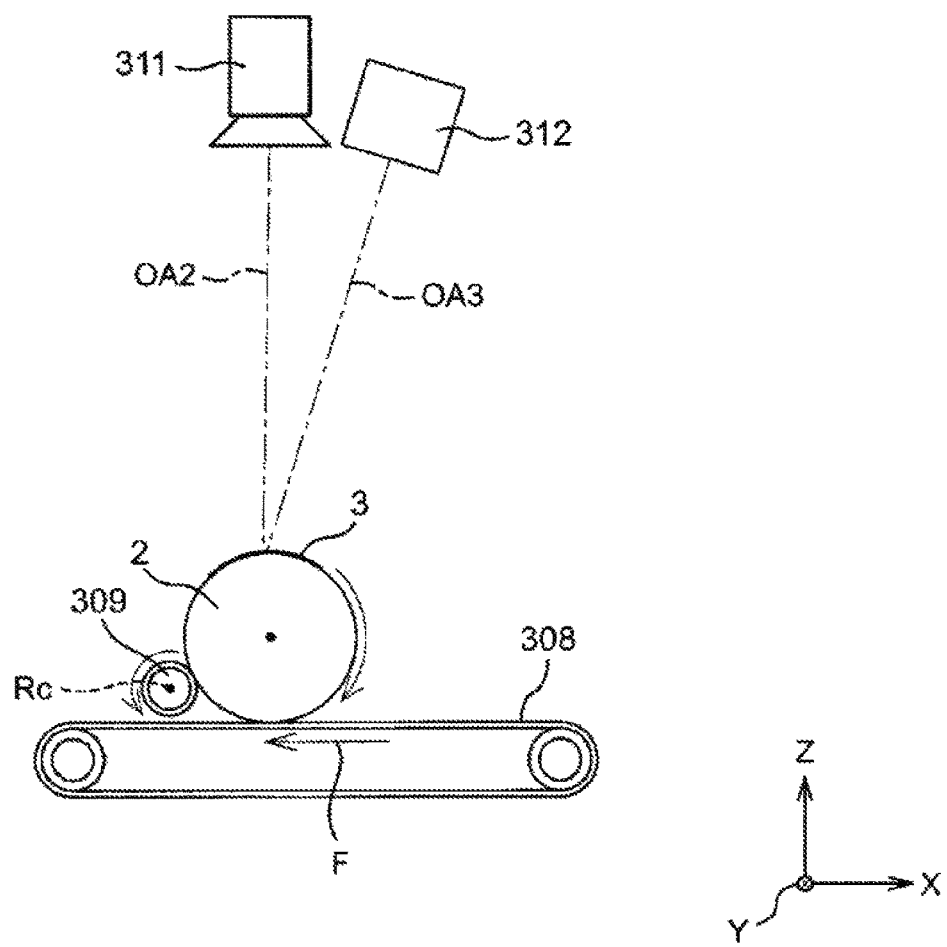

MEDICINE SORTING APPARATUS

RELATED APPLICATIONS

This application is the U.S. National Phase of and claims priority to International Patent Application No. PCT/JP2015/063371, International Filing Date May 8, 2015, entitled Drug Sorting Device; which claims benefit of Japanese Application No. JP2014-097933 filed May 9, 2014; Japanese Application No. JP2014-195843 filed Sep. 25, 2014; Japanese Application No. JP2014-195845 filed Sep. 25, 2014; Japanese Application No. JP2014-195846 filed Sep. 25, 2014; and Japanese Application No. JP2014-230991 filed Nov. 13, 2014; all of which are incorporated herein by reference in their entireties.

TECHNICAL FIELD

The present invention relates to a medicine sorting apparatus.

BACKGROUND ART

There is a case where medicines prescribed to patients are returned to a department for managing medicine prescriptions in a medical institution because of some reasons such as change of prescription (hereinafter, this medicine returned to the medical institution is referred to as a returned medicine). Patent document 1: JP 2013-215343A discloses a returned medicine sorting apparatus for automatically identifying and storing the returned medicine in order to improve efficiency of an operation for treating the returned medicine and prevent human errors in this operation.

SUMMARY OF THE INVENTION

Generally, the returned medicines have different characteristics such as a type, a shape, a size and an expiration date. However, in a conventional returned medicine sorting apparatus such as the returned medicine sorting apparatus disclosed in the patent document 1, any special consideration, such as a consideration for ensuring a high degree of freedom related to factors such as efficiency of a subsequent operation for dispensing the returned medicines, is not given to an operation for storing the returned medicines having the different characteristics. More specifically, any special consideration for ensuring the high degree of freedom to allow the returned medicines to be freely dispensed according to information such as prescription information is not given to the operation for storing the returned medicines having the different characteristics.

Further, the returned medicine sorting apparatus disclosed in the patent document 1 photographs an image of the returned medicine and analyzes a profile shape of the image of the returned medicine to detect a position of the returned medicine. Then, the returned medicine sorting apparatus suctions and transfers the returned medicine based on the detected position to automatically return the returned medicine to a storing place. However, if some returned medicines make contact with each other or some returned medicines are partially overlapped with each other at the time of identifying positions or the like of the returned medicines to be transferred, there is a case where profile shapes of the returned medicines become unclear and the position of each of the returned medicines cannot be accurately detected.

Further, the apparatus disclosed in the patent document 1 includes a returned medicine containing part for storing the returned medicines therein. The returned medicine containing part has a plurality of containing cassettes classified for each type of the returned medicines and the returned medicines are respectively stored into the containing cassettes drawn from the returned medicine containing part. Since the apparatus disclosed in the patent document 1 requires the plurality of containing cassettes for each type of the returned medicines, a large number of containing cassettes are required. Further, a space for drawing each of the containing cassettes from the returned medicine containing part at the time of storing the returned medicines is required. This results in that the returned medicine containing part gets bigger. On the other hand, in a storing part of a conventional ampule dispensing apparatus, a plurality of dedicated cassettes are provided for each type of medicines. For the conventional ampule dispensing apparatus, an operation in which a pharmacist takes the dedicated cassettes from the conventional ampule dispensing apparatus and opens covers of the dedicated cassettes to contain ampules into the dedicated cassettes one by one is performed. Since each cassette needs to have a container, a cover and a discharging mechanism, each cassette gets bigger. In addition, since many types of the cassettes are provided in the conventional ampule dispensing apparatus, the conventional ampule dispensing apparatus gets much bigger.

In view of the foregoing, a first problem to be solved by the present invention is to automatically identify medicines having different characteristics such as a type, a shape, a size and an expiration date and supplied in a non-aligned state and to store the medicines with ensuring a high degree of freedom.

Further, a second problem to be solved by the present invention is to provide a medicine sorting apparatus which can accurately detect a position of each of medicines even if the medicines make contact with each other or the medicines are partially overlapped with each other.

Furthermore, a third problem to be solved by the present invention is to make a storing part, in which medicines are stored in a sorted state, compact.

A first aspect of the present invention for solving the first problem provides a medicine sorting apparatus comprising an identifying part which can identify a direction, a posture and characteristics such as a shape, a size, a type and an expiration date of a medicine; a storing part for storing the medicine so that the medicine can be taken from the storing part by arranging the medicine in the storing part in a state that a storing area defined for the medicine according to at least the size of the medicine identified by the identifying part at the time of storing the medicine is associated with identification information of the medicine; and a determination processing part which can determine whether or not the medicine is a target to be treated based on the characteristics of the medicine identified by the identifying part.

The identifying part identifies the direction, the posture and the characteristics (including the type, the shape, the size, the expiration date and the like) of the medicine. In the storing part, medicines are individually stored in a state that the storing area defined according to at least the size of each of the medicines identified by the identifying part is associated with the identification information of each of the medicines. The medicines stored in the storing part can be individually taken from the storing part. Thus, it is possible to store the medicines with ensuring a high degree of freedom so that the direction, the posture and the characteristics of each of the medicines can be automatically identified and each of the medicines can be freely dispensed according to prescription information and the like Another aspect of the present invention provides a medicine sorting apparatus comprising an identifying part which can identify a direction, a posture and characteristics such as a shape, a size, a type and an expiration date of a medicine. Further, the identifying part includes a photographing part for photographing the medicine; a first medicine information obtaining part for obtaining information on the shape and the size of the medicine based on an image photographed by the photographing part; a label reading part for reading a label of the medicine; and a second medicine information obtaining part for obtaining information on the type and the expiration date of the medicine based on a reading result of the label reading part. The medicine sorting apparatus further comprises a medicine conveying part for conveying the medicine from the photographing part to the label reading part when the shape and the size of the medicine obtained by the first medicine information obtaining part are a shape and a size of a medicine to be treated.

A second aspect of the present invention for solving the second problem is a medicine sorting apparatus comprising an identifying part including a photographing part for photographing each of medicines, a binarization processing part for performing a binarization process on an image photographed by the photographing part to create a binarized image, and an identification processing part having a first identification processing function of identifying at least a direction of each of the medicines based on the binarized image; and a storing part for storing the medicines so that each of the medicines can be taken from the storing part by arranging the medicines in the storing part in a state that a storing area defined for each of the medicines at the time of storing the medicines is associated with identification information of each of the medicines. Further, the medicine sorting apparatus treats each of the medicines identified by the first identification processing function as a storing target medicine.

The identification processing part further has a second identification processing function of identifying a posture and characteristics such as a shape and a size of each of the medicines based on the binarized image created from the image photographed by the photographing part. Further, the storing part may store the medicines so that each of the medicines can be taken from the storing part by arranging the medicines in the storing part in a state that the storing area defined for each of the medicines according to at least the size identified by the second identification processing function at the time of storing the medicines is associated with the identification information of each of the medicines.

According to this medicine sorting apparatus, since positions and the like of the medicines are detected based on a plurality of binarized images whose threshold values are changed in a phased manner, it is possible to accurately detect a position of one medicine even if the medicines make contact with each other or the medicines are partially overlapped with each other. A container for the medicine generally has a substantially columnar shape and the container is in a lying posture at the time of detecting the position. When the lying medicine is illuminated with light from the upper side, a higher portion of the laying columnar shape has a higher luminance value. Thus, in a binarized image of a planar view, an elongated reflecting area (reflecting area) is formed at the higher portion of the columnar shape depending on a threshold value of a binarization process. By detecting the position and the like based on this reflecting area, it is possible to accurately detect the position of one medicine even if a profile shape of the one medicine is unclear such as the case where the medicines make contact with each other or the medicines are overlapped with each other.

A third aspect of the present invention for solving the third problem provides a medicine sorting apparatus comprising an identifying part which can identify a direction, a posture and characteristics such as a shape, a size, a type and an expiration date of each of medicines; a storing part having a plurality of containers arranged in multiple stages, the containers being capable of storing the medicines so that each of the medicines can be taken from each of the containers; a transferring part for transferring one of the medicines to one of the containers through a gap between the containers arranged in the multiple stages; and an operation control part which can control the storing part and the transferring part to perform a storing operation for associating a storing area in which the one of the medicines is to be stored with identification information of each of the medicines to transfer the one of the medicines from the identifying part to the one of the containers in which the storing area has been defined and store the one of the medicines in the one of the containers and a dispensing operation for dispensing the one of the medicines from the storing part based on a prescription instruction.

Preferably, the operation control part defines the storing area in the one of the containers according to at least the size of the one of the medicines identified by the identifying part.

Preferably, the storing part further includes a gap forming mechanism for forming the gap, the containers are arranged in the multiple stages in a vertical direction, and the gap forming mechanism provides the gap in the vertical direction.

According to the medicine sorting apparatus, it is possible to allow the gap forming mechanism to provide the gap between the plurality of containers arranged in the multiple stages in the vertical direction in the storing part. Further, since it is also possible to transfer a returned medicine to one of the containers through the gap, it becomes unnecessary to draw the one of the containers. Thus, the storing part does not require a space for drawing the containers.

Further, since it is possible to store the medicine on the container in a state that the storing area in which the medicine is to be stored is associated with the type of the medicine, it is possible to store a variety of medicines on each container. With this configuration, there is no need to prepare containers corresponding to each type of medicines and it is possible to suppress the number of required containers from increasing. In addition, in the present apparatus, since the transferring part takes the medicines into and from the containers, the container does not require a cover and a discharging mechanism. Further, by arranging the containers in the multiple stages, an upper container serves as a cover of a lower adjacent container. Thus, it is possible to construct each of the containers so that a height of each of the containers corresponds to a height of the medicine in a radial direction thereof. Thus, it is possible to make the storing part compact.

Further, another aspect of the present invention provides provides a medicine sorting apparatus comprising an identifying part which can identify a direction, a posture and characteristics such as a shape, a size, a type and an expiration date of each of medicines and has a first barcode reader; a storing part having a plurality of containers arranged in multiple stages, the containers being capable of storing the medicines so that each of the medicines can be taken from each of the containers; a transferring part which can transfer one of the medicines to one of the containers through a gap between the containers arranged in the multiple stages and has a second barcode reader; and an operation control part which can control the identifying part, the storing part and the transferring part to decide the one of the medicines to be dispensed from information on a medicine type, a storing area and an expiration date associated with each of the medicines stored in the containers based on prescription information and perform a dispensing operation for dispensing the one of the medicines when medicine type information of the one of the medicines to be dispensed which is obtained by the first barcode reader or the second barcode reader matches medicine type information based on the prescription information.

Preferably, the operation control part decides one of the medicines whose expiration date is earliest among the medicines to be dispensed as the one of the medicines to be dispensed based on the prescription information.

According to the medicine sorting apparatus, by collating a barcode of the medicine to be dispensed at the time of dispensing the medicine based on the prescription information, it is possible to perform the dispensing operation without making mistakes. Further, since the medicine sorting apparatus dispenses the medicine whose expiration date is earliest among the medicines to be dispensed, it is possible to efficiently perform the dispensing operation.

EFFECT OF THE INVENTION

According to the first aspect of the present invention, it is possible to automatically identify the direction, the posture and the characteristics such as the shape, the size, the type and the expiration date of the medicine to store the medicine with ensuring the high degree of freedom so that the medicine can be freely dispensed according to the prescription information and the like.

Further, according to the second aspect of the present invention, since the position and the like of the one of the medicines are detected based on the plurality of binarized images whose threshold values are changed, it is possible to accurately detect the position of the one medicine even if the medicines make contact with each other or the medicines are partially overlapped with each other.

Furthermore, according to the third aspect of the present invention, it is possible to make the storing part, in which the medicines are stored in the sorted state, compact. In addition, this enables an operator to store the medicines without taking account of information such as the medicine type and the expiration date required for managing the medicines.

BRIEF DESCRIPTION OF THE DRAWINGS

FIG. 27 is a view showing a scanning operation for the storing tray by the scalar type robot.

FIG. 37 is a schematic view showing a method for deciding the suctioning position in the case where a degree of convexity is low.

FIG. 44 is a front view of the label reading part.

Figure 1:
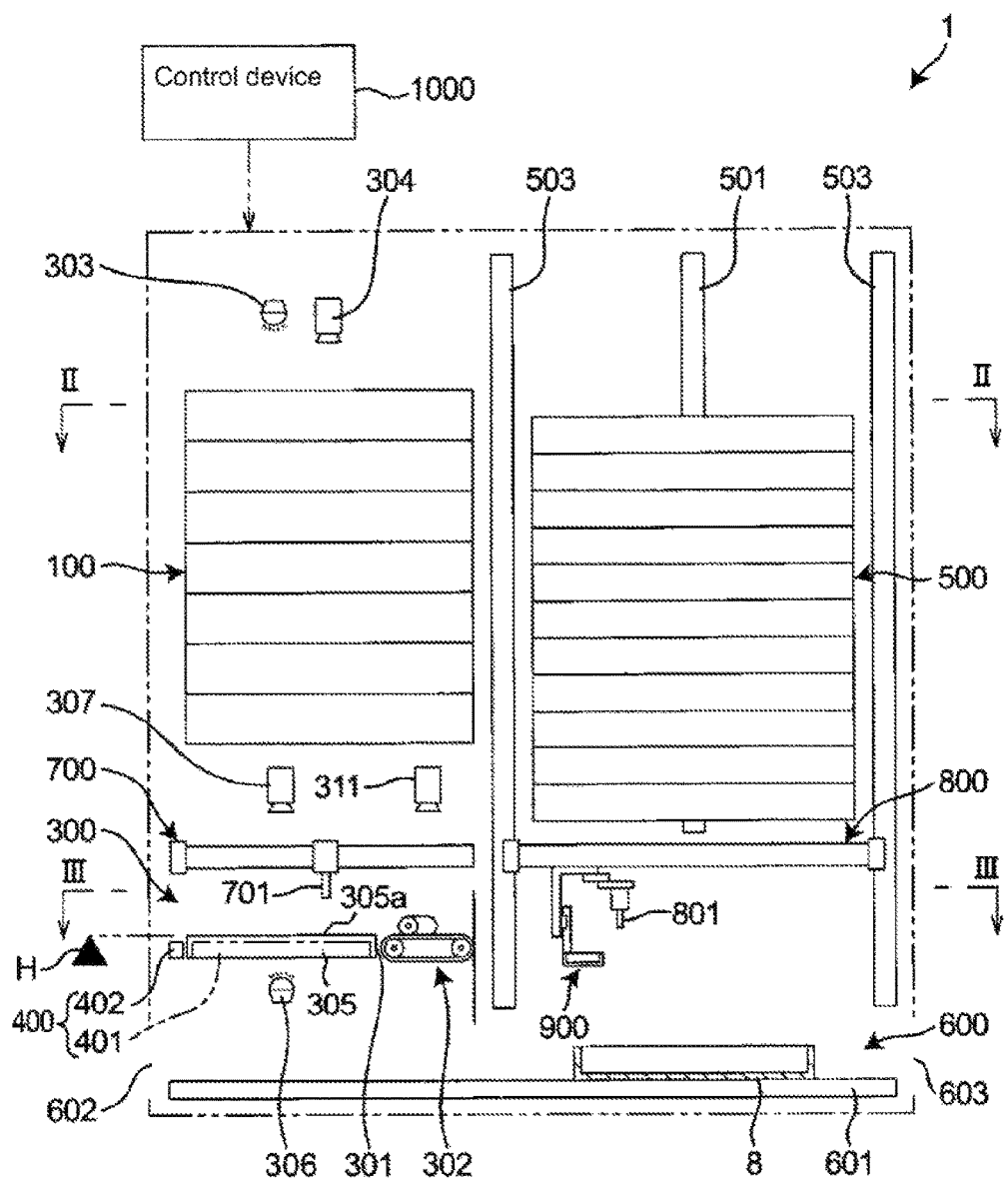
FIG. 1 is a schematic front view of a returned medicine dispensing apparatus according to an embodiment of the present invention.

DETAILED DESCRIPTION OF THE PREFERRED EMBODIMENTS (Summary of Apparatus)

Hereinafter, description will be given to one embodiment of the present invention with referring to a returned medicine supplying apparatus 1 for sorting and storing returned medicines as one example. Each of FIGS. 1 to 6 shows the returned medicine supplying apparatus (medicine sorting apparatus) 1 according to the embodiment of the present invention. The returned medicine supplying apparatus 1 includes a receiving part 100, an elevating part 200, an identifying part 300, a non-stored medicine arrangement part 400, a storing part 500 and a dispensing part 600. The returned medicine supplying apparatus 1 further includes an orthogonal type robot 700, a scalar type robot 800 and a support tray 900 (a transfer container). Furthermore, the returned medicine supplying apparatus 1 includes a control device 1000 schematically shown in FIG. 1. The control device 1000 totally controls an operation of the returned medicine supplying apparatus 1 based on an input from a control panel 1001 (which includes a display 1002) illustrated in FIG. 4, an input from a sensor or a camera or the like.

Summary of a main function of the returned medicine supplying apparatus 1 is described as follows. The returned medicine supplying apparatus 1 identifies characteristics such as a shape, a size (a length L1 and a diameter or a width W1), a type and an expiration date of each of returned medicines 2 such as an ampule 2A, a vial 2B and a resin ampule 2C (see FIG. 8). In this embodiment, a label 3 on which a barcode or literal information containing information on the type, the expiration date and the like is printed adheres to each of the returned medicines 2. The returned medicine supplying apparatus 1 reads these information displayed on the label 3. Further, the returned medicine supplying apparatus 1 associates the identified returned medicine 2 with identification information of this returned medicine 2 (the identification information is unique information added to each of the returned medicines 2) to temporarily store the identified returned medicine 2 and dispense the identified returned medicine 2 based on prescription data (received from a host system (HIS: Hospital Information System) which is, for example, an electronic health record system). When the returned medicine 2 is stored, a storing area is defined according to the size of the returned medicine 2 to be stored. To store the returned medicine 2 is performed so that the returned medicine 2 is stored in the defined storing area and each of the returned medicines 2 can be taken from at the time of dispensing each of the returned medicines 2. Further, the returned medicine supplying apparatus 1 discharges one or more of the returned medicines 2 whose expiration dates have expired.

Figure 8:
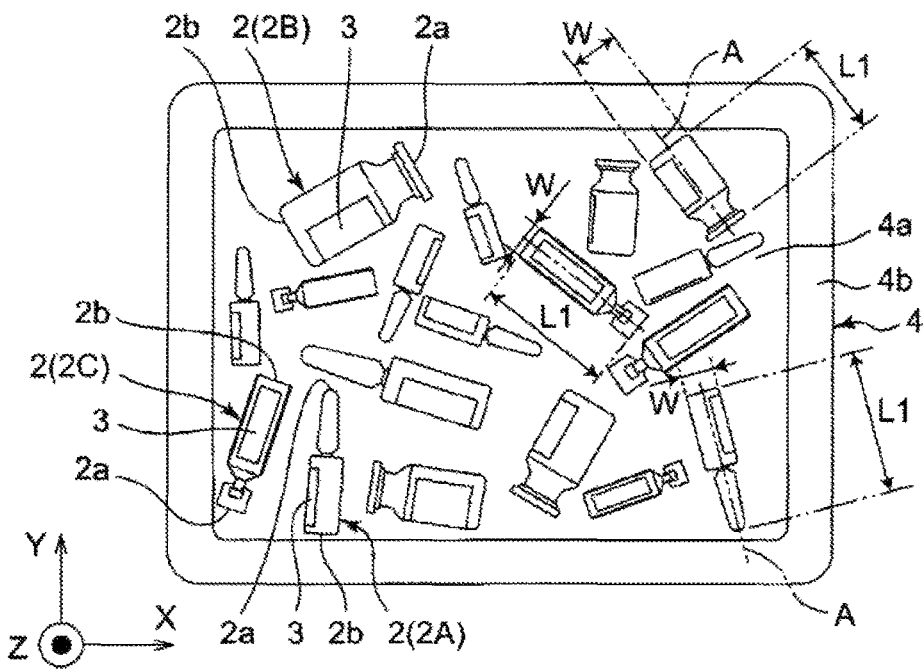
FIG. 8 is a schematic planar view of a returned goods tray.

Here, the word of "medicine" used in the specification means a medicine contained in a container as shown in FIG. 8. Thus, the language of "the shape and the size of the medicine" means a shape and a size of the container and the language of "information on the type, the expiration date and the like of the medicine" means information on a type, an expiration date and the like of the medicine contained in the container. Actually, words of "validated date" are often used instead of the words of "expiration date". However, these words are substantially synonymous. Thus, in this specification, the words of "validated date" are not used and only the words of "expiration date" are used in order to avoid confusion.

(Receiving Part)

Figure 2:
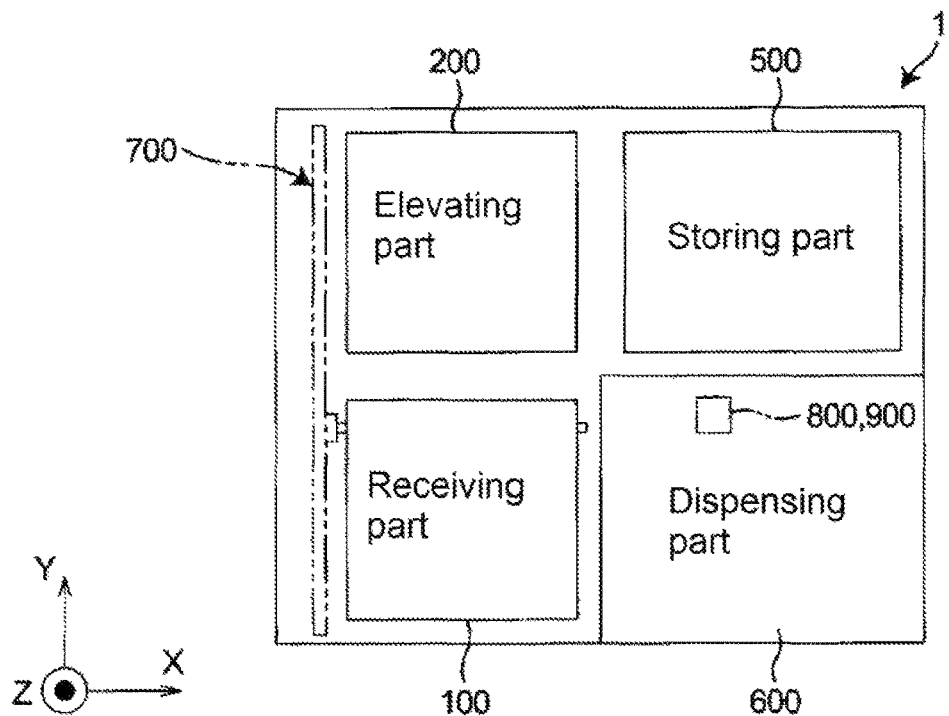
FIG. 2 is a schematic view showing a layout of the returned medicine dispensing apparatus taken from II-II line in FIG. 1.
Figure 3:
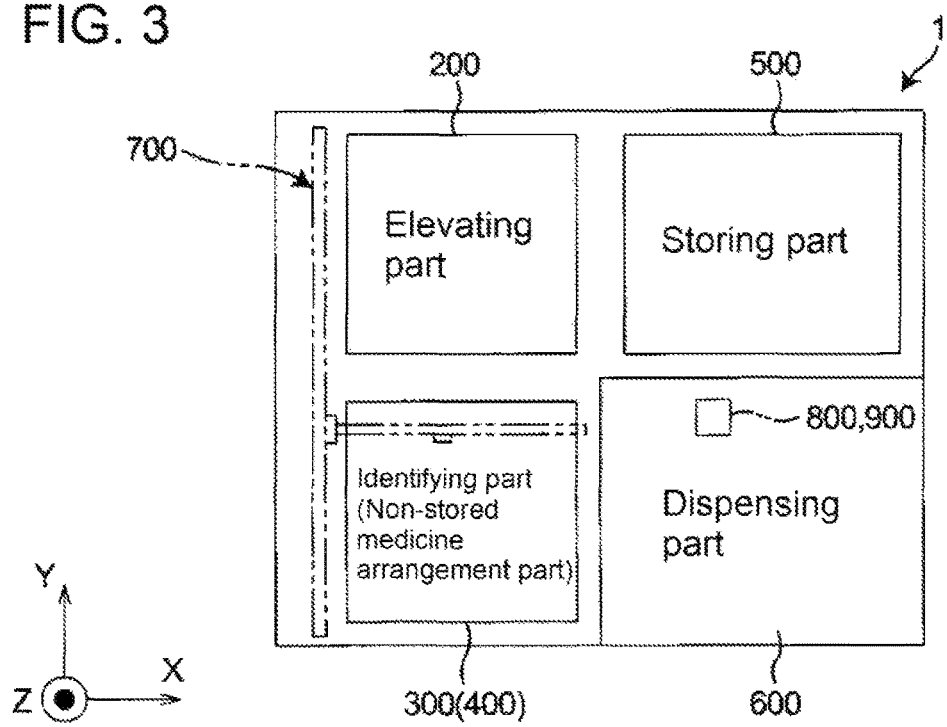
FIG. 3 is a schematic view showing the layout of the returned medicine dispensing apparatus taken from line in FIG. 1.

As shown in FIGS. 1 to 3, the receiving part 100 is arranged on the left upper and front side when the returned medicine supplying apparatus 1 is viewed from the front side.

Figure 7:
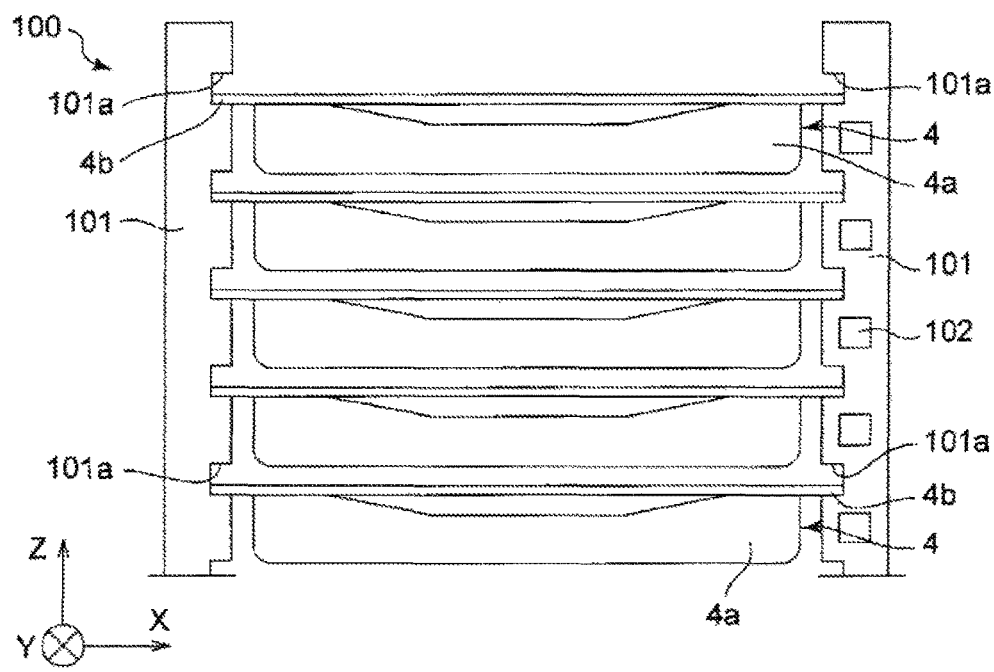
FIG. 7 is a schematic front view of a receiving part.

Referring to FIGS. 1 to 3 together with FIG. 7, the receiving part 100 includes fixed rack members 101 arranged so as to face each other in the horizontal direction (the X direction in the drawings). A plurality of pairs of rail grooves 101a, 101a for holding a plurality of returned goods trays (receiving containers) 4 in a state that the plurality of returned goods trays 4 are arranged in multiple stages are formed on the rack members 101.

Figure 9:
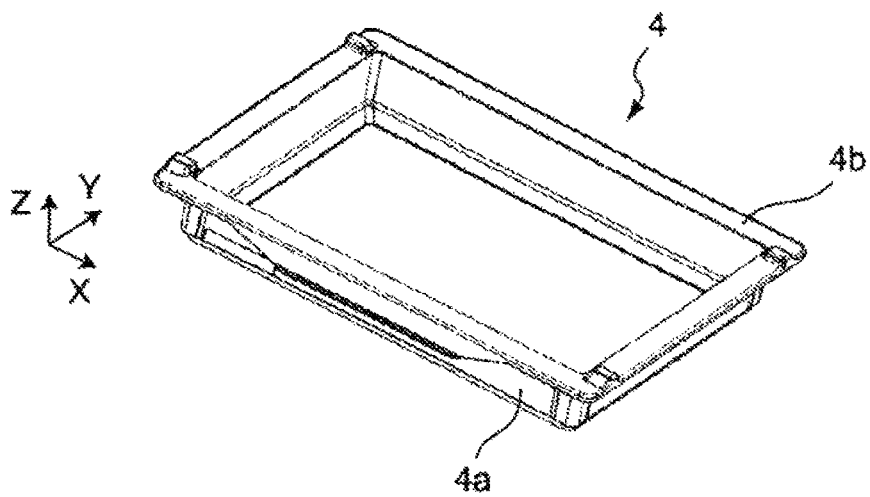
FIG. 9 is a perspective view of the returned goods tray.

Referring to FIGS. 8 and 9, the returned goods tray 4 includes a tray main body 4a opening toward the upper side in the drawing and a flange portion 4b provided on an upper end of the tray main body 4a. As shown in FIG. 8, the returned medicines 2 (for example, the ampule 2A, the vial 2B and the resin ampule 2C) contained in the returned goods tray 4 have different characteristics such as the shape, the size (the length L1 and the width W), the type and the expiration date. Further, directions and postures of the returned medicines 2 contained in the returned goods tray 4 are not aligned, thus the directions and the postures of the returned medicines 2 are different from each other. Namely, the returned medicines 2 contained in the returned goods tray 4 are in a non-aligned state. Here, the direction of each of the returned medicine 2 means a direction in which a longitudinal direction of the returned medicine 2 (an axial line A of the returned medicine 2) in the X-Y plane in the drawing extends. The language of "the direction of the returned medicine 2" often contains a direction in which a tip end 2a and a base end 2b of the returned medicine 2 are directed in addition to the direction in which the axial direction A of the returned medicine extends. However, the characteristics such as the shape, the size, the type and the expiration date of each of the returned medicines 2 contained in the returned goods tray 4 may be unified. Further, the directions and the postures of the returned medicines 2 contained in the returned goods tray 4 may be aligned. The returned medicines 2 in the returned goods tray 4 may be partially overlapped with each other.

As shown in FIG. 7, the flange portion 4b of the returned goods tray 4 is supported by the rail grooves 101a, 101a respectively formed on the rack members 101. Each of the rail grooves 101a, 101a is formed so as to pass through from a front side end to a rear side end of each of the rack members 101 in the Y direction in the drawing of the rack members 101. Thus, an operator such as a medical staff can take the returned goods tray 4 into and from the rail grooves 101a, 101a from the front side of the returned medicine supplying apparatus 1. Further, the elevating part 200 described below can take the returned goods tray 4 into and from the rail grooves 101a, 101a from the rear side of the returned medicine supplying apparatus 1.

The receiving part 100 includes operation preparation buttons 102 provided on the rack member 101 on the right side in FIG. 7. Each of the operation preparation buttons 102 is provided for each of the returned goods trays 4 to be placed. When the operator pushes down the operation preparation button 102 corresponding to the returned goods tray 4 after placing the returned goods tray 4 into the receiving part 100, the control device 1000 allows the elevating part 200 to be in a state that the elevating part 200 can draw the returned goods tray 4 corresponding to the pushed operation preparation button 102. Namely, even if the operator places the returned goods tray 4 into the receiving part 100, the elevating part 200 does not transfer the corresponding returned goods tray 4 from the receiving part 100 until the operation preparation button 102 is pushed down. Alternatively, it may be possible to provide a sensor for automatically sensing that the returned goods tray 4 is placed into the receiving part 100. This sensor may be a weight sensor, for example. With this configuration, the control device 1000 can allow the elevating part 200 to start to an operation for drawing the returned goods tray 4 based on an output from the sensor.

(Elevating Part)

As shown in FIGS. 1 to 3, the elevating part 200 is arranged on the left rear side when the returned medicine supplying apparatus 1 is viewed from the front side.

Figure 10:
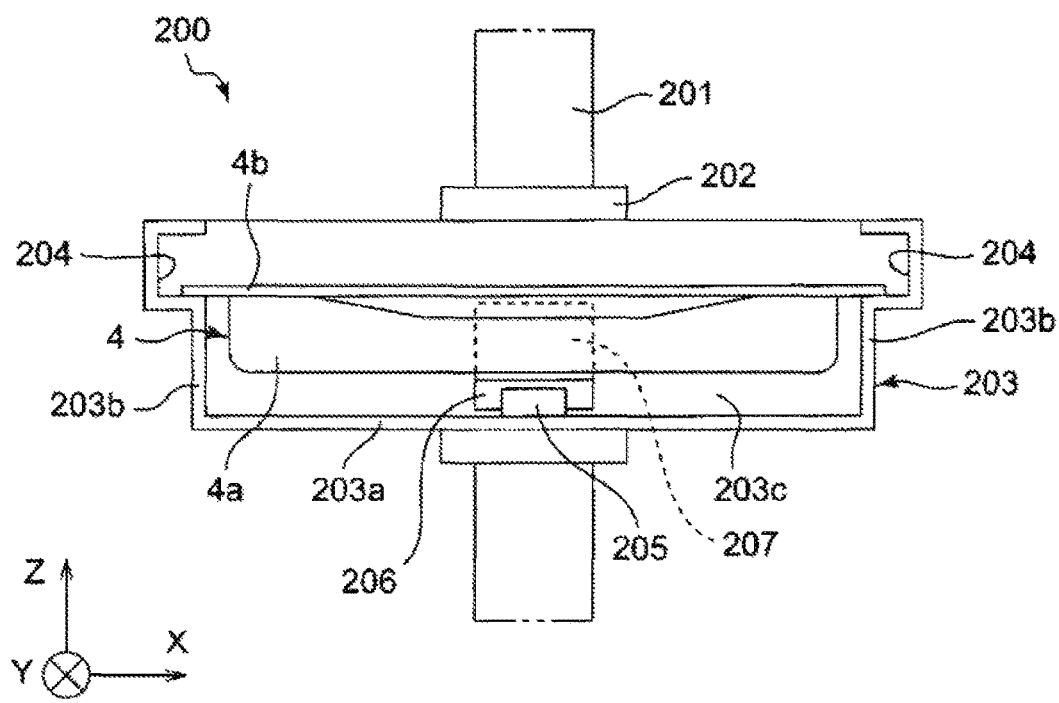
FIG. 10 is a schematic front view of an elevating part.

Referring to FIGS. 1 to 3 together with FIG. 10, the elevating part 200 includes a fixed linear motion guide 201 extending in the Z direction, a carriage 202 elevating along the linear motion guide 201 and a table 203 mounted on the carriage 202. The table 203 includes a bottom portion 203a, lateral portions 203b, 203b respectively provided on the right side and the left side of the bottom portion 203a and an end portion 203c provided on the rear side of the bottom portion 203a (the rear side of the Y direction). The table 203 opens toward the front side (the front side of the Y direction). Rail grooves 204, 204 are respectively formed on the lateral portions 203b, 203b. The flange portion 4b of the returned goods tray 4 is supported by the rail grooves 204, 204. This makes it possible to hold the returned goods tray 4 in the table 230.

Keeping referring to FIG. 10, a fixed linear motion guide 205 extending in the depth direction of the returned medicine supplying apparatus 1 (the Y direction) is provided on the bottom portion 203a. Further, a base end of a hook 207 is fixed to a carriage 206 which can horizontally move along this linear motion guide 205.

The elevating part 200 can take one of the returned goods trays 4 from the receiving part 100 to move the one returned goods tray 4 down to a height position (schematically represented by a symbol H in FIG. 1) same as a height position of the identifying part 300 described below (this operation is referred to as a returned goods tray taking operation). Further, the elevating part 200 can return the one returned goods tray 4 from the height position H same as the height position of the identifying part 300 into the receiving part 100 (this operation is referred to as a returned goods tray returning operation).

Description will be given to the returned goods tray taking operation. First, the table 203 (carriage 202) is moved up to a position slightly lower than the rail grooves 101a, 101a of the receiving part 100 in which the returned goods tray 4 to be taken is held. Next, the hook 207 (carriage 206) is moved toward the front side (the front side of the Y direction) from the side of the end portion 203c of the table 203. Subsequently, the table 203 is slightly moved up. As a result, the hook 207 is moved into a space between the flange portion 4b of the returned goods tray 4 (a portion on the rear side in the drawings) and the tray main body 4a. Then, the hook 207 is moved back toward the rear side (the rear side of the Y direction) so that the hook 207 is moved toward the side of the end portion 203c of the table 203. Due to this backing movement of the hook 2007, the flange portion 4b is pulled into the rail grooves 204, 204 to transfer and place the returned goods tray 4 from the receiving part 100 onto the table 203. Finally, the table 203 (carriage 202) is moved down to the position represented by the symbol H (in FIG. 1).

Description will be given to the returned goods tray returning operation. First, the table 203 (carriage 202) is moved up from the position represented by the symbol H to a height corresponding to the rail grooves 101a, 101a (which have not held the returned goods tray 4) in which the returned goods tray 4 is to be returned. Next, the hook 207 (carriage 206) is then moved toward the front side (the front side of the Y direction) from the side of the end portion 203c of the table 203. As a result, the flange portion 4b of the returned goods tray 4 pushed by the hook 207 is moved out of the rail grooves 204, 204 and moved into the rail grooves 101a, 101a of the receiving part 100. Then, the table 203 is slightly moved down. Due to this movement of the table 203, the hook 207 is downwardly moved out of the space between the flange portion 4b of the returned goods tray 4 (the portion on the rear side in the drawings) and the tray main body 4a. Finally, the hook 207 is moved back toward the rear side so that the hook 207 is moved toward the side of the end portion 203c of the table 203.

(Orthogonal Type Robot)

Figure 11:
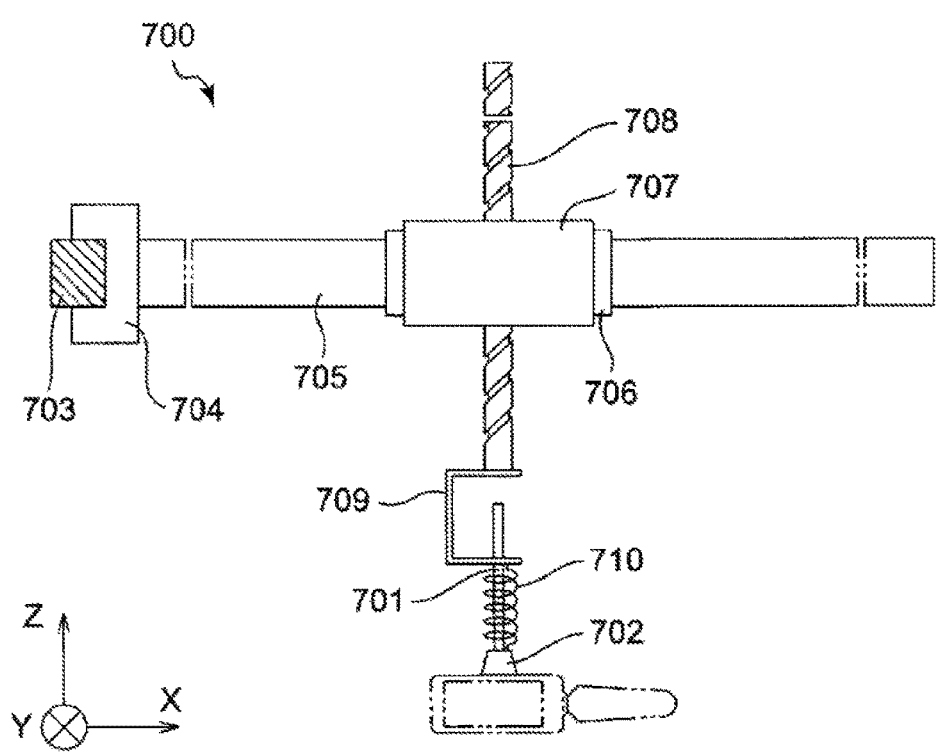
FIG. 11 is a schematic front view of an orthogonal type robot.
Figure 12A:
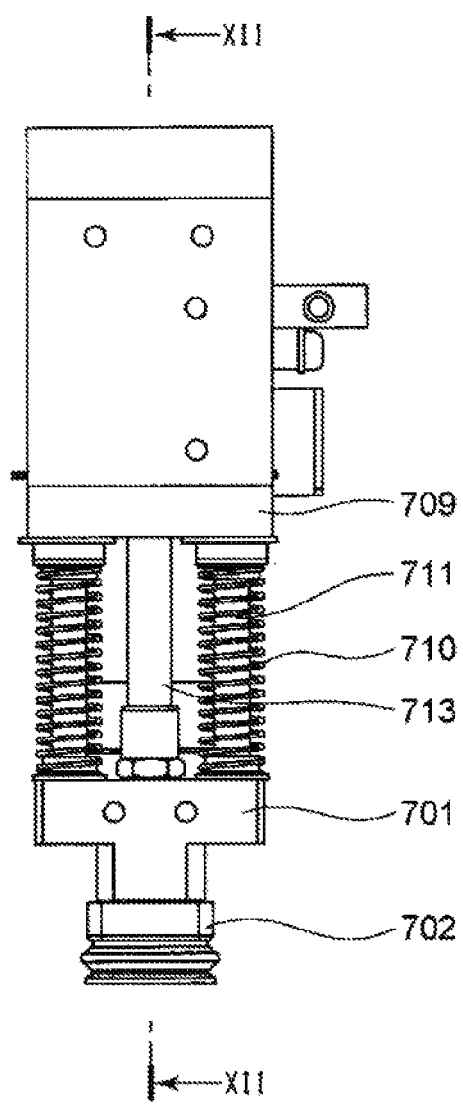
FIG. 12A is a front view showing a part of the orthogonal type robot.
Figure 12B:
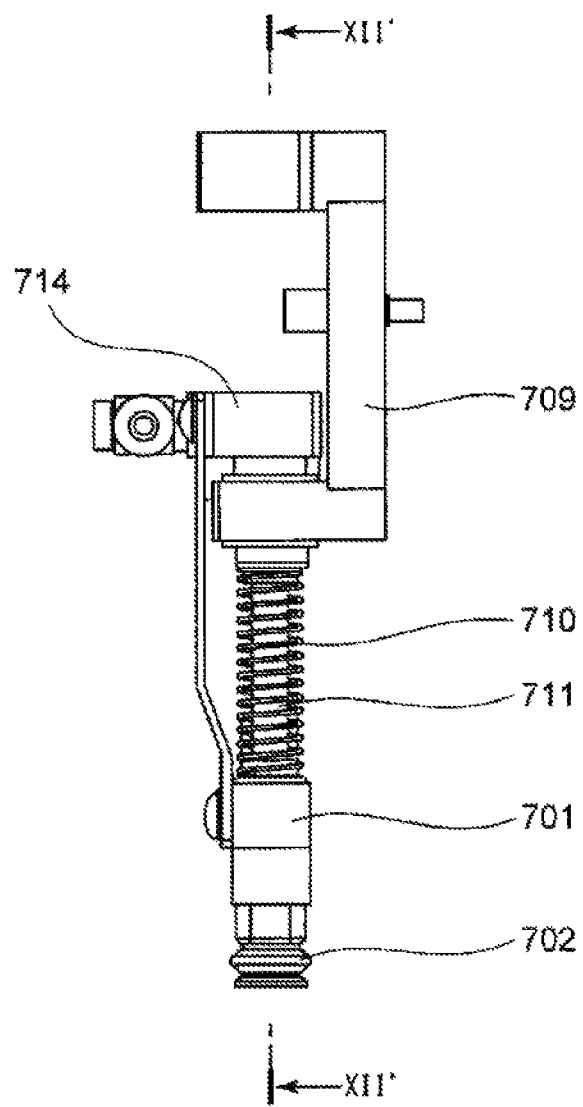
FIG. 12B is a side view showing a part of the orthogonal type robot.
Figure 12C:
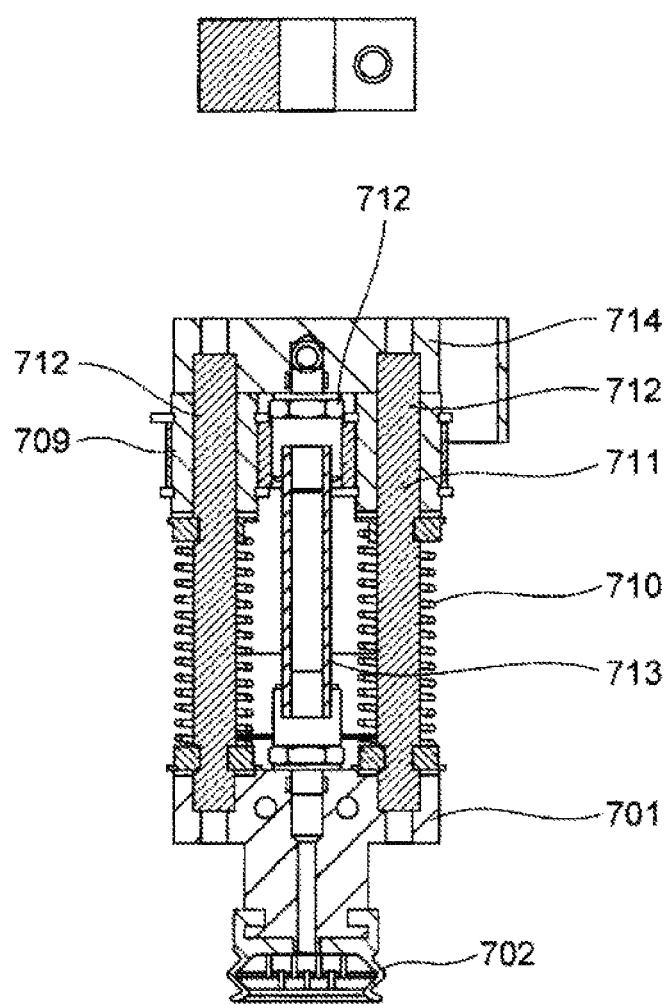
FIG. 12C is a cross-sectional view taken from XII'-XII' line in FIG. 12B.
Figure 12D:
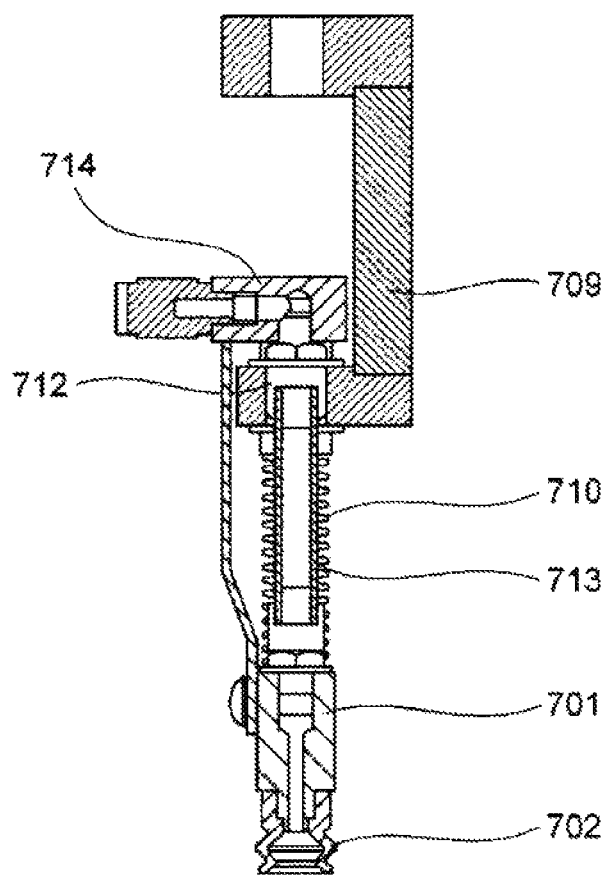
FIG. 12D is a cross-sectional view taken from XII-XII line in FIG. 12A.

Referring to FIGS. 11 to 12D, the orthogonal type robot 700 (a first picking part) includes a suctioning nozzle 701 for suctioning the returned medicine 2 with vacuum supplied from a vacuum source (not shown in the drawings) through a suctioning pipe 713 (see FIGS. 12A to 12D) so that the returned medicine 2 can be released. A suctioning pad 702 made from rubber is attached to a tip end of the suctioning nozzle 701. Referring to FIGS. 1 to 3 together with FIG. 11 to FIG. 12D, the orthogonal type robot 700 is configured so that a range in which the suctioning nozzle 701 can suction and hold the returned medicine 2 or release the suctioned and held returned medicine 2 by releasing the suctioning contains an entire range of the elevating part 200 (the returned goods tray 4 positioned at the described height position H), the identifying part 300 and the non-stored medicine arrangement part 400.

The orthogonal type robot 700 (suctioning nozzle 701) can suction and hold the returned medicine 2 to take the returned medicine 2 from the returned goods tray 4 held by the table 203 of the elevating part 200 (positioned at the height position H) and transfer the returned medicine 2 to an after-mentioned temporarily placing part (a first identifying part) 301 included in the identifying part 300. Further, the orthogonal type robot 700 can suction and hold the returned medicine 2 to take the returned medicine 2 from the temporarily placing part 301 and transfer the returned medicine 2 to an after-mentioned label reading part (a second identifying part) 302 included in the identifying part 300. Furthermore, the orthogonal type robot 700 can suction and hold the returned medicine 2 to take the returned medicine 2 from the label reading part 302 and transfer the returned medicine 2 to the non-stored medicine arrangement part 400.

The orthogonal type robot 700 includes a fixed Y-axis beam 703 extending in the depth direction of the returned medicine supplying apparatus 1 (the Y direction) on the lower side than the receiving part 100 and a carriage 704 which can move along this Y-axis beam 703. An X-axis beam 705 extending in the width direction of the returned medicine supplying apparatus 1 (the X direction) is fixed to the carriage 704. Further, a carriage 706 which can move on the X-axis beam 705 is provided and a head 707 is mounted on this carriage 706. An elevating rod 708 which can elevate due to a ball screw mechanism is provided at the head 707. When the elevating rod 708 rotates around the Z axis, the suctioning nozzle 701 can also rotate around the Z axis.

Referring to FIGS. 12A to 12D, two springs 710 are intervened between a bracket 709 and the suctioning nozzle 701 and two axial rods 711 are respectively arranged in centers of the springs 710. Three thorough-holes 712 are formed in a lower end of the bracket 709 so as to be arranged side by side. The two axial rods 711 are arranged so that the two axial rods 711 respectively pass through two of the three through-holes 712 provided on both sides and can be slidably moved with respect to the bracket 709. The suctioning pipe 713 is arranged so that the suctioning pipe 713 passes through central one of the three through-holes 712 and can be slidably moved with respect to the bracket 709 in the same manner as the axial rods 711. A locking plate 714 is arranged on the upper side of these three through-holes 712. Lower ends of the two axial rods 711 are fixed to the suctioning nozzle 701 and upper ends of the axial rods 711 are fixed to the locking plate 714. Whit this configuration, the suctioning nozzle 701 can be elastically moved up with respective to the bracket 709.

A terminal side portion (a lower side portion in the drawing) of the suctioning pipe 713 extends so as to pass through the suctioning nozzle 701 and opens in the suctioning pad 702. A base side portion (an upper side portion in the drawings) of the suctioning pipe 713 is communicated with the vacuum source (not shown in the drawings). Thus, it is possible to suction (suck) a target provided below the suctioning pad 702. Further, a pressure sensor (not shown in the drawings) for measuring pressure inside the suctioning nozzle 701 is provided at the orthogonal type robot 700. Furthermore, a position sensor (not shown in the drawings) for detecting a relative height position (a position in the Z direction) of the suctioning nozzle 701 with respect to the bracket 709 is mounted on the carriage 706.

The returned medicine 2 suctioned and held by the suctioning nozzle 701 can be moved in the X direction by the linear motion of the carriage 706, in the Y direction by the linear motion of the carriage 704 and in the Z direction by the elevating of the elevating rod 708. Further, the returned medicine 2 suctioned and held by the suctioning nozzle 701 can be rotated around an axial line of the suctioning nozzle 701 (the Z axis) by the rotation of the elevating rod 708 around the Z axis.

(Identifying Part and Non-Stored Medicine Arrangement Part)

Referring to FIGS. 1 to 3, the identifying part 300 includes a lighting part 303 and a camera 304 (a first photographing part). The lighting part 303 and the camera 304 are positioned on the upper side of the elevating part 200. Further, the identifying part 300 includes the temporarily placing part 301 constituting one example of the first identifying part of the present invention in cooperation with the camera 304 and the label reading part (one example of the second identifying part of the present invention) 302. The temporarily placing part 301 and the label reading part 302 (a label reading device) are arranged on the left lower and front side when the returned medicine supplying apparatus 1 is viewed from the front side. Further, the temporarily placing part 301 and the label reading part 302 are positioned on the lower side of the receiving part 100.

Figure 13:
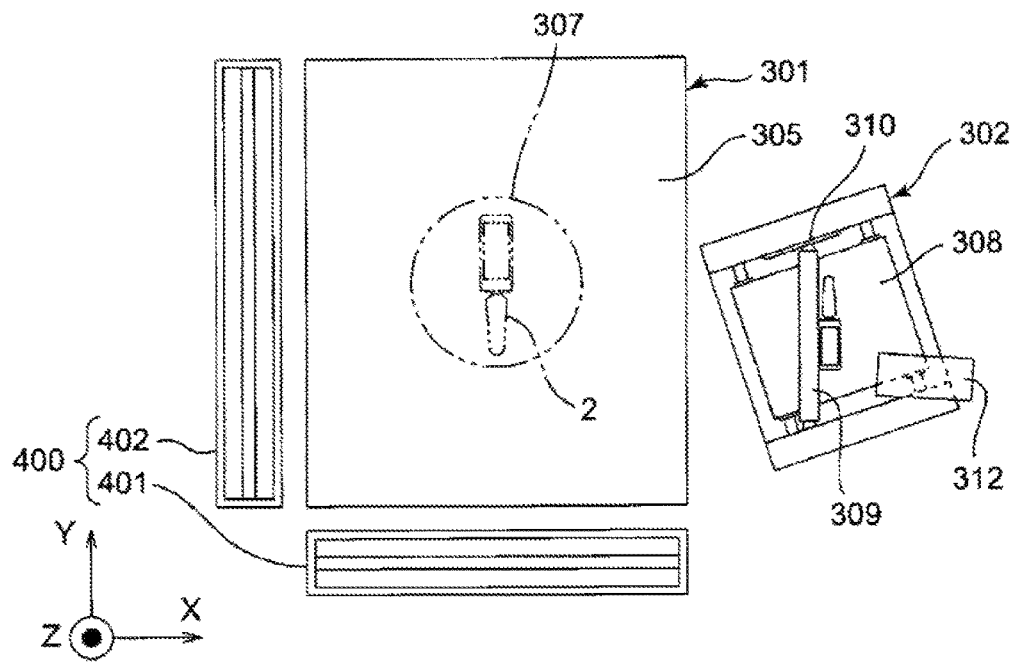
FIG. 13 is a schematic planar view of an identifying part and a non-stored medicine arrangement part.

Referring to FIGS. 1 to 3 along with FIG. 13, the temporarily placing part 301 includes a semi-transparent plate 305 (a medicine placing plate) on which the returned medicine 2 is to be placed, a lighting part 306 arranged on the lower side of this semi-transparent plate 305 and a camera 307 (a second photographing part) positioned on the upper side of the semi-transparent plate 305.

Figure 14:
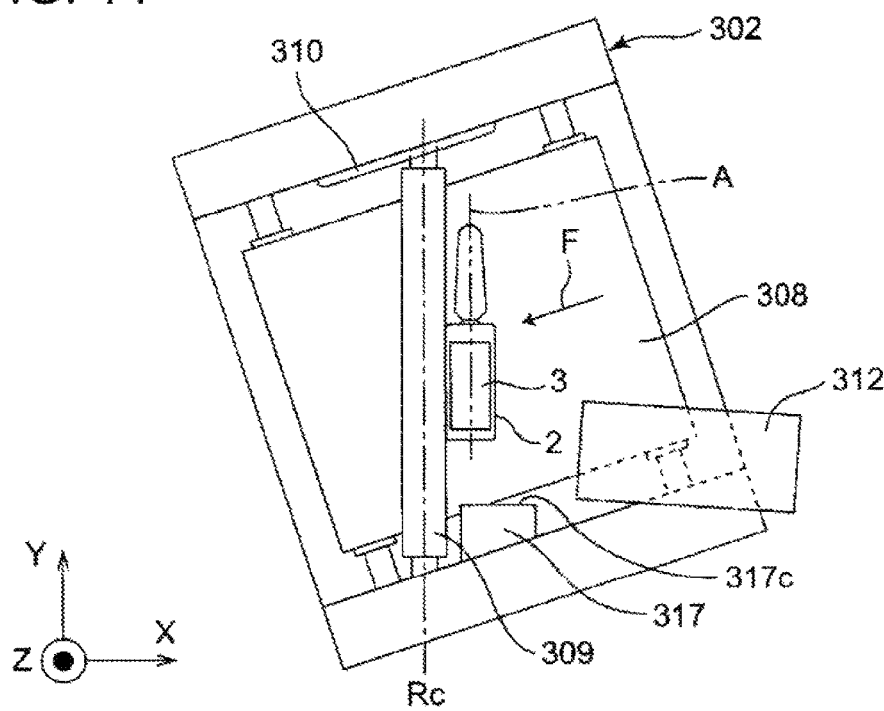
FIG. 14 is a schematic planar view of a label reading part.

Referring to FIGS. 1 to 3 along with FIG. 14, the label reading part 302 includes an endless belt 308 which is to be rotary-driven and a roller 309 arranged on this endless belt 308. When the endless belt 308 and the roller 309 are rotated, the returned medicine 2 is rotated around an axial line A of the returned medicine 2 in the longitudinal direction thereof. Further, the label reading part 302 includes a lighting part 310 and a camera 311 (one example of a third photographing part of the present invention) illustrated in only FIG. 1. Furthermore, the label reading part 302 includes a barcode reader (a first barcode reader) 312.

Referring to FIG. 13, the non-stored medicine arrangement part 400 includes two non-stored medicine arrangement boxes 401, 402 arranged adjacent to the temporarily placing part 301. The two non-stored medicine arrangement boxes 401, 402 are medicine arrangement parts for storing returned medicines 2 which are not to be treated by the returned medicine supplying apparatus 1 (details will be described below), that is returned medicines 2 (non-stored medicines 2') which are not stored in the storing part 500 in principle. Each of these non-stored medicine arrangement boxes 401, 402 includes an arrangement groove, which is similar to an arrangement groove of the storing tray (the container) 5 described below, for holding the non-stored medicines 2'.

(Operation Until Identification of Returned Medicine Completes)

Here, description will be given to an operation of the returned medicine supplying apparatus 1 until the identification of the direction, the posture and the characteristics such as the type, the shape, the size and the expiration date for the returned medicine 2 stored in the returned goods tray 4 of the receiving part 100 completes.

First, the returned goods tray 4 is transferred and placed from the receiving part 100 onto the table 203 of the elevating part 200. After transferring and placing the returned goods tray 4, the table 203 is moved down to the height position H (see FIG. 1). After the table 203 has been moved down to the height position H, an identification process by the identifying part 300 is started. First, the returned goods tray 4 is photographed by the camera 304 with irradiating the returned goods tray 4 on the table 203 from the upper side with illumination light from the lighting part 303 (it is preferable that this illumination light is light having high directionality). Then, a position and the like of each of the returned medicines 2 in the returned goods tray 4 are identified based on an image photographed by the camera 304 to treat each of the returned medicines 2 as a storing target medicine. Details of this identification process will be described below. Based on this identifying result, the suctioning nozzle 701 of the orthogonal type robot 700 suctions and holds the returned medicines 2 in the returned goods tray 4 one by one to transfer and place the returned medicines 2 onto the semi-transparent plate 305 of the temporarily placing part 301 (see FIG. 13). At this time, the suctioning nozzle 701 adjusts the direction of the suctioned and held returned medicine 2 by utilizing the rotation of the suctioning nozzle 701 around the axial line thereof (the Z axis).

In the temporarily placing part 301, the returned medicine 2 is placed on the semi-transparent plate 305. The lighting part 306 arranged on the lower side of the semi-transparent plate 305 emits illumination light toward the semi-transparent plate 305. It is preferable that this illumination light is light having a high luminance. While the lighting part 306 emits the light, the camera 307 photographs the returned medicine 2 on the semi-transparent plate 305. Based on an image photographed by the camera 307, the shape, the size and the direction (including the direction in which the axial line A of the returned medicine 2 in the X-Y plane extends and the tip end 2a and the base end 2b of the returned medicine 2 are directed) of the returned medicine 2 are identified (details will be described below). Further, based on the image photographed by the camera 307, a suctioning position for the returned medicine 2 (a position where the returned medicine 2 is suctioned by the suctioning nozzle 701 of the orthogonal type robot 700 or the suctioning nozzle 801 of the scalar type robot 800) is calculated. This method for calculating the suctioning position for the returned medicine 2 will be described below. Based on the identifying result from the image photographed by the camera 307, the suctioning nozzle 701 of the orthogonal type robot 700 suctions and holds the returned medicine 2 on the semi-transparent plate 305 to transfer and place the returned medicine 2 onto the label reading part 302. At this time, the suctioning nozzle 701 adjusts the direction of the suctioned and held returned medicine 2 by utilizing the rotation of the suctioning nozzle 701 around the axial direction thereof (the Z axis).

In the label reading part 302, the returned medicine 2 is rotated around the axial line A thereof (see FIG. 14) by the rotations of the endless belt 308 and the roller 309 (details will be described below). The label reading device (the camera 311 and the barcode reader 312) reads the label 3 of this returned medicine 2 with irradiating this rotating returned medicine 2 with illumination light from the lighting part 310. Based on an image photographed by the camera 311, the literal information related to the expiration date or the like displayed on the label 3 of the returned medicine 2 is identified and the posture of the returned medicine 2 around the axial line A is identified. In addition to the photographing by the camera 311, the barcode contained in the label 3 is read by the barcode reader 312. Based on the image photographed by the camera 311 and the barcode read by the barcode reader 312, the type and the expiration date of the returned medicine 2 are identified. The identification of the type and the expiration date of the medicine may be performed based on only one of the image photographed by the camera 311 and the barcode read by the barcode reader 312. For example, in the case where the barcode contained in the label 3 of the returned medicine 2 contains the type and the expiration date of the returned medicine 2, the camera 311 may not be provided and only the barcode reader 312 may be provided. In this case, it is possible to identify the type and the expiration date of the returned medicine 2 by reading the barcode with the barcode reader 312. After the identification process completes, the rotations of the endless belt 308 and the roller 309 are stopped so that the rotation of the returned medicine 2 around the axial line A is stopped in a posture that the label 3 is directed toward the upper side (the Z direction). It is possible to check whether or not the label 3 is directed toward the upper side based on the photographed image of the camera 311. In this regard, in the case where the returned medicine 2 has an area in which the suctioning nozzle 801 of the after-mentioned scalar type robot 800 cannot suction the returned medicine 2 (for example, the case where the returned medicine 2 has an area in which a burr exists such as a lateral surface of the resin ampule 2C shown in FIG. 29 or an area in which the label is likely to be peeled when the label in this area is suctioned), it is preferable that the rotation of the returned medicine 2 is stopped so that this area is not directed toward the upper side. For this purpose, this suctioning impossible area is preliminarily registered (preliminarily stored) in an after-mentioned medicine master in a state that the suctioning impossible area is associated with the medicine.

In the label reading part 302, the returned medicine 2 is rotated around the axial line A by not a pair of rollers but the rotations of the endless belt 308 and the roller 309. The combination of the endless belt 308 and the roller 309 can rotate the returned medicine 2 having a broader range of the shape, the size and the type of the returned medicine 2 compared with the case of using the pair of rollers.

Even if the label reading part 302 takes a configuration in which the returned medicine 2 is rotated by the pair of rollers, there is a case where the returned medicine 2 is moved toward one of two directions along rotational axes of the pair of rollers due to a relative inclination or misalignment between the rotational axes of the pair of rollers. For limiting this moving direction of the returned medicine 2 to one direction, it is required to exactly adjust the relative inclination or misalignment between the rotational axes of the pair of rollers. Further, in this case, there is a case where the returned medicine 2 is moved toward one of the two directions along the rotational axes of the pair of rollers due to a situation that the returned medicine 2 is supplied on the pair of rollers in a posture that the returned medicine 2 is inclined with respect to the pair of rollers.

In contrast, in this embodiment, as most clearly shown in FIG. 14, a rotational center line Rc of the roller 309 is inclined with respect to a travelling direction F of the endless belt 308 (namely, the travelling direction F and an extending direction of the rotational center line Rc non-orthogonally cross each other). Due to such an arrangement of the endless belt 308 and the roller 309, it is possible to limit the moving direction of the returned medicine 2 in a width direction of the endless belt 308 to one direction (the lower direction in FIG. 14). As a result, it is possible to make the position of the returned medicine 2 constant in the label reading part 302. In this regard, the travelling direction F of the endless belt 308 is a direction in which the returned medicine 2 placed on the endless belt 308 approaches to the roller 309. On the other hand, the rotational direction of the roller 309 is a rotational direction whose rotational speed becomes reverse with respect to an X-direction component of the travelling direction F of the endless belt 308 in a facing area where the roller 309 faces the endless belt 308. As a result, it is possible to suppress the returned medicine 2 from engaging between the endless belt 308 and the roller 309, especially suppress the returned medicine 2 having a small diameter from engaging between the endless belt 308 and the roller 309. In addition, in the case of treating the returned medicine 2 whose label 3 is partially peeled, it is possible to suppress the partially peeled part of the label 3 from engaging between the endless belt 308 and the roller 309. Further, the returned medicine 2 is positioned and rotated at a constant rotational speed because the returned medicine 2 makes contact with the endless belt 308 and the roller 309 which are in a rotating state. Thus, the barcode reader 312 can read the barcode of the returned medicine 2 with stable accuracy.

For example, in the case where the expiration date identified by the label reading part 302 has already expired or the case where the expiration date cannot be identified by the label reading part 302, this returned medicine 2 is suctioned and held by the suctioning nozzle 701 of the orthogonal type robot 700 as the non-stored medicine 2' to transfer and place the non-stored medicine 2' onto one of the non-stored medicine arrangement boxes 401, 402 of the non-stored medicine arrangement part 400. Further, one of the returned goods trays 4 of the receiving part 100 (for example, the returned goods tray 4 in the lowest stage) is used as a tray for the non-stored medicine 2' which serves as a part of the non-stored medicine arrangement part 400 and the non-stored medicine 2' in one of the non-stored medicine arrangement boxes 401, 402 is returned to this returned goods tray 4 for the non-stored medicine.

(Scalar Type Robot and Support Tray)

Referring to FIGS. 15, 16 and 17A to 17D, the scalar type robot 800 (a second picking part) includes a suctioning nozzle 801 for suctioning the returned medicine 2 with vacuum supplied from a vacuum source (not shown in the drawings) through a central suctioning pipe 813 and a lateral suctioning pipe 814 so that the returned medicine 2 can be released. A suctioning pad 802 (a first suctioning pad) made from rubber is attached to a tip end of the suctioning nozzle 801. The scalar type robot 800 is configured so that a range in which the suctioning nozzle 801 can suction and hold the returned medicine 2 or release the suctioned and held returned medicine 2 by releasing the suctioning contains the label reading part 302 of the identifying part 300, all ranges of all storing trays 5 included in the storing part 500 and an entire range of a dispensing tray 8 arranged at a dispensing position described below.

The scalar type robot 800 (suctioning nozzle 801) can suction and hold the returned medicine 2 to take the returned medicine 2 from the label reading part 302 of the identifying part 300 and transfer the returned medicine 2 to the after-mentioned storing tray 5 included in the storing part 500. Further, the scalar type robot 800 can suction and hold the returned medicine 2 to take the returned medicine 2 from the storing tray 5 and transfer the returned medicine 2 to the after-mentioned dispensing tray 8 included in the dispensing part 600.

Referring to FIGS. 1 to 3 along with FIGS. 15, 16 and 17A to 17D, the scalar type robot 800 includes a pair of fixed linear motion guides 803, 803 extending in the height direction of the returned medicine supplying apparatus 1 (the Z direction) and carriages 804, 804 which can respectively move on these linear motion guides 803, 803. Due to the carriages 804, 804, end portions of an X-axis beam 805 extending in the width direction of the returned medicine supplying apparatus 1 (the X direction) are supported. A base 806 is fixed to the X-axis beam 805. A base end portion of a first arm 807 connected to the base 806 can pivotally move around the Z axis and a base end portion of a second arm 808 connected to a tip end portion of the first arm 807 can also pivotally move around the Z axis. A head 809 is attached to a tip end portion of the second arm 808 so that the head 809 can pivotally move around the Z axis. The suctioning nozzle 801 is held by a bracket 810 fixed to the head 809. A barcode reader 812 (a second barcode reader) illustrated in only FIG. 15 and a presence detecting sensor 820 for detecting the returned medicine 2 are mounted on the head 809. The barcode reader 812 is mounted at a position shifting to the lateral direction with respect to the suctioning nozzle 801 so that the barcode reader 812 can read the barcode of the label 3 adhering to the returned medicine 2 positioned on the lower side of the suctioning nozzle 801 from the diagonally upward direction. In other words, the barcode reader 812 is arranged so as to face the barcode of the label 3 adhering to the returned medicine 2 when the suctioning nozzle 801 is positioned on the upper side of the target returned medicine 2 in the same as the positional relationship of the barcode reader 312 with respect to the returned medicine 2 in the label reading part 302.

In this embodiment, the presence detecting sensor 820 is a reflecting type photoelectric sensor. The presence detecting sensor 820 emits light toward a lower area below the suctioning nozzle 801 and receives reflected light of this light to detect whether or not the returned medicine 2 is present in the lower area below the suctioning nozzle 801.

The returned medicine 2 suctioned and held by the suctioning nozzle 801 is moved in the Z direction due to the linear motion of the X-axis beam 805 (carriage 804) and moved in the X-Y plane due to the pivotal movements of the first arm 807 and the second arm 808. Further, the returned medicine 2 suctioned by the suctioning nozzle 801 is rotated around the axial line of the suctioning nozzle 801 (the Z axis) due to the rotation of the head 809 with respect to the tip end portion of the second arm 808.

As shown in FIGS. 17A to 17D, two springs 811, 811 are intervened between the bracket 810 and the suctioning nozzle 801 and two axial rods 815 are respectively arranged in centers of the springs 811. Three thorough-holes 816 are formed in a lower end of the bracket 810 so as to be arranged side by side. The two axial rods 815 are arranged so that the two axial rods 815 respectively pass through two of the three through-holes 816 provided on both sides and can be slidably moved with respect to the bracket 810. The central suctioning pipe 813 is arranged so that the central suctioning pipe 813 passes through central one of the three through-holes 816 and can be slidably moved with respect to the bracket 810 in the same manner as the axial rods 815. A locking plate 817 is arranged on the upper side of these three through-holes 816. Lower ends of the two axial rods 815, 815 are fixed to the suctioning nozzle 801 and upper ends of the axial rods 815, 815 are fixed to the locking plate 817. Whit this configuration, the suctioning nozzle 801 can be elastically moved up with respective to the bracket 810 while the suctioning nozzle 801 is biased toward the lower side by the springs 811.

The central suctioning pipe 813 extends so as to pass through the suctioning nozzle 801 and a small type suctioning pad 818 (a second suctioning pad) is provided on a terminal end portion (a lower side portion in the drawings) of the central suctioning pipe 813 in the suctioning pad 802. A base side portion (an upper side portion in the drawings) of the central suctioning pipe 813 is communicated with the vacuum source (not shown in the drawings). A thorough-hole 821 is formed in a lateral surface of the suctioning nozzle 801 and the lateral suctioning pipe 814 is connected to the central suctioning pipe 813 through this through-hole. A base end portion (an upper end portion in the drawings) of the lateral suctioning pipe 814 is communicated with the vacuum source (not shown in the drawings). A pressure sensor (not shown in the drawings) for measuring internal pressure of the suctioning nozzle 801 is provided in the suctioning nozzle 801.

Figure 17A:
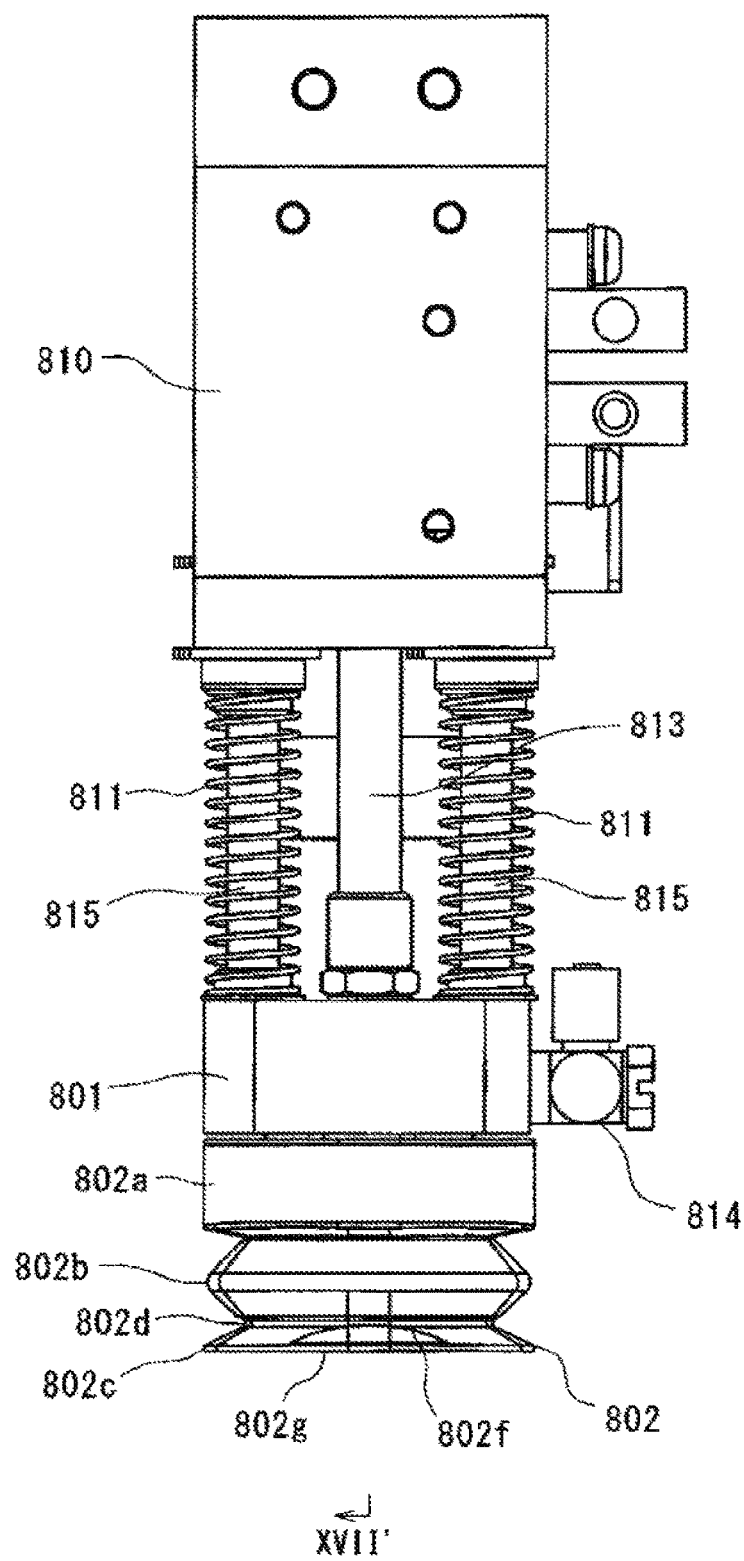
FIG. 17A is a front view showing a part of the scalar type robot.
Figure 17B:
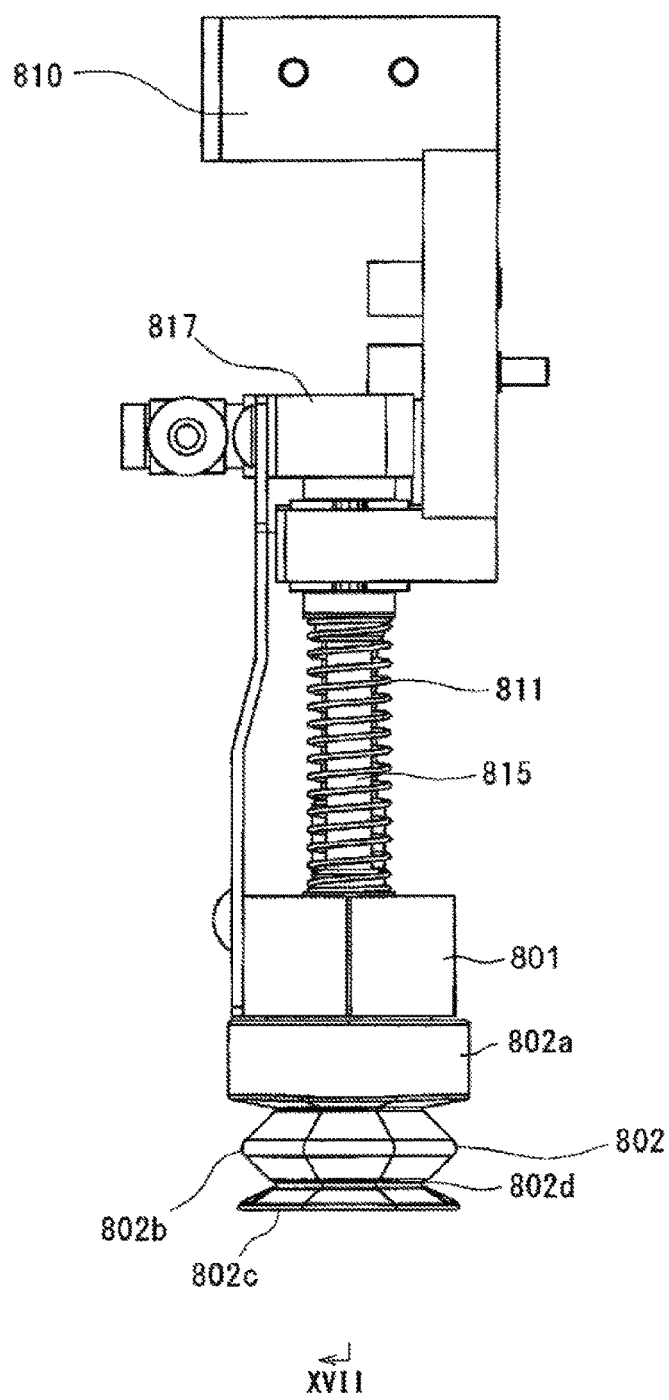
FIG. 17B is a side view showing a part of the scalar type robot.
Figure 17C:
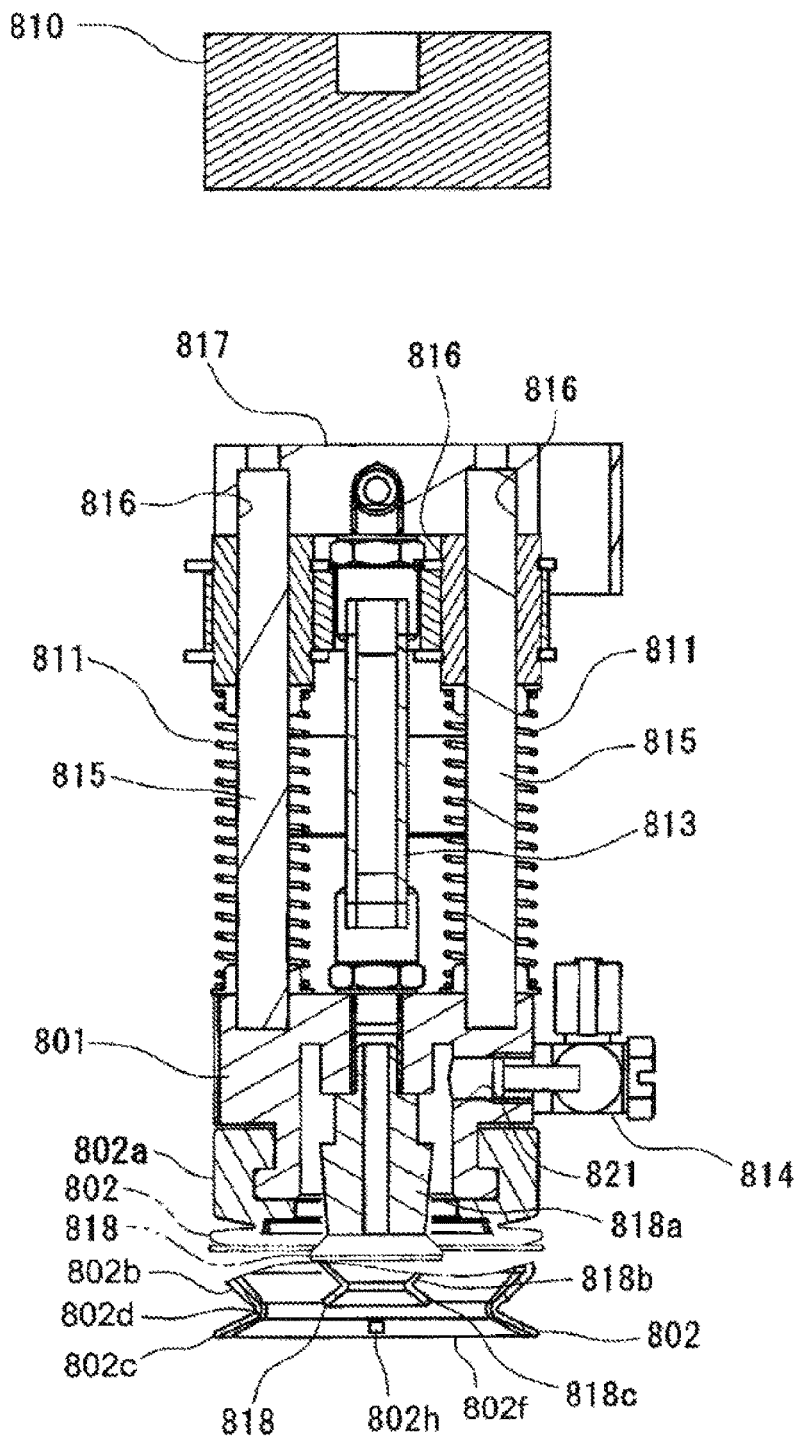
FIG. 17C is a cross-sectional view taken from XVII-XVII line in FIG. 17B.
Figure 17D:
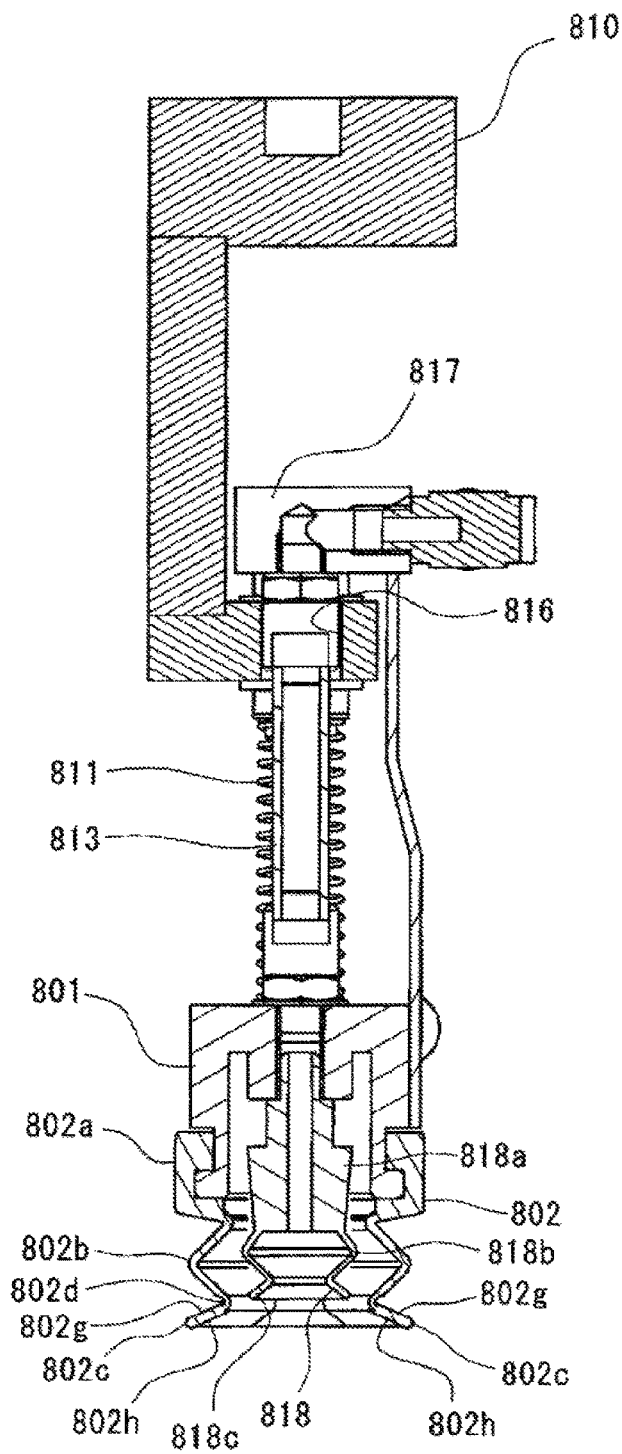
FIG. 17D is a cross-sectional view taken from XVII'-XVII' line in FIG. 17A.
Figure 18A:
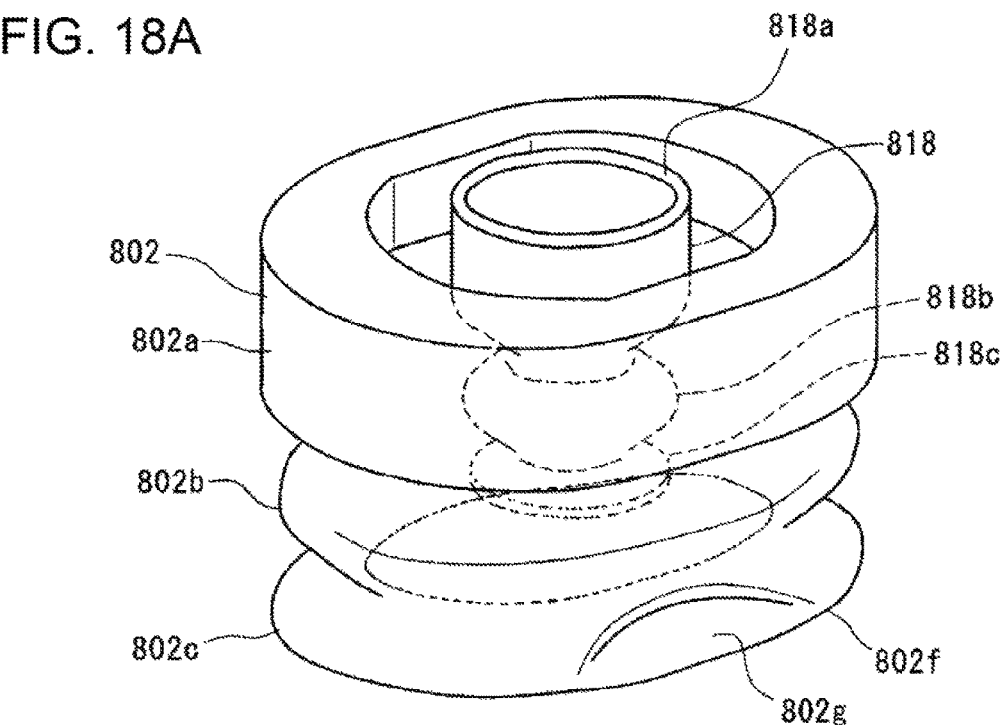
FIG. 18A is a top perspective view of a suctioning pad.
Figure 18B:
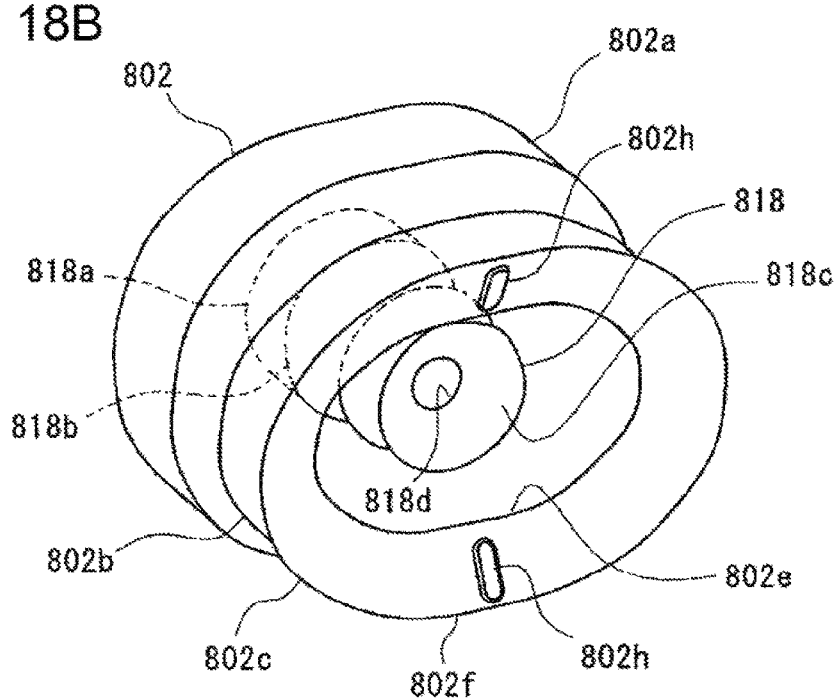
FIG. 18B is a bottom perspective view of the suctioning pad.

As shown in FIGS. 18A and 18B, the suctioning pad 802 has a hollow shape and includes an attachment portion 802a provided on the upper side, a suctioning portion 802c provided on the lower side and an accordion portion 802b connecting the attachment portion 802a and the suctioning portion 802c. Referring to FIG. 17C along with FIGS. 18A and 18B, the attachment portion 802a is a thick portion and engaged with a lower portion of the suctioning nozzle 801. Further, an internal side of the attachment portion 802a is communicated with the lateral suctioning pipe 814 through the through-hole 816 of the suctioning nozzle 801. The accordion portion 802b is configured to contract toward the upper direction when air is suctioned from the lateral suctioning pipe 814. A thickness of a connecting portion 802d between the accordion portion 802b and the suctioning portion 802c is thinner than those of other parts, thereby easily deforming the suctioning pad 802 from the connecting portion 802d. As a result, by first deforming the connecting portion 802d at the time of the suctioning, it is possible to well suction a target with keeping the shape of the suctioning pad 802. Further, since the suctioning pad 802 has a square measure of a suctioning surface larger than that of the small type suctioning pad 818, the suctioning pad 802 has suctioning force stronger than that of the small type suctioning pad 818 and can suction and transfer a more weighted or larger returned medicine 2 at a high speed.

The suctioning portion 802c has a substantial ellipse shape and includes an opening portion 802e being communicated with the lateral suctioning pipe 814 at a central portion of the suctioning portion 802c. A thick portion 802g partially having a thick thickness is formed in a circular arc portion 802f provided in a longitudinal direction of the suctioning portion 802c, thereby enforcing the circular arc portion 802f having a weak stiffness in the longitudinal direction thereof to prevent air leaking from the suctioning surface which is caused by a deformation of the circular arc portion 802f at the time of the suctioning. Further, protrusions 802h are integrally formed on the side of the suctioning surface of the circular arc portion 802f. Each of the protrusion 802h is formed at a height for permitting a level of slight air leaking which does not result in a suctioning failure at the time of the suctioning. As a result, it is possible to keep suctioning property at the time of the suctioning and quickly release the suctioning by utilizing the air leaking from the protrusion 802h at the time of releasing the suctioning.

Figure 19A:
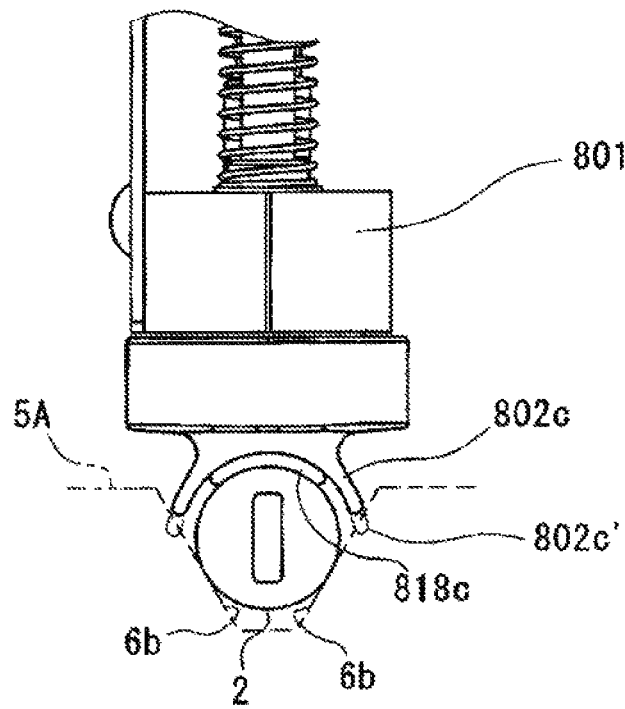
FIG. 19A is a front view showing a state that a small-diameter returned medicine is suctioned by the suctioning pad.
Figure 19B:
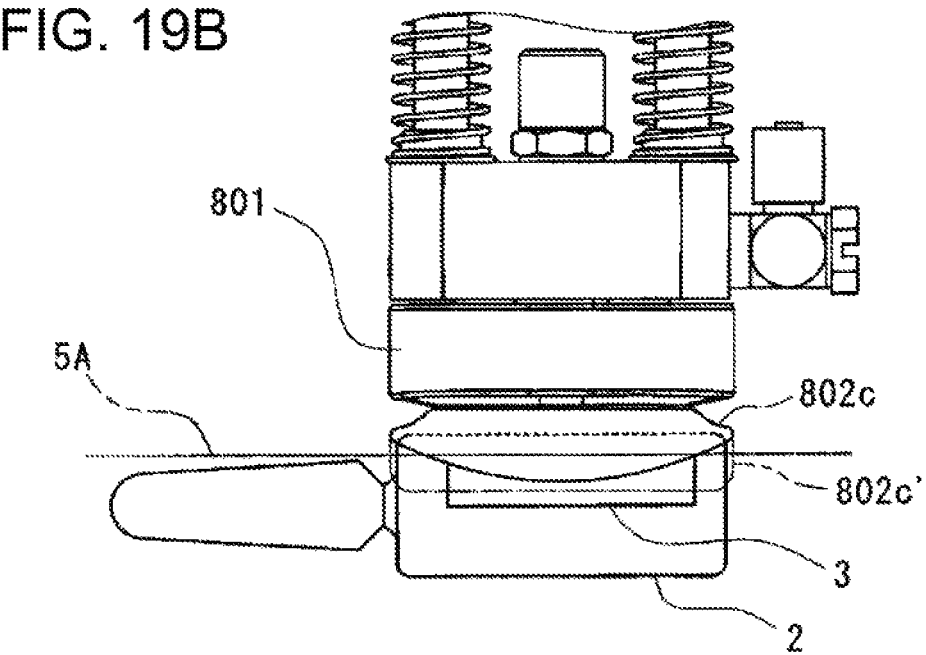
FIG. 19B is a side view showing the state that the small-diameter returned medicine is suctioned by the suctioning pad.

Further, referring to FIGS. 19A and 19B, since the suctioning portion 802c has the substantially ellipse shape in a bottom surface view thereof, the suctioning portion 802c can reduce a deformation amount (rolling amount) of the suctioning portion 802c onto a body portion of the returned medicine 2 when the returned medicine 2 is suctioned and held by the small type suctioning pad 818, compared with the case where the suctioning portion 802c is formed into a rectangular shape (represented by a dashed line in FIGS. 19A and 19B). With this configuration, it is possible to prevent the returned medicine 2 from being rotated or moved due to the deformation (rolling) of the suctioning portion 802c when the suctioning to the returned medicine 2 is released on an arrangement groove 7 of a storing tray 5A to place the returned medicine 2 on the arrangement groove 7.

Referring to FIGS. 18A and 18B, the small type suctioning pad 818 has a hollow shape and the small type suctioning pad 818 is arranged on the inner side of the suctioning pad 802 so that a central axial line of the small type suctioning pad 818 (in the Z axis direction) substantially coincides with that of the suctioning pad 802. Further, the small type suctioning pad 818 includes an attachment portion 818a provided on the upper side, a suctioning portion 818c provided on the lower side and an accordion portion 818b connecting the attachment portion 818a and the suctioning portion 818c. The attachment portion 818a is attached to a lower portion of the central suctioning pipe 813 so that the attachment portion 818a can be communicated with the central suctioning pipe 813. The accordion portion 818b is configured to contract toward the upper direction when air is suctioned from the central suctioning pipe 813. The suctioning portion 818c has a substantial circular shape and includes an opening portion 818d being communicated with the central suctioning pipe 813 at a central portion of the suctioning portion 818c. Since the suctioning portion 818c has the substantially circular shape, the suctioning portion 818c is likely to deform so as to follow a cylindrical portion of a cylindrical returned medicine and air leaking is not likely to occur, thereby well suctioning the returned medicine 2.

Further, as shown by a solid line in FIG. 17C, when the suctioning nozzle 801 is not in a suctioning state, a lower end portion of the suctioning pad 802 is positioned lower than a lower end portion of the small type suctioning pad 818. On the other hand, as shown by a dashed line in FIG. 17C, when the suctioning nozzle 801 is in the suctioning state (when air is taken through both of the central suctioning pipe 813 and the lateral suctioning pipe 814), the lower end portion of the small type suctioning pad 818 is positioned lower than the lower end portion of the suctioning pad 802. With this configuration, in the suctioning state, it is possible to well suction the returned medicine 2 by using the small type suctioning pad 818 without disturbing the suctioning of the small type suctioning pad 818 by the suctioning pad 802.

In this embodiment, the control device 1000 sets an optimum suctioning pad for suctioning the returned medicine 2 according to the shape, the size, the type or the like of the returned medicine 2 detected from the image photographed by the camera 307 or identified by the label reading part 302. For example, in the case where a diameter of the body portion of the returned medicine 2 is equal to or larger than 28 mm, air is suctioned by using both of the central suctioning pipe 813 and the lateral suctioning pipe 814 and the returned medicine 2 is suctioned by both of the small type suctioning pad 818 and the suctioning pad 802. In the case where the diameter of the returned medicine 2 is smaller than 28 mm, air is suctioned by using only the central suctioning pipe 813, namely the returned medicine 2 is suctioned only by the small type suctioning pad 818. In this regard, when the returned medicine 2 is suctioned by both of the small type suctioning pad 818 and the suctioning pad 802 and then the returned medicine 2 is released, it is preferable to first stop the suctioning of the suctioning pad 802. With this configuration, it is possible to accelerate that the shape of the small type suctioning pad 818 restores (compared with the case where the suctioning of the small type suctioning pad 818 and the suctioning of the suctioning pad 802 are simultaneously stopped).

In the case where the diameter of the returned medicine 2 is equal to or larger than 28 mm, air may be suctioned by using only the lateral suctioning pipe 814, namely the returned medicine 2 may be suctioned only by the suctioning pad 802. Further, when the label 3 adhering to the body portion of the returned medicine 2 is suctioned, the label 3 is often peeled off. Thus, a suctioning possible area or a suctioning impossible area may be preliminarily defined to prevent such an accident. In the case where the suctioning possible area or the suctioning impossible area is narrow, the returned medicine 2 may be suctioned by the small type suctioning pad 818 even if the diameter of the returned medicine 2 is equal to or larger than 28 mm. Further, when it is detected that the suctioning for the returned medicine 2 is unintentionally released after the returned medicine 2 has been suctioned only by the suctioning pad 802, the returned medicine 2, which is not suctioned due to the unintentional releasing of the suctioning, may be suctioned by both of the suctioning pad 802 and the small type suctioning pad 818.

Figure 15:
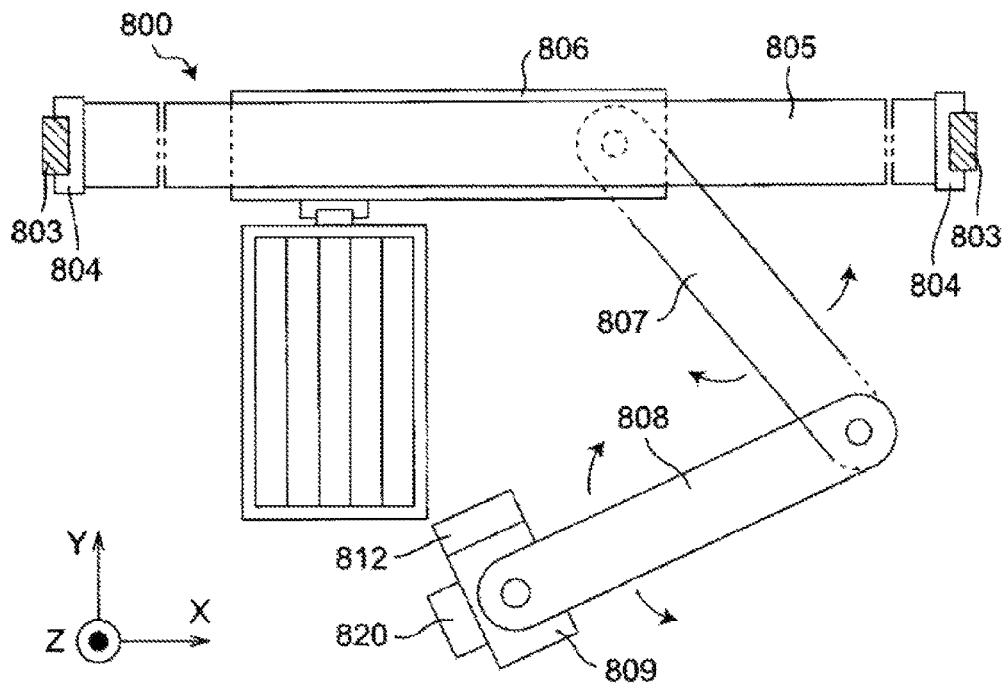
FIG. 15 is a schematic planar view of a scalar type robot and a support tray.
Figure 16:
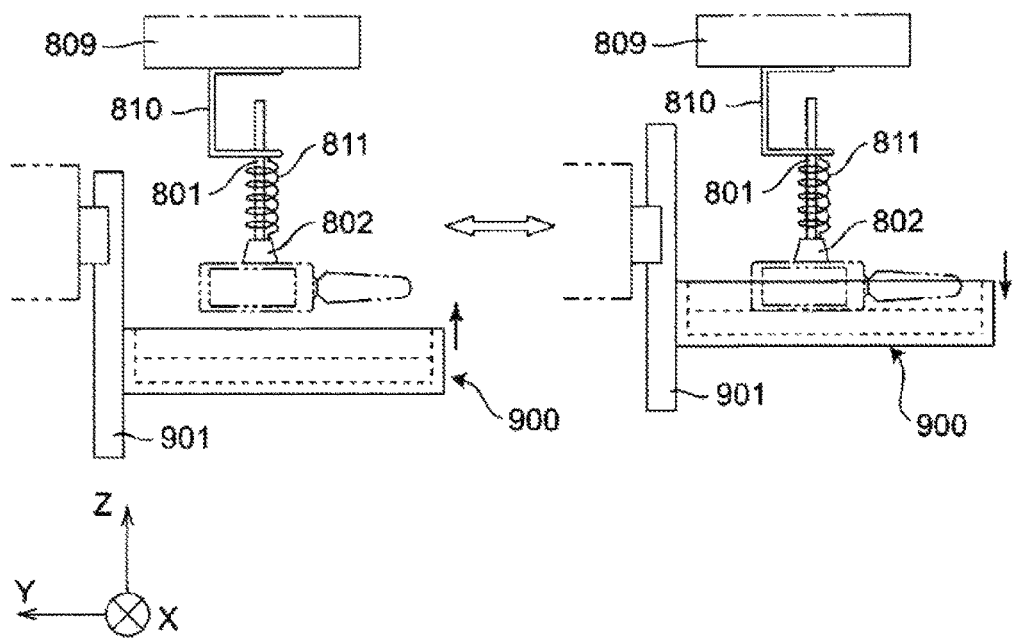
FIG. 16 is a schematic side view of the scalar type robot and the support tray.

Referring to FIGS. 1, 15 and 16, the support tray 900 is fixed to a lower end of a rod 901 which can elevate with respect to the base 806 of the scalar type robot 800. In this embodiment, the support tray 900 includes the same arrangement groove for holding the returned medicine 2 as that of the storing tray 5 described below. As shown in FIG. 16, due to the elevating of the rod 901, the support tray 900 is elevated to a height position where the support tray 900 approaches to the returned medicine 2 suctioned and held by the suctioning nozzle 801 and a height position where the support tray 900 separates from the returned medicine 2 suctioned and held by the suctioning nozzle 801.

When the suctioning nozzle 801 suctions and transfers the returned medicine 2, the scalar type robot 800 uses the first arm 807 and the second arm 808 to move the suctioning nozzle 801 in the horizontal direction to position the suctioning nozzle 801 on the upper side of the support tray 900. At this time, the head 809 is rotated so that the direction of the suctioned returned medicine 2 coincides with a direction of the arrangement groove of the support tray 900. Then, the rod 901 is moved toward the upper direction to transfer the support tray 900 to the height position where the support tray 900 approaches to the returned medicine 2 from the height position where the support tray 900 separates from the returned medicine 2. With this configuration, even if the returned medicine 2 being transferred is unintentionally released from the suctioning pad 802 and/or the small type suctioning pad 818 being suctioning the returned medicine 2, it is possible to prevent the returned medicine 2 from dropping toward the lower direction with the support tray 900. With this configuration, it is possible to prevent the returned medicine 2 from being damaged by the unintentional releasing of the suctioning and transfer the returned medicine 2 at a higher speed.

Further, the returned medicine 2 dropped into the support tray 900 may be re-suctioned and transferred by the suctioning nozzle 801. At this time, the pressure sensor (not shown in the drawings) provided at the suctioning nozzle 801 may detect that the suctioning of the suctioning nozzle 801 is unintentionally released. Further, since the returned medicine 2 is transferred in a state that the direction of the returned medicine 2 coincides with the direction of the arrangement groove on the support tray 900 as described above, the returned medicine 2 drops into the arrangement groove provided immediately below the suctioning nozzle 801 without changing the direction and the posture of the returned medicine 2 when the suctioning of the suctioning nozzle 801 is unintentionally released. With this configuration, it is possible to predict that the returned medicine 2 exists immediately below the suctioning nozzle 801, thereby improving a success rate at the time of re-suctioning the returned medicine 2 with the suctioning nozzle 801.

In this regard, depending on the size and the shape of the returned medicine 2 treated by the returned medicine supplying apparatus 1, when the returned medicine 2 is suctioned and held by the suctioning pad 802, there is a case where the accordion portion 802b of the suctioning pad 802 contracting as shown in FIG. 17C makes contact with the attachment portion 802a. There is a possibility that the accordion portion 802b is broken when this contact is repeated.

Figure 20A:
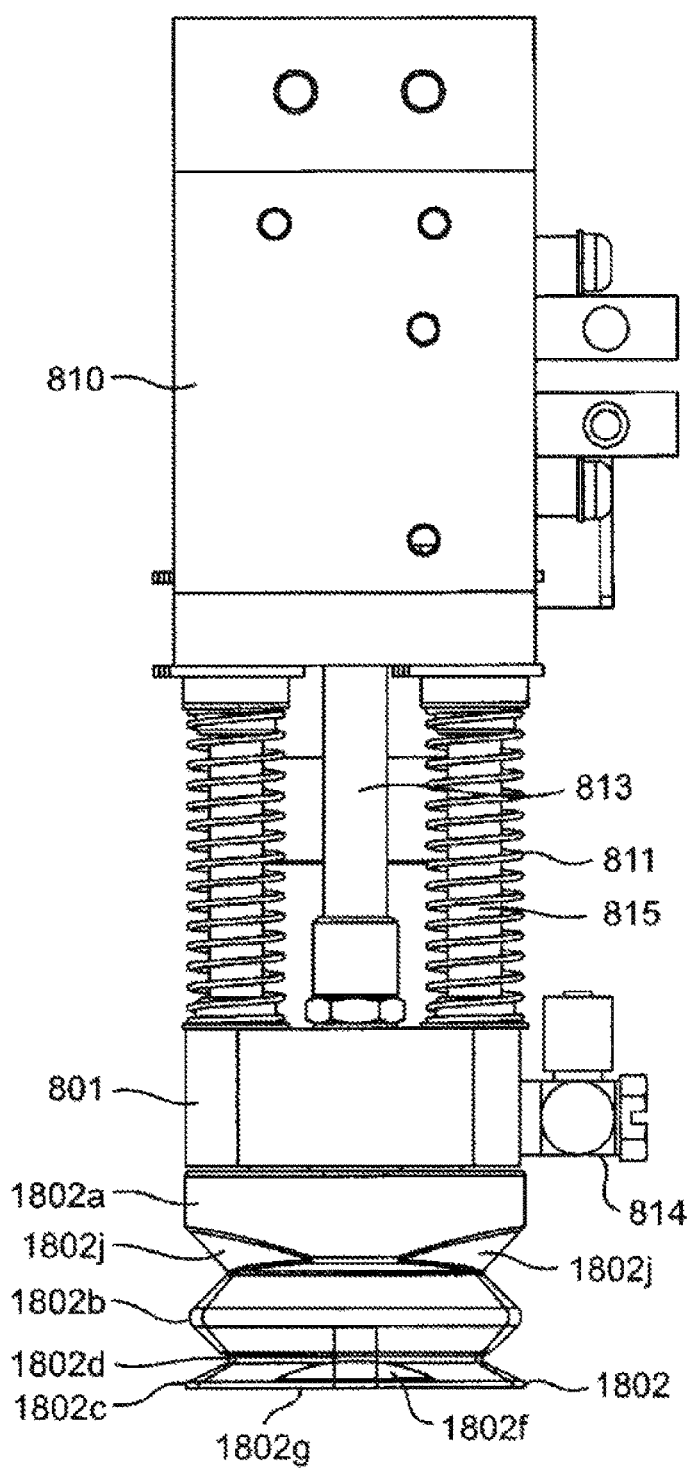
FIG. 20A is a front view showing a part of the scalar type robot to which a suctioning pad of another form is attached.
Figure 20B:
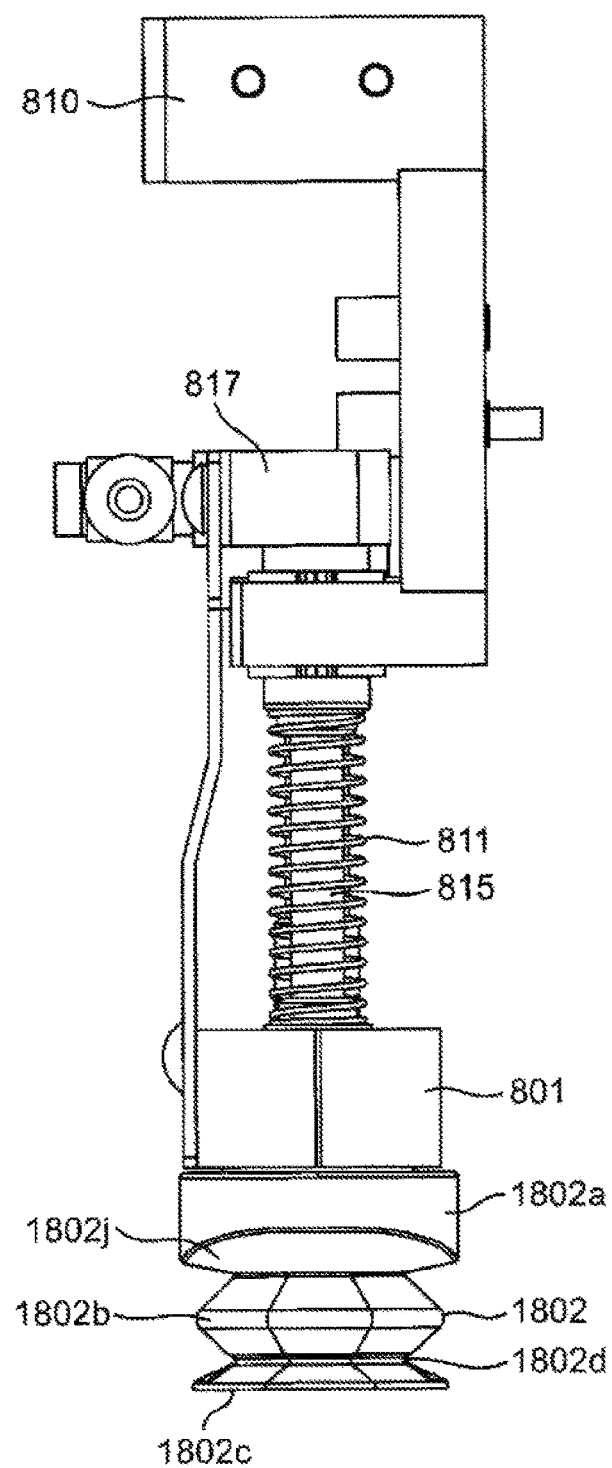
FIG. 20B is a side view showing a part of the scalar type robot to which the suctioning pad of the other form is attached.

FIGS. 20A and 20B show the suctioning nozzle 801 to which a suctioning pad 1802 which can suppress the contact between the attachment portion and the accordion part is attached. As shown in FIGS. 20A and 20B, an escape portion 1802j is formed on an attachment portion 1802a of the suctioning pad 1802 for avoiding a contact between an accordion portion 1802*b* and the attachment portion 1802*a* when the accordion portion 1802*b* contracts. Specifically, the escape portion 1802*j* is formed on the attachment portion 1802*a* as a sloping surface extending from a connecting portion between the attachment portion 1802*a* and the accordion portion 1802*b* toward the diagonally upward direction. Since the attachment portion 1802*a* includes the escape portion 1802*j* having such a configuration, it is possible to prevent the contact between the attachment portion 1802*a* and the contracted accordion portion 1802*b*.

(Storing Part)

As shown in FIGS. 1 to 3, the storing part 500 is arranged on the right and rear side when the returned medicine supplying apparatus 1 is viewed from the front side.

Figure 21:
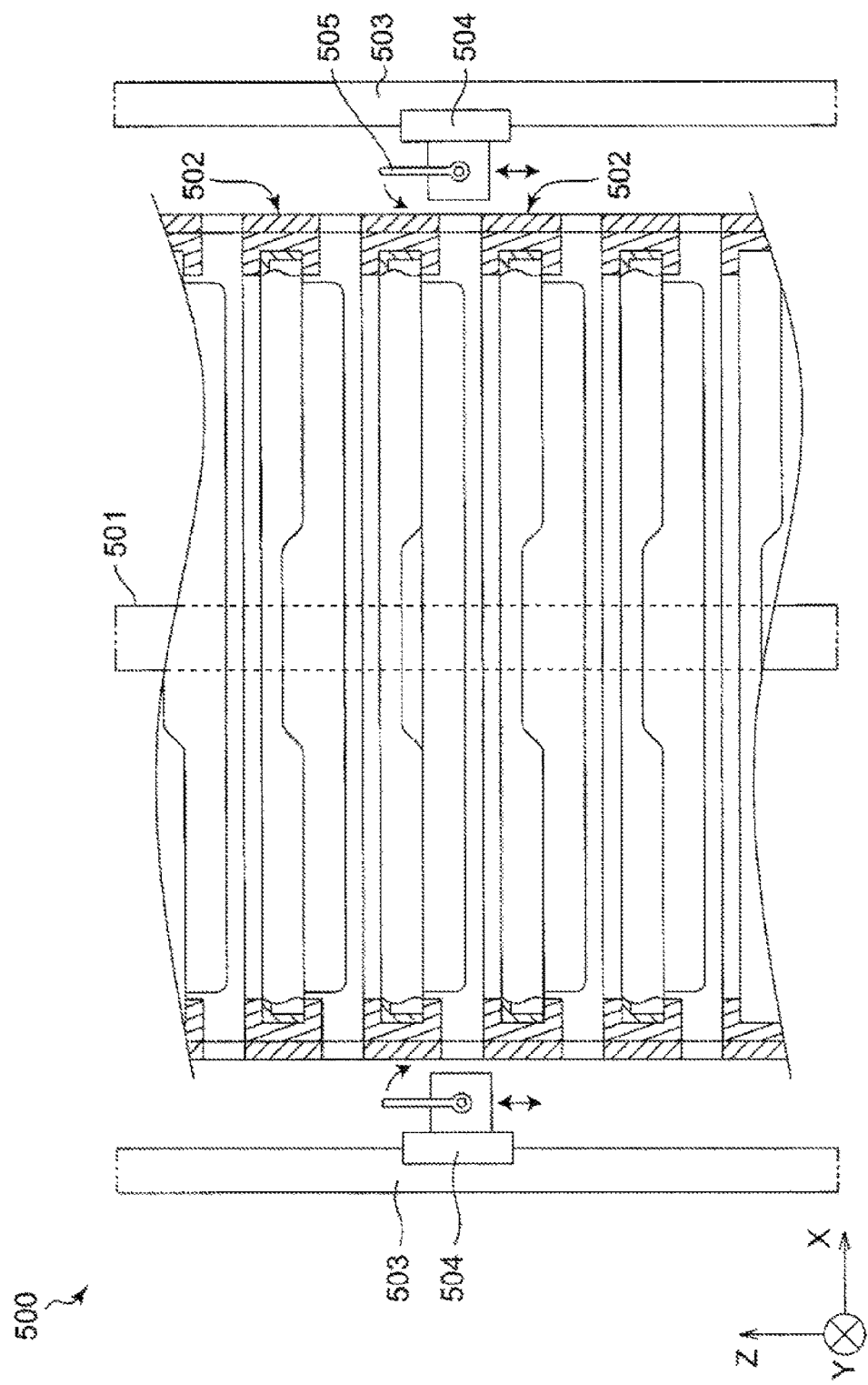
FIG. 21 is a schematic front view of a storing part.
Figure 22:
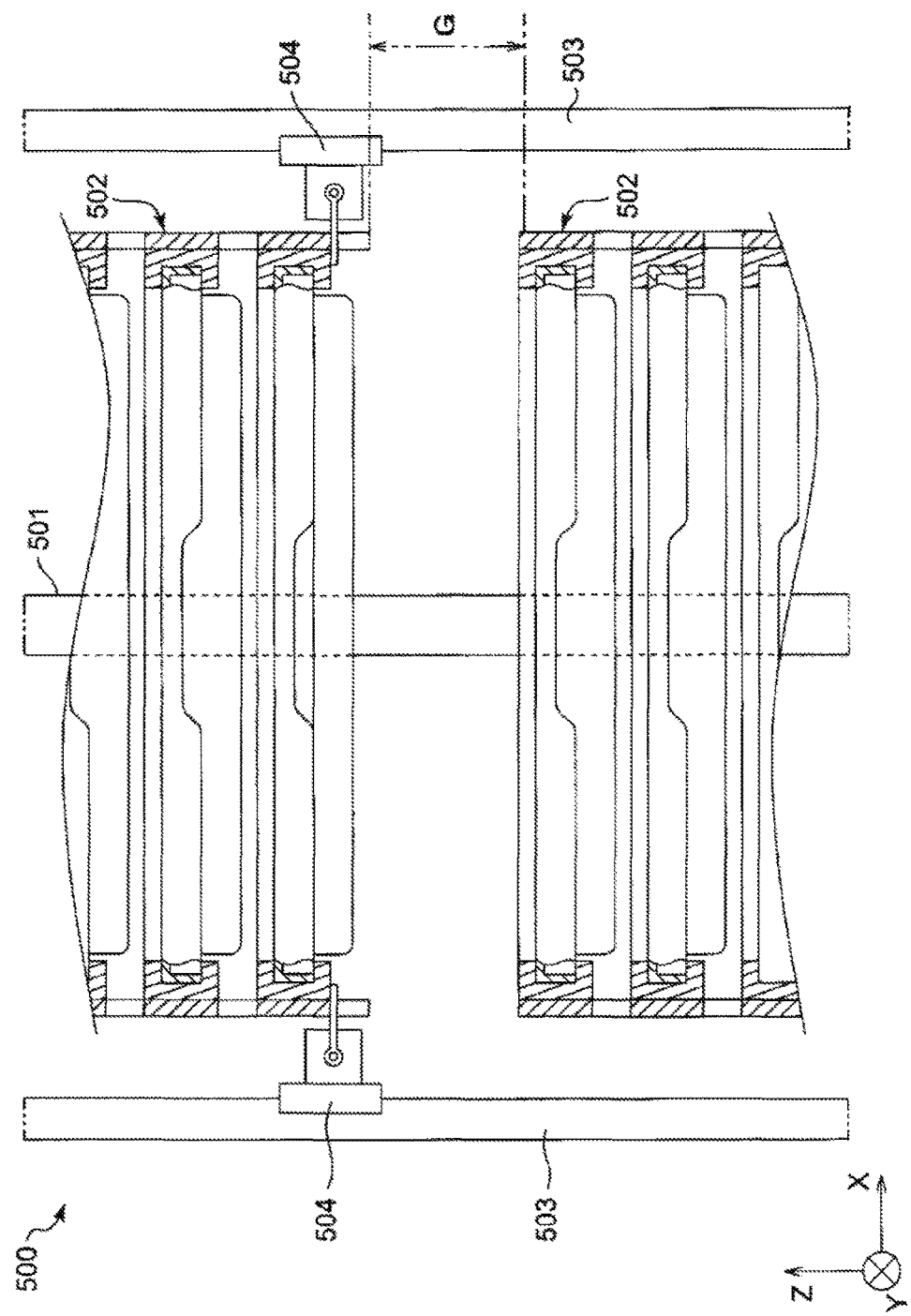
FIG. 22 is another schematic front view of the storing part.
Figure 23A:
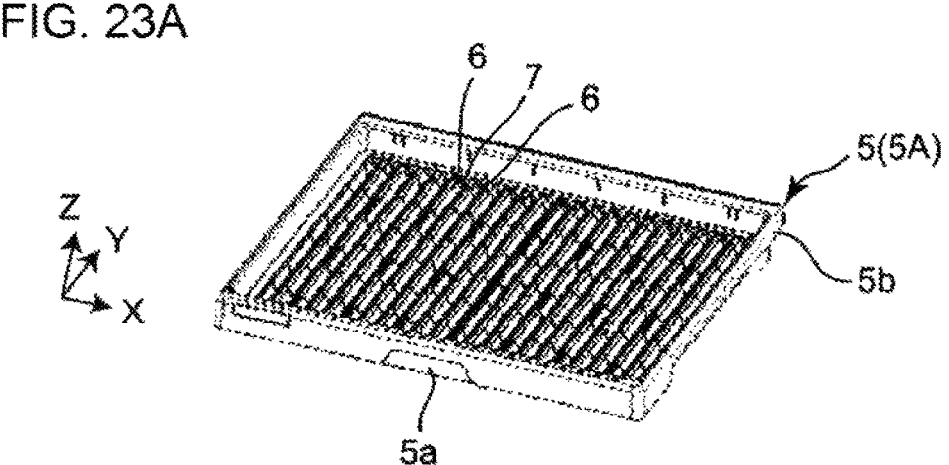
FIG. 23A is a perspective view of a storing tray (S-size).
Figure 23B:
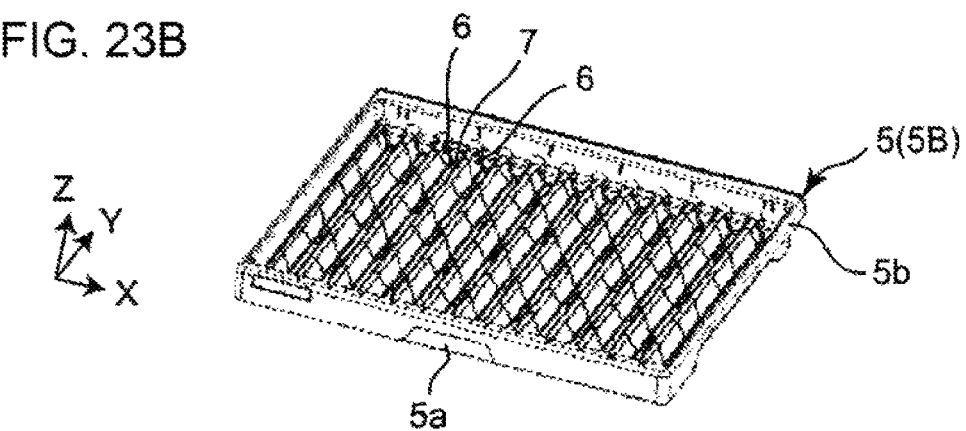
FIG. 23B is a perspective view of a storing tray (M-size).
Figure 23C:
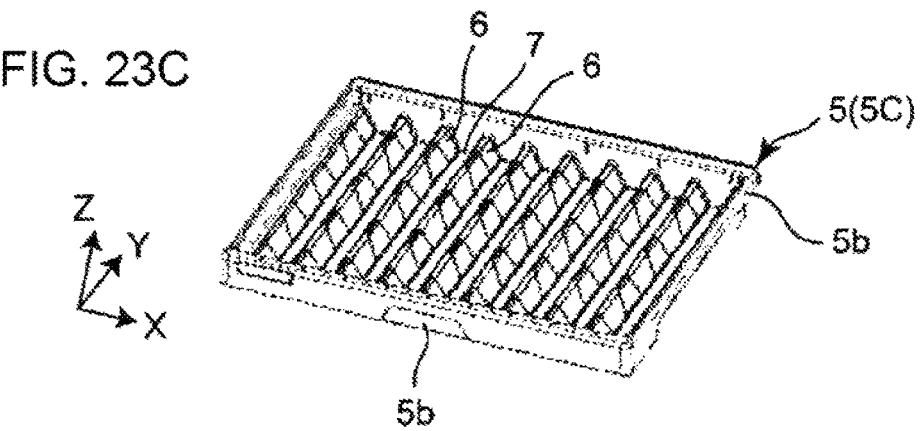
FIG. 23C is a perspective view of a storing tray (L-size).
Figure 24A:
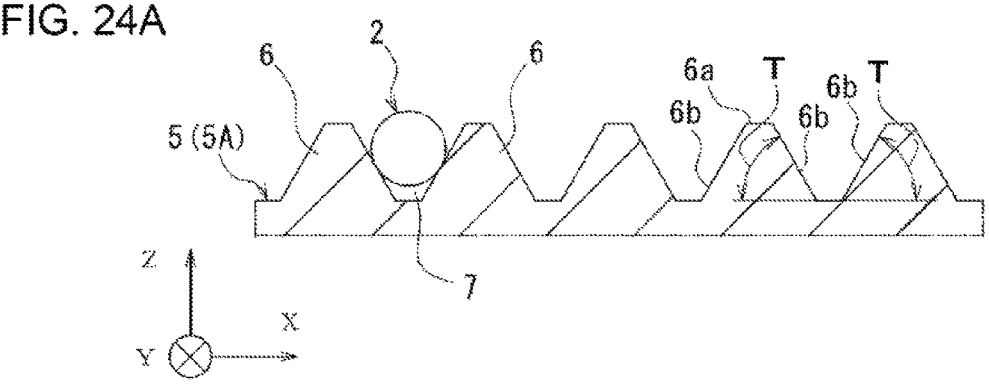
FIG. 24A is a schematic partially enlarged cross-sectional view of FIG. 23A.
Figure 24B:
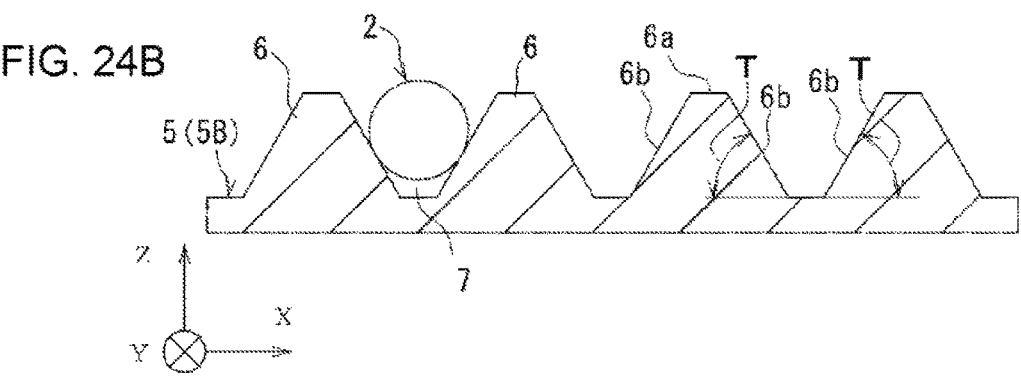
FIG. 24B is a schematic partially enlarged cross-sectional view of FIG. 23B.
Figure 24C:
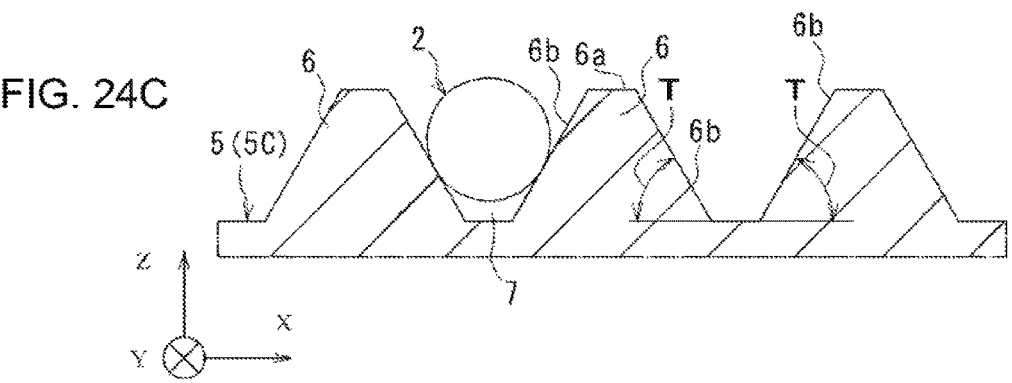
FIG. 24C is a schematic partially enlarged cross-sectional view of FIG. 23C.

Referring to FIGS. 1 to 3 together with FIGS. 21 and 22, the storing part 500 includes a linear motion guide 501 extending in the Z direction. Holding frames 502 for holding each of the storing trays 5 (containers) so that each of the storing trays 5 can be taken are provided on this linear motion guide 501 so that the holding frame 502 can be elevated. The holding frames 502 are arranged in multiple stages so as to overlap with each other in the Z direction. Linear motion guides 503, 503 extending in the Z direction are respectively placed on both sides of the storing trays 5 arranged in the multiple stages. Carriages 504, 504 respectively elevating on these linear motion guides 503, 503 are provided. Lifting mechanisms 505 (a gap forming mechanism) which can be moved to a retracting position shown in FIG. 21 and a protruding position shown in FIG. 22 are respectively mounted on the carriages 504. Other lifting mechanisms 505 are also provided on the rear side in the drawings. Further, a plurality of lifting mechanisms 505 may be arranged in multiple stages.

In a state that the lifting mechanisms 505 are positioned at the retracting position as shown in FIG. 21, the carriages 504, 504 are moved to a position corresponding to one of the holding frames 502. Next, the lifting mechanisms 505 are moved to the protruding position as shown in FIG. 22 and inserted into a lower space of this holding frame 502. When the carriages 504, 504 are moved toward the upper side in this state, the holding frame 502 below which the lifting mechanisms 505 are inserted and the holding frames 502 provided above this holding frame 502 are lifted up. As a result, a gap G is formed between the holding frame 502 below which the lifting mechanisms 505 are inserted and the holding frame 502 provided just below this holding frame 502. This enables the suctioning nozzle 801 of the scalar type robot 800 to access the storing tray 5, which is held by the holding frame 502 provided just below the holding frame 502 below which the lifting mechanisms 505 are inserted, through this gap G. In other words, by forming this gap G, the suctioning nozzle 801 of the scalar type robot 800 can perform an operation (storing operation) for transferring and placing the returned medicine 2 onto the storing tray 5 and an operation (dispensing operation) for suctioning and holding the returned medicine 2 to take the returned medicine 2 from the storing tray 5 with respect to all of the storing trays 5.

Referring to FIGS. 23A to 24C, the storing tray 5 contains a storing tray 5A (S-size) suitable for storing a relatively small size returned medicine 2, a storing tray 5B (M-size) suitable for storing a middle size returned medicine 2 and a storing tray 5C (L-size) suitable for storing a relatively large size returned medicine 2. The storing part 500 includes at least one of these three types storing trays 5A to 5C. Each of the storing trays 5 (5A to 5C) includes a tray main body 5*a* opening toward the upper side in the drawings and a flange portion 5*b* provided on an upper end of the tray main body 5*a*.

Figure 25:
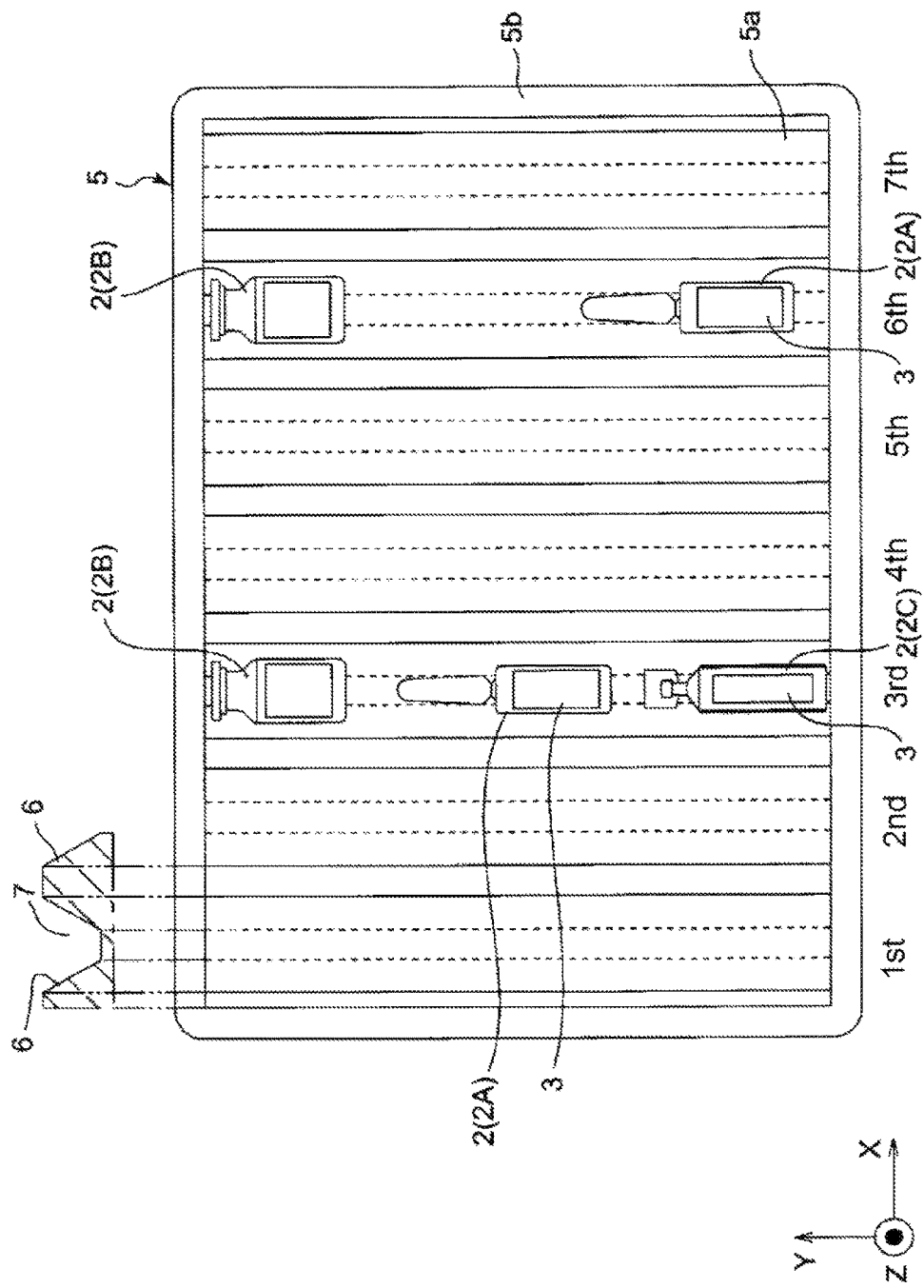
FIG. 25 is a schematic planar view of the storing tray.

Referring to FIGS. 23A to 24C along with FIG. 25, a plurality of protruding portions (protrusions) 6 extending in the depth direction of the returned medicine supplying apparatus 1 (the Y direction) and arranged so as to be spaced apart from each other in the width direction of the returned medicine supplying apparatus 1 (the X direction) are formed on a bottom portion of the tray main body 5*a*. Linear arrangement grooves (concave portions) 7 are respectively formed between the adjacent protruding portions 6 and the returned medicines 2 are to be stored in the arrangement grooves 7. Since the three types storing trays 5A to 5C have different sizes (heights and widths) and pitches, and thus sizes (depths and widths) of the arrangement grooves 7 for the three types storing trays 5A to 5C are different from each other as is clear by referring to FIGS. 24A to 24C. Due to these differences of the sizes of the arrangement grooves 7, a size of the returned medicine 2 suitable for being stored differs for each type of the three types storing trays 5A to 5C as described above.

Each protruding portion 6 has a top portion 6*a* and a pair of sloping portions 6*b*, 6*b* respectively extending from both edge portions of the top portion 6*a* toward the lower side so as to separate from each other as the sloping portions 6*b*, 6*b* extend toward the lower side. Each of the sloping portions 6*b* is configured to have a relatively large inclination, namely to be a steep slope. There is a case where a center axis of the returned medicine 2 does not coincide with a center position of the arrangement groove 7 when the returned medicine 2 is transferred into the arrangement groove 7 by the suctioning nozzle 801. Even in this case, the returned medicine 2 is easily guided toward the lower side along the sloping portion 6*b* because the sloping portion 6*b* is configured to be the steep slope, thereby preventing the returned medicine 2 from being rotated. Namely, the returned medicine 2 is stored into the storing tray 5 with keeping the state that the label 3 is positioned on the upper side. At this time, the barcode of the label 3 is kept at the position where the barcode of the label 3 is directed toward the diagonal upward direction, namely the barcode of the label 3 is positioned so as to face the barcode reader 812. With this configuration, it becomes possible to collate the returned medicine 2 with the prescription data of the returned medicine 2 stored in the storing tray 5 in the dispensing operation described below. In this regard, an inclination angle T of the sloping portion 6*b* with respect to the horizontal direction is set to fall within the range of 50° to 80°. If the inclination angle T is smaller than 50°, there is a possibility that the returned medicine 2 is rotated when the returned medicine 2 makes contact with the sloping portion 6*b*. If the inclination angle T is larger than 80°, the diameter of the body portion of the returned medicine 2 which can be stored in the arrangement groove 7 is limited. In this embodiment, the inclination angle T is preferably set to be 65°. By setting the inclination angle T to be 65°, it is possible to prevent the type of the returned medicine 2 which can be stored in the arrangement groove 7 from being limited and store the returned medicine 2 with preventing the returned medicine 2 from being rotated around the axial line A thereof.

Further, it may be possible to facilitate that the returned medicine 2 is easily slid with respect to the sloping portion 6*b* by reducing a roughness degree of a surface of the storing tray 5. With this configuration, it is possible to more prevent the returned medicine 2 from being rotated. Furthermore, a vibration damping rubber may be provided between the storing tray 5 and the holding frame 502 to suppress vibration and relative displacement between the storing tray 5 and the holding frame 502. With this configuration, even if the storing tray 5 is moved in the upper and lower directions by the lifting mechanisms 505, it is possible to suppress the vibration caused by this up-an-down movement from being transmitted to the returned medicine 2 on the storing tray 5. The vibration damping rubber may be attached to one or both of the storing tray 5 and the holding frame 502.

Further, at least a part of the storing tray 5 on a surface side on which the returned medicine is to be stored (the upper side in the drawings) is black in color. With this configuration, it is prevented that the presence of the returned medicine 2 is mistakenly detected when light emitted from the presence detecting sensor 820, which is the reflecting type photoelectric sensor, is reflected on the storing tray 5 even though any returned medicine 2 does not exist on the storing tray 5. Further, a shock-absorbing material such as a sponge may be attached to a part of the storing tray 5 on a back surface side (the lower side in the drawings). With this configuration, by pressing the shock-absorbing material onto the storing tray 5 provided below the storing tray 5 on which the shock-absorbing material is attached, it is possible to limit movement such as rotation and shift of the returned medicine 2 on the storing tray 5 provided in the lower stage, thereby easily keeping the position of the returned medicine 2 with keeping the state that the label surface of the returned medicine 2 is directed toward the upper side.

(Dispensing Part)

The dispensing part 600 includes a conveying mechanism 601. The conveying mechanism 601 transfers the dispensing tray 8 from an inlet port 602 schematically illustrated in FIG. 1 to a dispensing position (a position on the front side in the drawings for the storing part 500) to position the dispensing tray 8 and conveys the dispensing tray 8 after the dispensing operation has been completed from an outlet port 603 schematically illustrated in FIG. 1.

(Operations for Storing and Dispensing the Returned Medicine)

Description will be given to the operation (storing operation) for storing the returned medicine 2 whose identification by the identifying part 300 has completed into the storing part 500 and the operation (dispensing operation) for dispensing the returned medicine 2 from the storing part 500 to the dispensing tray 8 arranged at the dispensing position in the dispensing part 600. The control device 1000 (drive control part) mainly controls and drives the identifying part 300, the storing part 500, the dispensing part 600 and the scalar type robot 800 to perform the storing operation and the dispensing operation.

First, description will be given to the storing operation.

The returned medicine 2 in the label reading part 302 is suctioned and held by the suctioning nozzle 801 of the scalar type robot 800. With respect to the returned medicine 2 suctioned and held by the suctioning nozzle 801, a storing area is defined according to at least the size of the returned medicine 2. Namely, a storing position of the returned medicine 2 (a position in the storing tray 8 at which the returned medicine 2 is to be stored) and a range occupied by the returned medicine 2 when the returned medicine 2 is stored are defined with respect to the returned medicine 2 suctioned and held by the suctioning nozzle 801 according to at least the size of the returned medicine 2. In this embodiment, the range occupied by the returned medicine 2 when the returned medicine 2 is stored in the storing area corresponds to the length L1 and the width W of the returned medicine 2. A range occupied at the time of storing the returned medicine 2 contains a margin for preventing the returned medicine 2 from interfering with other returned medicines 2. The plurality of storing trays 5 of the storing part 500 are searched to find which storing tray 5 and which arrangement groove 7 of the storing tray 5 can be used to store and arrange the returned medicine 2 suctioned and held by the suctioning nozzle 801 therein. According to this searching result, one of the storing trays 5 and one of the arrangement grooves 7 (the storing position of the returned medicine 2) in which the returned medicine 2 is to be stored are decided. Focusing on the one of the storing trays 5, in the case where the "third" arrangement groove 7 has been already occupied by the other returned medicine 2 as shown in FIG. 25, the arrangement grooves 7 other than the third arrangement groove 7 become candidates for the storing position at which the returned medicine 2 suctioned by the suctioning nozzle 801 is to be stored. For example, in the case of focusing on the "sixth" groove, although two returned medicines 2 have been already arranged in the sixth groove, the sixth groove can be the candidate for arranging the returned medicine 2 suctioned and held by the suctioning nozzle 801 if a length between these two returned medicines 2 is equal to or longer than the above-described range occupied at the time of storing the returned medicine 2 for the returned medicine 2 being stored.

As described above, when the identification by the label reading part 302 completes, the returned medicine 2 takes the posture in which the label 3 is directed toward the upper side. The suctioning nozzle 801 of the scalar type robot 800 suctions and holds the returned medicine 2 with keeping the posture of the returned medicine 2 in which the barcode of the label 3 is directed toward the upper side to transfer and place the returned medicine 2 into the appropriate arrangement groove 7 of the appropriate storing tray 5, that is into the storing area decided as described above.

As described with referring to FIGS. 21 and 22, the storing part 500 is configured to be capable of forming the gap G between the holding frames 502 by using the lifting mechanisms 505. Thus, the suctioning nozzle 801 of the scalar type robot 800 being suctioning and holding the returned medicine 2 can freely access the storing tray 5 held by any one of the holding frames 502 arranged in the multiple stages to place the suctioned and held returned medicine 2 on the storing tray 5.

Further, as described with reference to FIGS. 23A to 24C, the storing tray 5 of the storing part 500 contains the three types storing trays 5A to 5C having the different sizes. Thus, the control device 1000 can control the identifying part 300, the storing part 500 and the scalar type robot 800 to store the returned medicine 2 whose identification has completed into the storing part 500 which is set according to the shape, the size, the type and the like of the returned medicine 2 without the limitation on the size of the returned medicine 2 to be stored.

Regarding the returned medicines 2 stored in the storing part 500, the control device 1000 stores the described storing area for each of the returned medicines 2 in a state that the storing area for each of the returned medicines 2 is associated with the identification information of each of the returned medicines 2. Namely, the control device 1000 stores information on the storing trays 5 and the positions of the storing trays 5 (the arrangement grooves 7 and the positions on the arrangement grooves 7) at which the returned medicines 2 have been arranged in a state that the storing area for each of the returned medicines 2 is associated with the identification information of each of the returned medicines 2. Further, the control device 1000 stores the type and the expiration date of each of the returned medicines 2 in a state that the type and the expiration date of each of the returned medicines 2 are associated with the identification information of each of the returned medicines 2.

Next, description will be given to the dispensing operation.

The suctioning nozzle 801 of the scalar type robot 800 suctions and holds the returned medicine 2 from the storing tray 5 of the storing part 500 to transfer and place the returned medicine 2 onto the storing tray 5 arranged at the dispensing position.

The dispensing operation is performed based on the prescription data received by the returned medicine supplying apparatus 1 from the host system which is the electronic health record system, for example. As described above, the type and the expiration date of each of the returned medicines 2 stored in the storing part 500 and the identification data of each of the returned medicines 2 are stored in a state that the type and the expiration date of each of the returned medicines 2 are associated with the identification data of each of the returned medicines 2, and the positions in the storing part 500 where each of the returned medicines 2 is stored are also stored in a state that the positions are associated with the identification data of each of the returned medicines 2. Specifically, the control device 1000 includes the medicine master storing the type, the expiration date and the storing area of each of the returned medicines 2 stored in the storing part 500 and the identification data of each of the returned medicine 2 in a state that the type, the expiration date and the storing area are associated with the identification data. In addition, since the gap G can be formed between the adjacent storing trays 5 arranged in the multiple stages as described above, the suctioning nozzle 801 can freely suction and hold even the returned medicine 2 stored in any one of the storing trays 5 arranged in the multiple stages as required. Thus, as a result of referring to the medicine master, if it is confirmed that the medicine contained in the prescription data is the returned medicine 2 stored in the storing part 500, it is possible to dispense the returned medicine 2 according to the prescription data without any limitations. Further, it is possible to efficiently dispense the returned medicine 2 according to the prescription data, that is, for example, it is possible to dispense one of the returned medicines 2 whose expiration date is earliest among the same type of the returned medicines 2. Furthermore, as a result of referring to the medicine master, if it is confirmed that the medicine contained in the prescription data is not stored in the storing part 500, it is possible to perform a process such as a process of allowing the display 1002 of the control panel 1001 to display necessary information.

The behaviors of the dispensing operation will be specifically described. The suctioning nozzle 801 of the scalar type robot 800 accesses the returned medicine 2 to be dispensed (in the following description for the dispensing operation, this returned medicine 2 is referred to as a dispensed medicine) through the gap G formed by the lifting mechanisms 505. At this time, the control device 1000 uses the barcode reader 812 to detect the label of this dispensed medicine 2 to collate whether or not this dispensed medicine 2 is the dispensed medicine 2 to be dispensed. In the case where it is confirmed that this dispensed medicine 2 is the dispensed medicine 2 to be dispensed, this dispensed medicine 2 is suctioned by the suctioning nozzle 801 to take this dispensed medicine 2 from the storing tray 5 and transfer this dispensed medicine 2 to the dispensing tray 8. At this time, in the case where a plurality of dispensed medicines 2 to be dispensed exist in the storing part 500, the control device 1000 decides one of the dispensed medicines 2 whose expiration date is earliest as the dispensed medicine 2 to be dispensed and controls so as to dispense this one of the dispensed medicines 2.

On the other hand, in the case where the control device 1000 determines that this dispensed medicine 2 is not the dispensed medicine 2 to be dispensed or the case where the label 3 (the barcode) cannot be identified, the control device 1000 uses the suctioning nozzle 801 to suction this dispensed medicine 2 and controls so as to transfer this dispensed medicine 2 to the label reading part 302 of the identifying part 300. In the case where the label 3 of this dispensed medicine 2 is identified in the label reading part 302, this dispensed medicine 2 is again stored in the storing part 500 by the scalar type robot 800. On the other hand, in the case where the label 3 of this dispensed medicine 2 is not identified in the label reading part 302, this dispensed medicine 2 is transferred to the non-stored medicine arrangement part 400 (the non-stored medicine arrangement boxes 401, 402) by the orthogonal type robot 700. Alternatively, in the case where this dispensed medicine 2 matches the dispensed medicine 2 to be dispensed, this dispensed medicine 2 may be directly transferred to the dispensing tray 8 by the scalar type robot 800.

In this regard, the control device 1000 controls so as to perform the dispensing operation in preference to the storing operation. With this configuration, it is possible to achieve quick dispensing. Further, in the case where a plurality of dispensed medicines 2 are dispensed, the plurality of dispensed medicines 2 may be transferred from the storing part 500 to the dispensing part 600 one by one or the plurality of dispensed medicines 2 may be transferred to the dispensing part 600 at one time by utilizing the support tray 900 as a buffer. Namely, the plurality of dispensed medicines 2 to be dispensed may be temporarily placed from the storing part 500 onto the support tray 900 and the plurality of dispensed medicine 2 may be transferred from the support tray 900 to the dispensing part 600 at one time. With this configuration, it becomes unnecessary that the scalar type robot 800 reciprocates between the storing part 500 and the dispensing part 600 several times corresponding to the number of the dispensed medicines 2 to be dispensed, thus it is possible to perform the dispensing operation in a short time. Further, even in the case where the dispensing tray 8 does not exist in the dispensing part 600, by utilizing the support tray 900 as the buffer, it becomes unnecessary to stop the dispensing operation. Thus, it is possible to efficiently perform the dispensing operation.

Figure 26A:
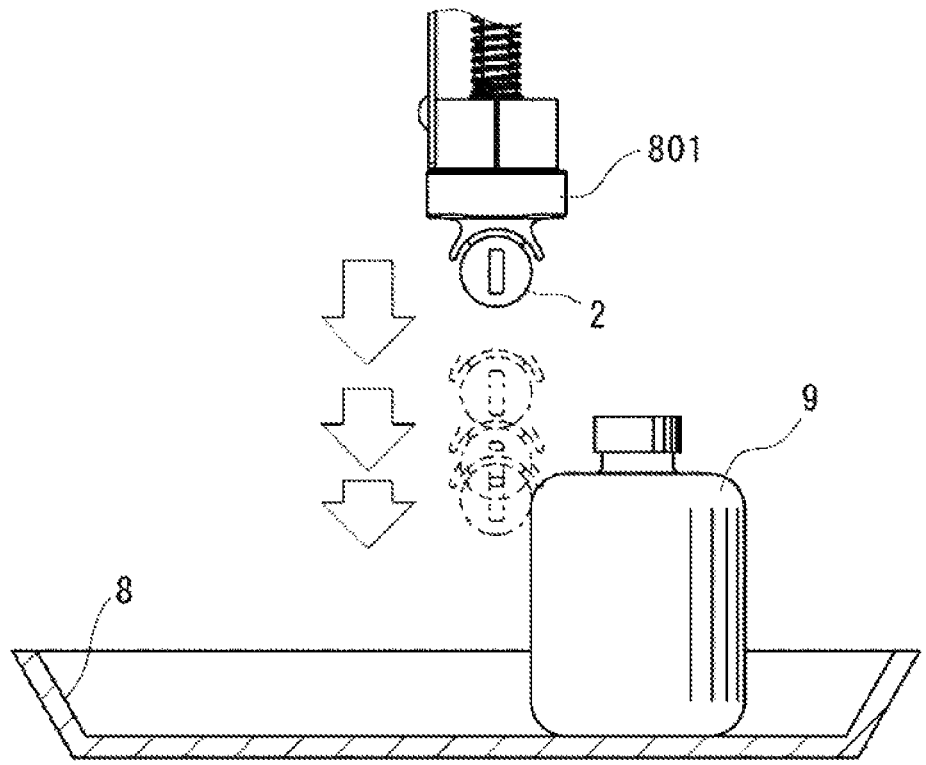
FIG. 26A is a view showing an operation in which the scalar type robot transfers the returned medicine to the returned goods tray.
Figure 26B:
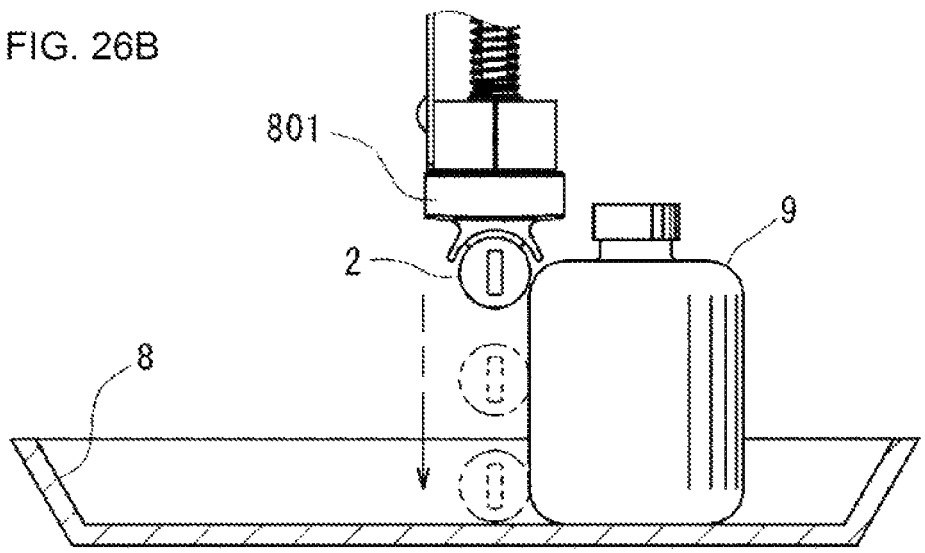
FIG. 26B is a view showing a state that the returned medicine is stored in the returned goods tray from a state shown in FIG. 26A.

Further, in the case where the medicine such as a large size bottle has been already placed on the dispensing tray 8, the scalar type robot 800 is controlled by the control device 1000 so that the scalar type robot 800 approaches to the dispensing tray 8 with decreasing the speed of the scalar type robot 800. The control device 1000 may use a medicine presence detecting sensor (not shown in the drawings) to detect that the medicine such as the large size bottle has been already placed on the dispensing tray 8 or may detect that the medicine such as the large size bottle has been already placed on the dispensing tray 8 from the prescription data received by the returned medicine supplying apparatus 1 from the host system which is the electric health record system, for example. With this configuration, as shown in FIGS. 26A and 26B, even if the dispensed medicine 2 softly makes contact with the medicine such as the large size bottle and the dispensed medicine 2 being dispensed is unintentionally released from the suctioning nozzle 801 by this contact, it is possible to store this dispensed medicine 2 on the dispensing tray 8. In other words, it is prevented that this dispensed medicine 2 falls out from the dispensing tray 8 due to a strong contact between the large size bottle or the like and the dispensed medicine 2 being suctioned and held by the suctioning nozzle 801 caused when the suctioning nozzle 801 approaches to the dispensing tray 8 without decreasing the speed of the suctioning nozzle 801.

(Scanning Operation)

Next, description will be given to a scanning operation. The scanning operation means an operation performed for confirming that the returned medicine (or the dispensed medicine) 2 does not exist on the storing tray 5. For example, the scanning operation is performed when the user directly accesses the storing tray 5. Here, the case where the user directly accesses the storing tray 5 means a case where the user manually and directly takes the returned medicine 2 from the storing tray 5 other than the dispensing operation based on the prescription data. For example, the case where the user directly accesses the storing tray 5 includes a case where the returned medicine 2 is broken and this returned medicine 2 cannot be suctioned by the suctioning nozzle 801, a case where the returned medicine 2 whose expiration date has already expired is removed, a case where a plurality of returned medicines 2 are taken from the storing tray 5 at one time and the like.

Figure 4:
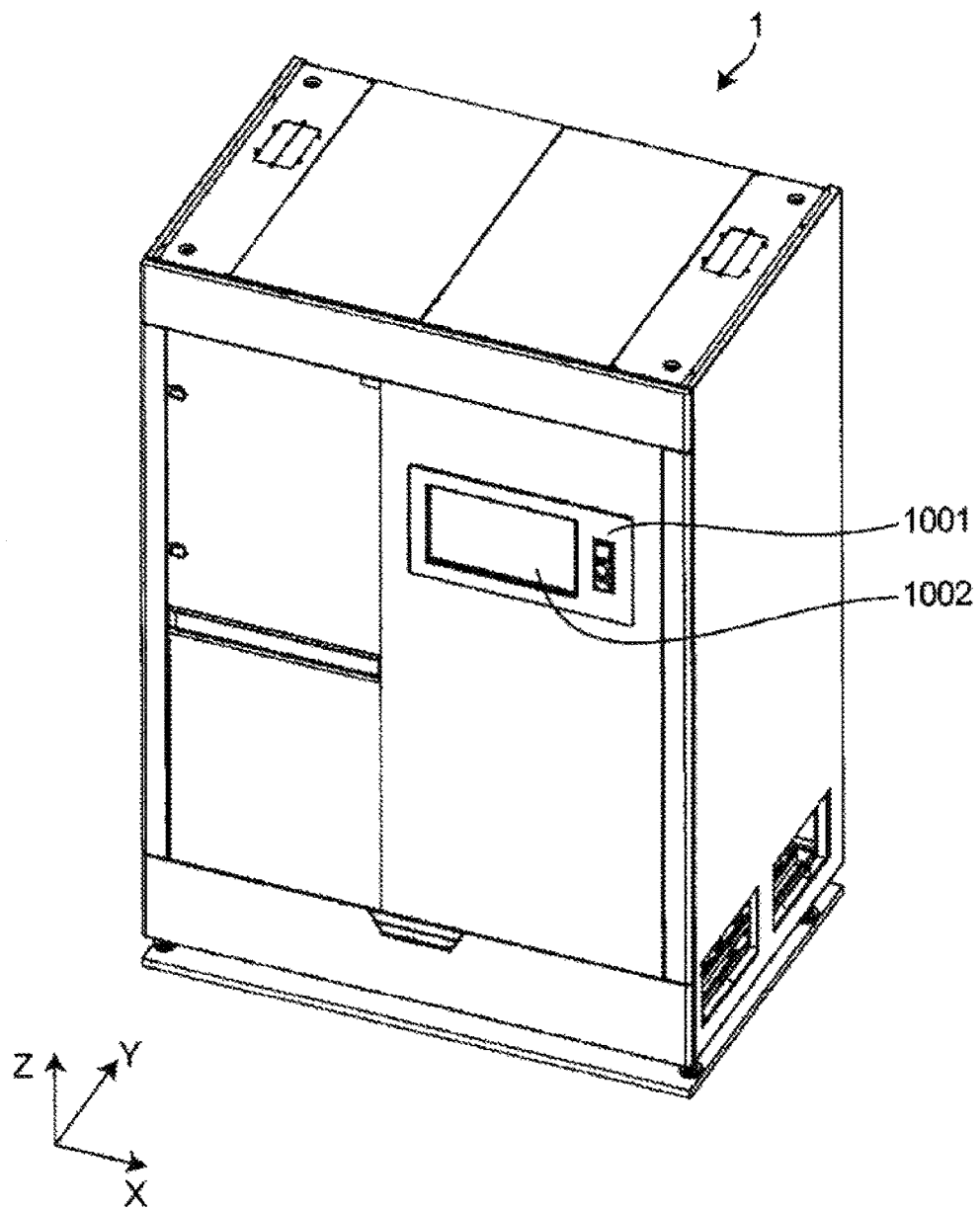
FIG. 4 is a perspective view showing an external view of the returned medicine dispensing apparatus according to the embodiment of the present invention.
Figure 5:
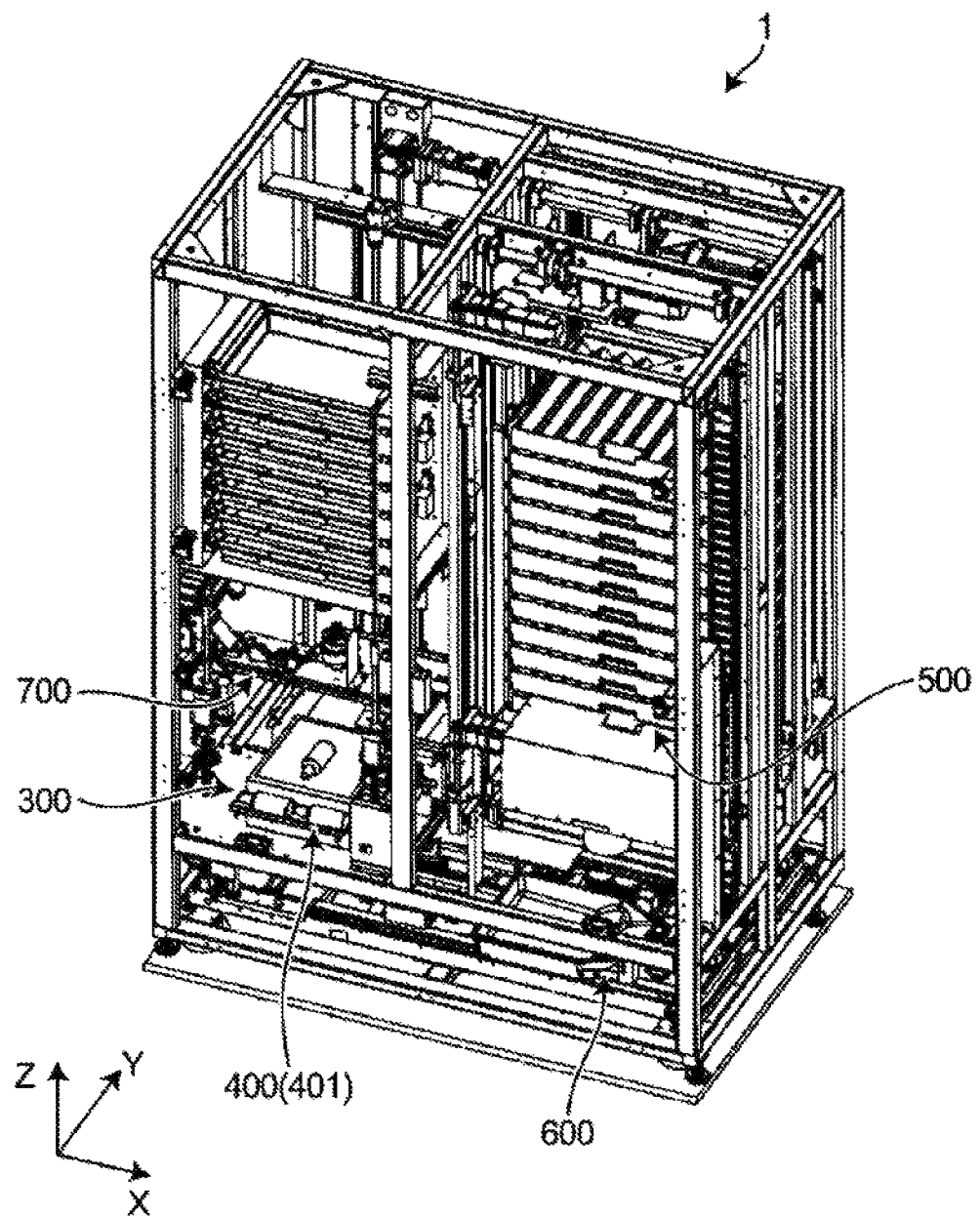
FIG. 5 is a perspective view of the returned medicine dispensing apparatus in a state that an external panel is removed.
Figure 6:
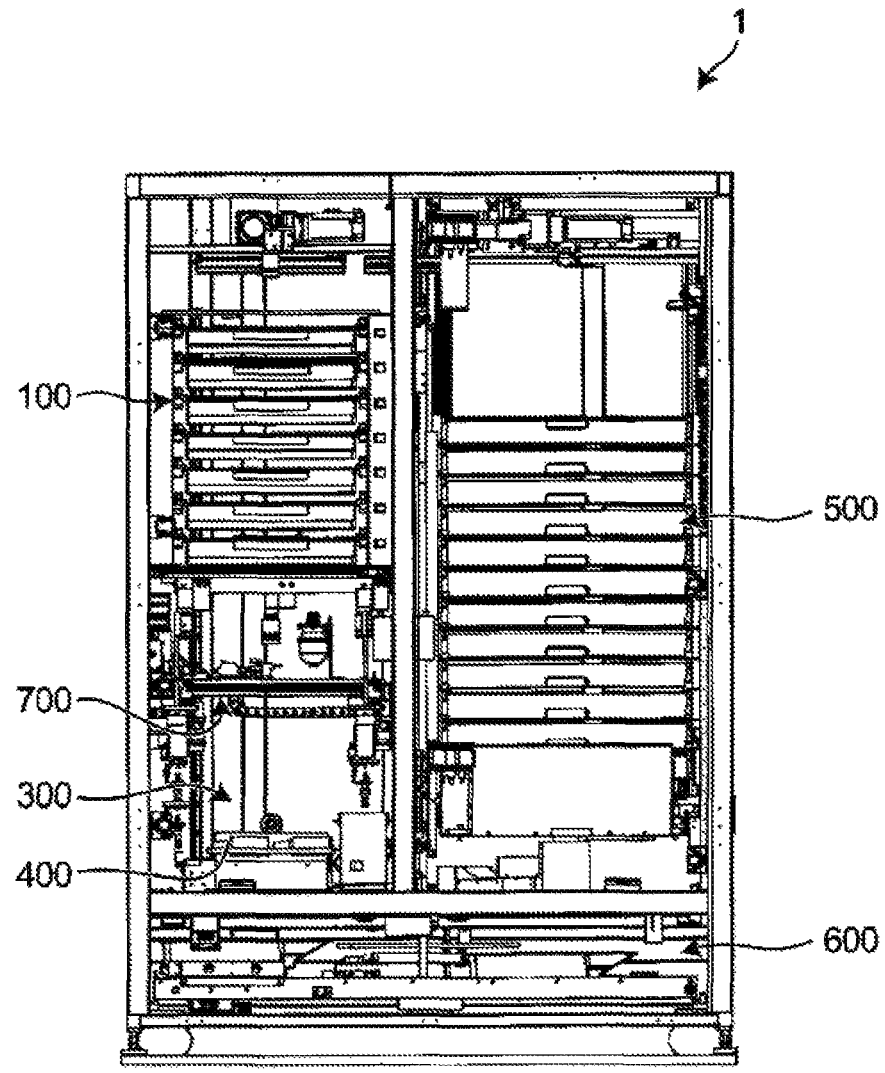
FIG. 6 is a front view of the returned medicine dispensing apparatus in the state that the external panel is removed.

In this case, by opening and closing an exterior panel illustrated in FIG. 4, the user can directly access the target storing tray 5. At this time, it is required that all of the returned medicines 2 on the target storing tray 5 are taken by the user. The reason for this matter is that there is a possibility that the positions of the labels and the positions of the returned medicines 2 which are not removed are changed by the direct access of the user if only some of the returned medicines 2 are removed from the target storing tray 5, and in this case, there is a case where the returned medicines 2 whose positions are changed cannot well suctioned in the subsequent dispensing operation. Namely, in the case where the user directly accesses the storing tray 5, this operation is performed so that all of the returned medicines 2 on the storing tray 5 are removed and the scanning operation is an operation performed for confirming that all of the returned medicines 2 are removed from the storing tray 5 directly accessed by the user. Further, the control device 1000 does not allow a new returned medicine 2 to be stored in the storing tray 5 manually accessed until the scanning operation for this storing tray 5 completes and it is confirmed that the returned medicine 2 does not exist on this storing tray 5. With this configuration, it is possible to prevent the new returned medicine 2 from being stored in the storing tray 5 in a state that it is unclear whether or not the returned medicine 2 remains on the storing tray 5.

At the time of performing the scanning operation, the suctioning nozzle 801 of the scalar type robot 800 accesses the storing tray 5 on which the scanning operation is to be performed through the gap G formed by the lifting mechanisms 505. At this time, by scanning the light emitted from the presence detecting sensor 820 provided at the suctioning nozzle 801 on the storing tray 5 and receiving the light reflected when the returned medicine 2 exists on the storing tray 5 with the presence detecting sensor 820, the presence/absence of the returned medicine 2 on the storing tray 5 is detected. In this regard, since the surface side of the storing tray 5 on which the returned medicine 2 is to be stored is black in color as described above, it is possible to prevent the mistaken detection of the returned medicine 2 caused when the light emitted from the presence detecting sensor 802 is reflected on the surface of the storing tray 5 and received by the presence detecting sensor 802.

Further, the scanning operation is set to be performed on the target storing tray 5 separately for each arrangement groove 7. Namely, all of the arrangement grooves 7 on the storing tray 5 are not collectively detected at one time. For example, as shown in FIG. 27, the scanning operation is performed on the first arrangement groove 7 and then the scanning operation is performed on the second arrangement groove 7 after the dispensing operation or the storing operation is performed. In other words, the scanning operation is set so as to be performed while the dispensing operation or the storing operation is not being performed. With this configuration, it is possible to preferentially perform the dispensing operation and the storing operation.

The scanning operation to each arrangement groove is performed by scanning the arrangement groove in a zigzag pattern along an extending direction of the arrangement groove. Specifically, as shown as a scanning track D1 on the first arrangement groove 7 in FIG. 27, the presence detecting sensor 820 is set to scan the arrangement groove 7 in the zigzag pattern along the arrangement groove 7 so as to substantially correspond to the width of each returned medicine 2. For example, the scanning track D1 scans each arrangement groove 7 in the zigzag pattern with inclining with respect to the extending direction of the arrangement groove 7 so as to travel 20 mm in a direction across the arrangement groove 7 while traveling 15 mm in the extending direction of the arrangement groove. With this configuration, for example, even in the case where the returned medicine 2 remains on the storing tray 5, this returned medicine 2 is black in color by which it is difficult to detect the reflected light and the label 3 is not positioned on the upper side, the scanning track D1 in the zigzag pattern enables the light to be reflected on the label 3 which is not positioned on the upper side and enables the reflected light from this label 3 to be received. Thus, it is possible to reliably detect the returned medicine 2 remaining on the storing tray 5.

Namely, if the scanning operation is performed so that the arrangement groove 7 is linearly scanned along the extending direction of the arrangement groove 7 (shown as a scanning track D2 in the drawing) and the label of the returned medicine 2 which is black in color is positioned at a position shifting from the upper side, this returned medicine 2 cannot be detected. However, by allowing the presence detecting sensor 820 to scan in the zigzag pattern, it is possible to detect the display label even if the display label is not position on the upper side and shifts to the lateral side, thereby reliably detecting the presence/absence of the returned medicine 2 even if the returned medicine 2 is black in color.

As described above, according to the returned medicine supplying apparatus 1 of this embodiment, it is possible to automatically identify the returned medicines 2 having a variety of different characteristics such as the type, the shape, the size and the expiration date and supplied in the non-aligned state to store the returned medicines 2 with ensuring a high degree of freedom and freely dispense the returned medicines 2 according to the prescription data.

Further, since each storing tray 5 of the storing part 500 does not require that each storing tray 5 is drawn in the horizontal direction at the time of storing the returned medicine 2, the space for drawing each storing tray 5 becomes unnecessary. As a result, it is possible to construct the storing part 500 in a compact size. Furthermore, since the returned medicine 2 is stored on the storing tray 5 in a state that the storing area in which the returned medicine 2 is to be stored is associated with the type of the returned medicine 2, it is possible to store a variety of returned medicines 2 on each storing tray 5. With this configuration, it becomes unnecessary to prepare the storing trays 5 according to the types of each medicine, thereby suppressing the increase of the number of the required storing trays 5. For example, it is possible to store a variety of returned medicines 2 having different characteristics and contained in the returned goods tray 4 in a careless way into each storing tray 5 of the storing part 500 so that each of the returned medicines 2 can be taken from the storing part 500. In addition, it is possible to store even medicines other than the returned medicines 2, which are, for example, a plurality of medicines having the same characteristics and supplied as stocks, into each storing tray 5 of the storing part 500 so that each of the medicines can be taken from the storing part 500. Further, in this apparatus, since the scalar type robot 800 takes the returned medicine 2 into or from the storing tray 5, the storing tray 5 does not require a cover and a discharging mechanism. In addition, by arranging the storing trays 5 in the multiple stages, the upper adjacent storing tray 5 can serve as the cover of the lower adjacent storing tray 5. Thus, it is possible to construct each of the storing trays 5 in a compact size so that the height of each of the storing trays 5 corresponds to the height of the returned medicine in the radial direction thereof. Thus, it is possible to make the storing part 500 compact.

Further, the storing tray 5 is not drawn and thus force in the horizontal direction is not applied to the returned medicine 2 stored in the storing tray 5. With this configuration, it is possible to keep the direction and the posture of the returned medicine 2 stored in the storing tray 5 as it is at the time of storing the returned medicine 2, particularly, keep the barcode of the label 3 at the diagonal upward position so as to face the barcode reader. As a result, it is possible to facilitate the collation of the returned medicine 2 on the storing tray 5 to dispense the returned medicine 2. Further, in the case where the dispensing operation is performed based on the prescription information, it is possible to allocate the barcode of the dispensed medicine 2 to perform the inerrable dispensing operation. Furthermore, since the dispensed medicine 2 whose expiration date is earliest among the dispensed medicines 2 to be dispensed is dispensed, it is possible to perform the efficient dispensing operation. With this configuration, it is achieved that the operator can store the returned medicines 2 without considering information required for medicine management such as the type and the expiration date of the medicine.

Hereinafter, more detailed description will be given to the temporarily placing part 301 and the label reading part 302 of the identifying part 300 of the returned medicine supplying apparatus 1 according to the returned medicine supplying apparatus 1 of this embodiment.

First, in the identifying part 300, the shape, the size, the type and the expiration date (characteristics) of the returned medicine 2 are identified. Specifically, the shape and the size of the returned medicine 2 are identified on the temporarily placing part 301 of the identifying part 300 and the type and the size of the returned medicine 2 are identified in the label reading part 302. Then, based on the identifying result for these characteristics, the control device 1000 (the determination processing part) determines whether or not the returned medicine 2 is a medicine to be treated by the returned medicine supplying apparatus 1.

In this regard, the medicine "to be treated" used herein means a medicine having at least a shape and a size which the returned medicine supplying apparatus 1 can structurally treat and belonging to a type preliminarily determined by the user as a type of medicine to be treated by the returned medicine supplying apparatus 1.

(Identification of the Shape and the Size of the Medicine)

As described above, on the temporarily placing part 301 of the identifying part 300, the shape and the size of the returned medicine 2 are identified (information on the shape and the size is obtained). For this purpose, the returned medicine 2 is placed on a placing surface 305a of the semi-transparent plate 305 (a plane surface on the side of the camera 307) so that the longitudinal axis of the returned medicine 2 is parallel to the placing surface 305a as shown in FIGS. 1 and 13. Then, the returned medicine 2 placed on the semi-transparent plate 305 is photographed by the camera 307 provided on the upper side of the semi-transparent plate 305 in a state that the light is emitted from the lower side by the lighting part 306 arranged on the lower side of the semi-transparent plate 305.

The control device 1000 is configured to obtain the information on the shape and the size of the returned medicine 2 based on the image photographed by the camera 307. Namely, the control device 1000 serves as a part of the identifying part 300 (a first medicine information obtaining part) for identifying the shape and the size of the returned medicine 2.

Further, the control device 1000 is configured to perform an image processing on the image of the camera 307 in which the returned medicine 2 is shown in order to obtain the information on the shape and the size of the returned medicine 2 (the control device 1000 includes an image processing part). For example, as the image processing performed on the image of the camera 307, an edge detecting process for detecting edges of a form of the returned medicine 2 shown in the image of the camera 307 and a binarization process for binarizing (black-and-white forming) the image of the camera 307 are performed. Based on an image subjected to the edge detecting process and an image subjected to the binarization process, the control device 1000 obtains the information on the shape and the size of the returned medicine 2.

Further, the control device 1000 is configured to determine whether or not the shape of the returned medicine 2 is a shape of the medicine to be treated by the returned medicine supplying apparatus 1 based on the obtained shape of the returned medicine 2.

For example, there is a case where the returned medicine 2 to be returned through the returned goods tray 4 contains a medicine having a shape engaging between the endless belt 308 and the roller 309 in the label reading part 302, a medicine having a shape which cannot be held by the scalar type robot 800 and a medicine having a shape which cannot be stored in the storing part 500, that is a medicine having a shape which cannot be treated by the returned medicine supplying apparatus 1 due to a structural reason thereof. As one example of such a medicine, a medicine in a state that the medicine is contained in a bag body or a box body, a medicine partially broken, a medicine whose label is partially peeled, a medicine whose partially peeled label adheres to another medicine and the like can be considered. Since the medicine as described above cannot be treated by the returned medicine supplying apparatus 1 due to the structural reason thereof, the medicine is treated as a medicine not to be treated (treated as a non-stored medicine).

Description will be given to one example of a method for determining the shape of the returned medicine 2 based on the image of the camera 307 (the image subjected to the image processing).

Figure 28A:
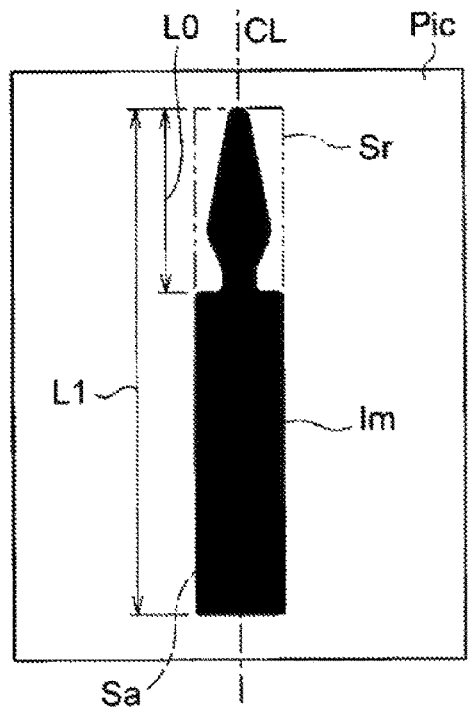
FIG. 28A is a view showing an image of a camera subjected to a binarization process, in which the returned medicine to be treated is shown.
Figure 28B:
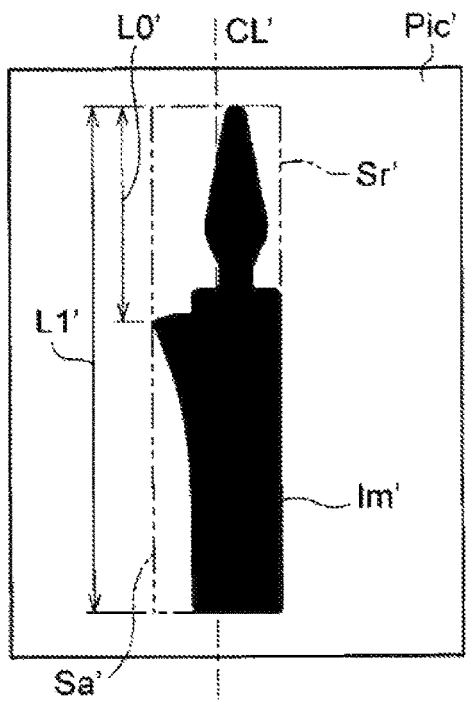
FIG. 28B is a view showing another image of the camera subjected to the binarization process, in which the returned medicine not to be treated is shown.

FIGS. 28A and 28B respectively show binarized images. FIG. 28A shows a binarized image Pic in which a form (black-painted form) Im of the returned medicine 2 having an ampule shape which is the shape of the medicine to be treated by the returned medicine supplying apparatus 1 is shown. FIG. 28B shows a binarized image Pic' in which a form (black-painted form) Im' of the returned medicine 2 having an ampule shape whose label 3 is partially peeled, that is a shape of the medicine not to be treated, is shown.

First, the control device 1000 extracts a rectangular area Sr (Sr') circumscribing the black-painted form Im (Im') in the image Pic (Pic') of the camera 307. Next, the control device 1000 calculates a center line CL (CL') of the rectangular area Sr (Sr') extending in a longitudinal direction of the rectangular area Sr (Sr') (a direction in which a longer side Sa (Sa') extends). Then, the control device 1000 determines whether or not the black-painted form Im (Im') has a shape which is symmetrical based on the center line CL (CL').

In the case of the image Pic of FIG. 28A, since the black-painted form Im has a shape which is symmetrical with respect to the center line CL, the control device 1000 determines that the shape of the returned medicine 2 shown in the image Pic is the shape of the medicine to be treated. On the other hand, in the case of the image Pic' of FIG. 28B, since the black-painted form Im' has a shape which is asymmetric with respect to the center line CL', the control device 1000 determines that the shape of the returned medicine 2 shown in the image Pic' is the shape of the medicine not to be treated.

Further, an alternative or additional determination method includes a method of extracting a portion which does not make contact with the black-painted form Im from the longer side Sa of the rectangular area Sr to calculate a length L0 of this portion. Namely, a length of a head portion 2*d* of the returned medicine 2 is calculated. By comparing this length L0 with a length (that is a total length of the returned medicine 2) L1 of the longer side Sa of the rectangular area Sr, it is possible to determine whether or not the shape of the returned medicine 2 shown in the image of the camera 307 is the shape of the medicine to be treated. For example, in the case where a ratio of the length of the head portion with respect to the total length of the medicine to be treated is in the range of 0.3 to 0.4 and a value of L0/L1 is in the range of 0.3 to 0.4, the shape of the returned medicine 2 shown in the image is the shape of the medicine to be treated.

Other than this, it is possible to determine whether or not the shape of the returned medicine 2 is the shape of the medicine to be treated based on a ratio of a square measure of the black-painted form Im with respect to a square measure of the rectangular area Sr.

Furthermore, it is also possible to preliminarily hold the shape of the medicine to be treated as data and collate this data about the shape with the shape of the returned medicine 2 shown in the image to determine the shape of the returned medicine 2 based on this collating result (similarity).

Figure 29:
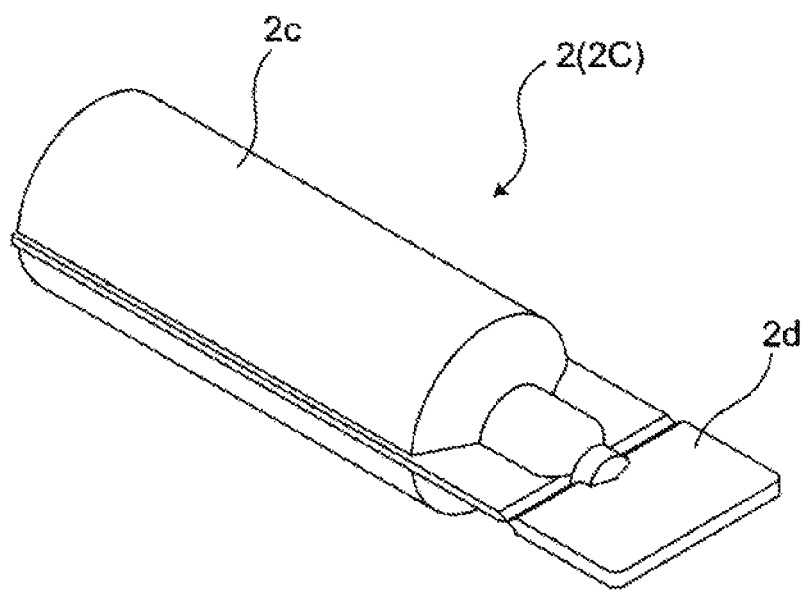
FIG. 29 is a perspective view of one example of a resin ampule.

In this regard, in the case of determining the resin ampule 2 (2C) as shown in FIG. 29, there is a possibility that the shape of the returned medicine 2 is determined as the shape of the medicine not to be treated. Namely, in the case of determining the resin ampule 2 (2C) including a body portion 2*c* whose cross-sectional surface is a circular shape (an ellipse shape or an oval shape) and a head portion 2*d* having a rectangular thin plate shape (or a square thin plate shape), there is a case where the shape of the returned medicine 2 is shown as a rectangular shape in the image-processed image of the camera 307. Thus, there is a case where the returned medicine 2 cannot be distinguished from the medicine contained in a box body having a rectangular parallelepiped shape.

In this case, it is utilized that the resin ampule 2 (2C) is transparent (or semi-transparent) and the box body is non-transparent. Namely, characteristics that light can be transmitted through the resin ampule 2 (2C) and cannot be transmitted through the box body are utilized.

Specifically, a luminance adjustment process for increasing a luminance of the image of the camera 307 in which the returned medicine 2 is shown is performed and then the processed image is binarized.

In the case where the returned medicine 2 shown in the image of the camera 307 is the transparent resin ampule 2 (2C), a central portion of the form of the returned medicine 2 shown in the image becomes a white spot (white halation occurs in the central portion) due to the luminance adjustment process for increasing the luminance.

When the binarization process is performed on the image after the adjustment process is performed, only a form of a profile shape of the returned medicine 2 remains in the image. Namely, a substantially frame-shaped form remains in the image. On the other hand, in the case of the box body, even if the luminance adjustment process is performed on the image, a form of the box body does not partially become a white spot and the form of the box body remains in the image as it is. Thus, even if the binarization process is performed on the image after the luminance adjustment process is performed, a rectangular shape form remains in the image. Therefore, by performing the binarization process on the image after the luminance adjustment process for increasing the luminance is performed on the image, it is possible to distinguish the transparent (or semi-transparent) resin ampule 2 (2C) from the box body based on this processed image.

After it is determined that the returned medicine 2 placed on the semi-transparent plate 305 of the temporarily placing part 301 has the shape of the medicine to be treated, the control device 1000 determines whether or not the size of the returned medicine 2 is a size of the medicine to be treated. For this purpose, the size of the returned medicine 2 is measured (calculated).

There is a case where the returned medicine 2 returned through the returned goods tray 4 contains, for example, a medicine having a size engaging between the endless belt 308 and the roller 309 in the label reading part 302, a medicine having a size which cannot be held by the scalar type robot 800 and a medicine having a size which cannot be contained in the storing part 500, that is a medicine having a size which cannot be treated by the returned medicine supplying apparatus 1 due to a structural reason of the returned medicine supplying apparatus 1. Since the returned medicine supplying apparatus 1 cannot treat the returned medicine as described above due to the structural reason thereof, the returned medicine is treated as the medicine not to be treated (treated as the non-stored medicine).

In this embodiment, in order to obtain information on the size of the returned medicine 2, a length of the returned medicine 2 in the longitudinal direction thereof (the extending direction of the axial line A) is first measured (calculated). Description will be given to a method for measuring (computing) the length of the returned medicine 2 in the longitudinal direction thereof.

Figure 30:
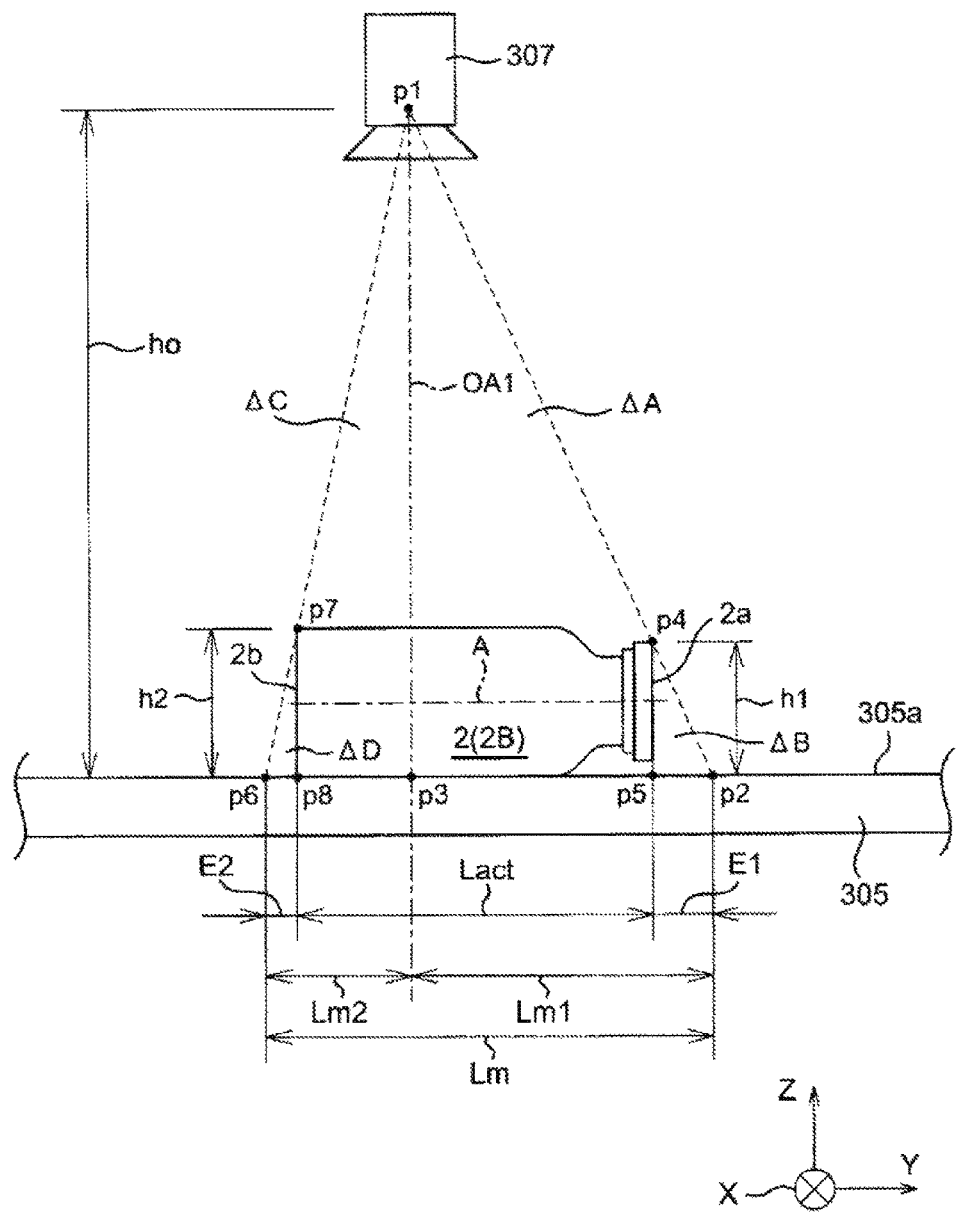
FIG. 30 is a view for explaining a method for measuring a size of the returned medicine.
Figure 31:
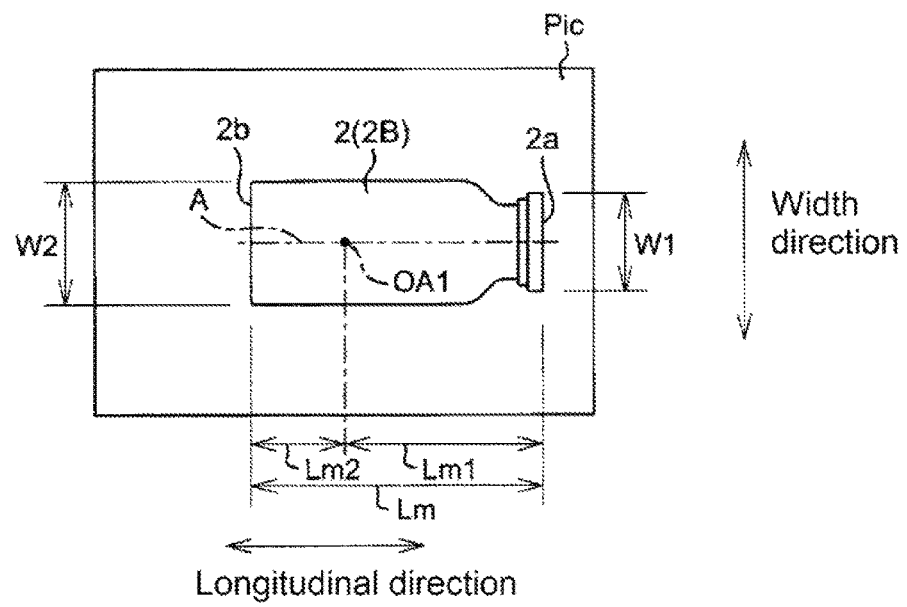
FIG. 31 is another view for explaining the method for measuring the size of the returned medicine.

Each of FIGS. 30 and 31 is a view for explaining the method for measuring (computing) the size of the returned medicine 2.

When the returned medicine 2 (the vial 2B) placed on the semi-transparent plate 305 is photographed by the camera 307 provided on the upper side of the returned medicine 2 as shown in FIG. 30, the returned medicine 2 is shown in the image Pic of the camera 307 as shown in FIG. 31. Based on a longitudinal direction length Lm and width direction lengths W1, W2 of the form of the returned medicine 2 shown in this image Pic, an actual length Lact of the returned medicine 2 in the longitudinal direction thereof (the extending direction of the axial line A) is calculated as the size of the returned medicine 2. Description will be given to a method for computing the actual length Lact of the returned medicine 2 in the longitudinal direction thereof based on the image Pic of the camera 307.

In the case where a cylindrical body such as the returned medicine 2 is photographed from a direction perpendicular to an axial line of the cylindrical body, an error between a size in the image and an actual size occurs in a size in an extending direction of the axial line of the cylindrical body. Specifically, the returned medicine 2 is shown in the image in a state that the size of the returned medicine 2 shown in the image is larger than the actual size of the returned medicine 2.

Thus, when the size of the returned medicine 2 in the longitudinal direction thereof (the extending direction of the axial line A) is calculated based on the image Pic of the camera 307, it is necessary to correct the size of the form of the returned medicine 2 in the longitudinal direction thereof in the image Pic. For this purpose, it is necessary to calculate errors E1, E2 between the size in the image Pic and the actual size. Description will be given to a method for calculating these errors E1, E2.

First, as shown in FIG. 31, the length Lm of the returned medicine 2 in the longitudinal direction thereof, the length (tip end side width) W1 of the tip end 2a in the width direction of the returned medicine 2 and the length (base end side width) W2 of the base end 2b in the width direction of the returned medicine 2 in the image Pic of the camera 307 are calculated.

In this regard, the longitudinal direction of the form of the returned medicine 2 in the image Pic of the camera 307 corresponds to an actual longitudinal direction of the returned medicine 2 on the semi-transparent plate 305 (the extending direction of the axial line A). Further, the width direction of the form of the returned medicine 2 in the image Pic corresponds to an actual radial direction of the returned medicine 2.

More specifically, a length (tip end side length) Lm1 between an optical axis OA1 of the camera 307 and the tip end 2a and a length (base end side length) Lm2 between the optical axis OA1 and the base end 2b are calculated as the longitudinal direction length of the form of the returned medicine 2 in the image Pic of the camera 307. A total of this tip end side length Lm1 and this base end side length Lm2 corresponds to the longitudinal direction length Lm of the form of the returned medicine 2 in the image Pic.

Based on the tip end side length Lm1, the base end side length Lm2, the tip end side width W1 and the base end side width W2 in the form of the returned medicine 2 in the image Pic of the camera 307, the errors E1, E2 between the longitudinal direction length Lm of the form of the returned medicine 2 in the image Pic and the actual longitudinal direction length Lact of the returned medicine 2 are calculated. For this purpose, geometry, specifically similarity of triangle is utilized.

As shown in FIG. 30, a triangle ΔA(p1-p2-p3) and a triangle ΔB(p4-p2-p5) are similar. Further, regarding the triangle ΔA, a length of a base of the triangle ΔA is the tip end side length Lm1 and a height h0 of the triangle ΔA is a distance between an imaging point p1 of the camera 307 and the placing surface 305a of the semi-transparent plate 305. On the other hand, regarding the triangle ΔB, a length of a base of the triangle ΔB is the error E1 and a height of the triangle ΔB is h1. As shown in the following formula 1, the height h1 is a total of a distance (W2−W1)/2 between a lowest end of the tip end 2a and the placing surface 305a of the semi-transparent plate 305 and the tip end side width W1.

[Formula 1]

$$h1 = W1 + \frac{W2 - W1}{2} \qquad \text{(Formula 1)}$$

In this regard, the formula 1 can be derived from the fact that the returned medicine 2 is the vial 2B. Namely, the formula 1 can be derived from the fact that each of end face shapes of the tip end 2a and the base end 2b of the returned medicine 2 is a circular plane surface.

Thus, based on the similarity relationship between the triangles ΔA, ΔB, the following formula 2 holds.

[Formula 2]

$$Lm1:h0 = E1:h1 = E1:\frac{W1 + W2}{2} \qquad \text{(Formula 2)}$$

In the same manner, a triangle ΔC(p1-p6-p3) and a triangle ΔD(p7-p6-p8) are similar. Further, regarding the triangle ΔC, a length of a base of the triangle ΔC is the base end side length Lm2 and a height h0 of the triangle ΔC is a distance between the imaging point p1 of the camera 307 and the placing surface 305a of the semi-transparent plate 305. On the other hand, regarding the triangle ΔD, a length of a base of the triangle ΔD is the error E2 and a height h2 of the triangle ΔD is the base end side width W2.

Thus, based on the similarity relationship between the triangles ΔC, ΔD, the following formula 3 holds.

[Formula 3]

$$Lm2:h0 = E2:h2 = E2:W2 \qquad \text{(Formula 3)}$$

In the formulas 1 to 3, the tip end side length Lm1, the base end side length Lm2, the tip end side width W1 and the base end side width W2 are calculated based on the image Pic of the camera 307 in which the returned medicine 2 is shown. Further, since the height h0 is the distance between the imaging point p1 of the camera 307 and the placing surface 305a of the semi-transparent plate 305, the height h0 is constant and known. By using these values and the formulas 1 to 3, it is possible to calculate the error E1 on the side of the tip end 2a and the error E2 on the side of the base end 2b.

By subtracting these calculated errors E1, E2 from the longitudinal direction length Lm (Lm1+Lm2) of the form of the returned medicine 2 in the image Pic of the camera 307, it is possible to calculate the actual length Lact of the returned medicine 2 in the longitudinal direction length thereof (the extending direction of the axial line A).

When the actual length of the returned medicine 2 in the longitudinal direction thereof (the extending direction of the axial line A) is calculated as described above, it is possible to calculate actual sizes of other portions of the returned medicine 2 based on the information on the shape of the returned medicine 2 obtained before. For example, in the case where the returned medicine 2 is the vial 2B, it is possible to calculate an actual outer diameter of the body portion 2c.

Regarding the calculation of the actual length of the returned medicine 2 in the longitudinal direction thereof as described above, accuracy of the calculation is high in the case where each of the end face shapes of the tip end 2a and the base end 2b of the returned medicine 2 is the circular plane surface as is the case for the vial 2B. Thus, in the case where the returned medicine 2 is the ampule 2A or the resin ampule 2C, it is necessary to slightly change the method for calculating the actual length of the returned medicine 2 in the longitudinal direction thereof.

For example, in the case where the returned medicine 2 is the ampule 2A, since the head portion 2d of the ampule 2A has a shape tapering toward the tip end 2a, the tip end 2a is not a plane surface but a point. Thus, it is impossible to calculate the tip end side width W1 from the form of the ampule 2A in the image of the camera 307. Namely, it is impossible to calculate the height h1 on the tip end side of the returned medicine 2 (2A) by using the formula 1, the tip end side width W1 and the base end side width W2 described above. Therefore, in the case where the returned medicine 2 is the ampule 2A, the height h1 on the tip end side is defined as shown in the following formula 4 by using the base end side width W2.

[Formula 4]

$$h1 = \frac{W2}{2} + \alpha \qquad \text{(Formula 4)}$$

In the formula 4, $\alpha$ is a constant value and can be experimentally or empirically obtained. For example, the constant value $\alpha$ is 1 mm. By using the formula 4, the formula 2 and the formula 3, even in the case where the returned medicine 2 is the ampule 2A, it is possible to calculate the actual length Lact of the returned medicine 2 in the longitudinal direction thereof (the extending direction of the axial line A) based on the image of the camera 307 in which this ampule 2A is shown.

Further, even in the case where the returned medicine 2 is the resin ampule 2C having the head portion 2d of the rectangular thin plate shape (or the square thin plate shape) as shown in FIG. 29, it is possible to calculate the actual length Lact of the returned medicine 2 in the longitudinal direction thereof (the extending direction of the axial line A) in the same manner as the case where the returned medicine 2 is the ampule 2A and this is preferable. The reason for this matter is that the tip end side width W1 in the image of the camera 307 varies depending on an inclination of the thin plate-shaped head portion 2d with respect to the placing surface 305a of the semi-transparent plate 305 in the case where the returned medicine 2 is the resin ampule 2C. Thus, it is preferable to consider the tip end side width W1 as a function of the base end side width W2 in the same manner as the case where the returned medicine 2 is the ampule 2A.

Further, as described above, there is a possibility that the resin ampule 2C is placed on the semi-transparent plate 305 in a state that the thin plate-shaped head portion 2d is not parallel to the placing surface 305a of the semi-transparent plate 305 (in a state that the thin plate-shaped head portion 2d is slightly inclined with respect to the placing surface 305a of the semi-transparent plate 305). When taking account of this case, it is preferable that the longitudinal direction length Lm (that is the tip end side length Lm1 and the base end side length Lm2) in the form of the resin ampule 2C in the image of the camera 307 is measured at a central point of the form in the width direction thereof.

Further, in order to measure (calculate) the actual length Lact of the returned medicine 2 in the longitudinal direction thereof, it is preferable that the returned medicine 2 is positioned on the placing surface 305a of the semi-transparent plate 305 so that the optical axis OA1 of the camera 307 and the returned medicine 2 cross each other. In particular, it is preferable that the returned medicine 2 is positioned with respect to the semi-transparent plate 305 so that the optical axis OA1 of the camera 307 and the axial line A of the returned medicine 2 orthogonally cross each other.

Figure 32:
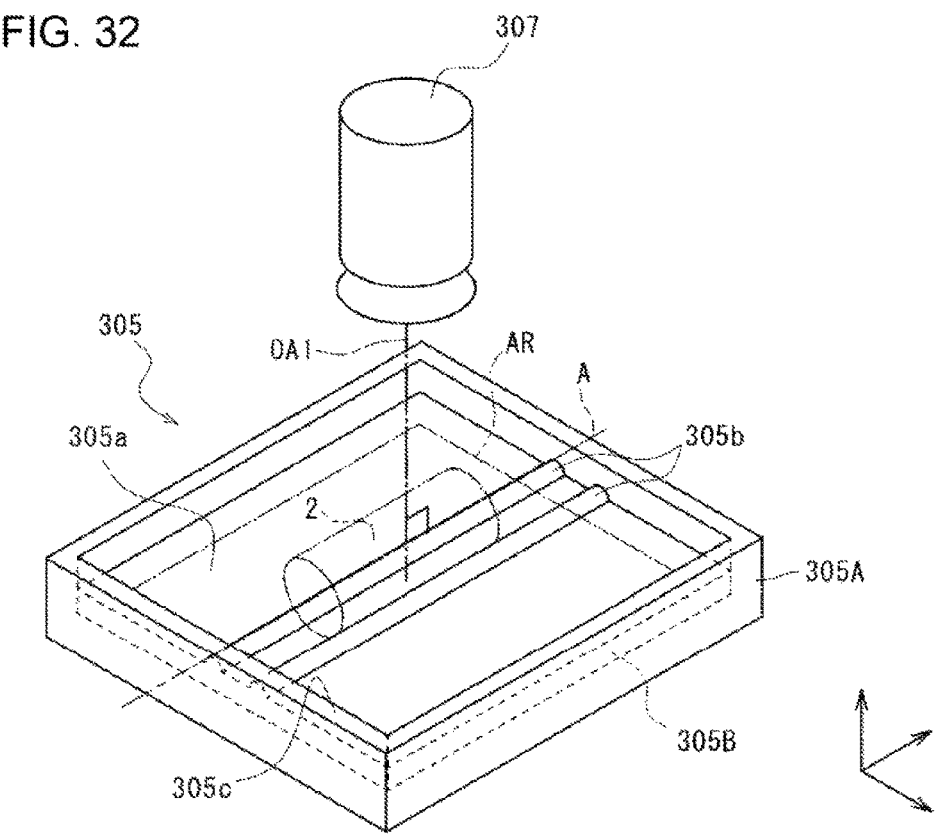
FIG. 32 is a perspective view showing a semi-transparent plate of the identifying part.

For example, FIG. 32 is a perspective view of the semi-transparent plate (medicine placing plate) 305 on which an uneven portion is formed as a positioning portion for positioning the returned medicine 2.

In this embodiment, the semi-transparent plate 305 is constituted of a semi-transparent base plate 305A and a transparent positioning plate 305B placed on the base plate 305A and having the placing surface 305a on which the returned medicine 2 is to be placed. The base plate 305A has a frame body 305c upwardly extending from a peripheral portion of the positioning plate 305B to prevent the returned medicine 2 from falling out from the placing surface 305a.

The positioning plate 305B is detachably attached to the base plate 305A. Further, the positioning plate 305B has a pair of linear protruding portions 305b for positioning the returned medicine 2 with respect to the semi-transparent plate 305 so that the optical axis OA1 of the camera 307 and the axial line A of the returned medicine 2 placed on the placing surface 305a orthogonally cross each other. The pair of linear protruding portions 305b parallel extends with being spaced apart from each other and protrudes toward the side of the camera 307 from the placing surface 305a. When the returned medicine 2 is arranged between the pair of protruding portions 305b, a peripheral surface of the body portion 2c of the returned medicine 2 makes contact with the pair of protruding portions 305b. With this configuration, the returned medicine 2 is positioned with respect to the placing surface 305a of the semi-transparent plate 305 in a state that the axial line A of the returned medicine 2 orthogonally crosses with the optical axis OA1 of the camera 307.

Figure 33:
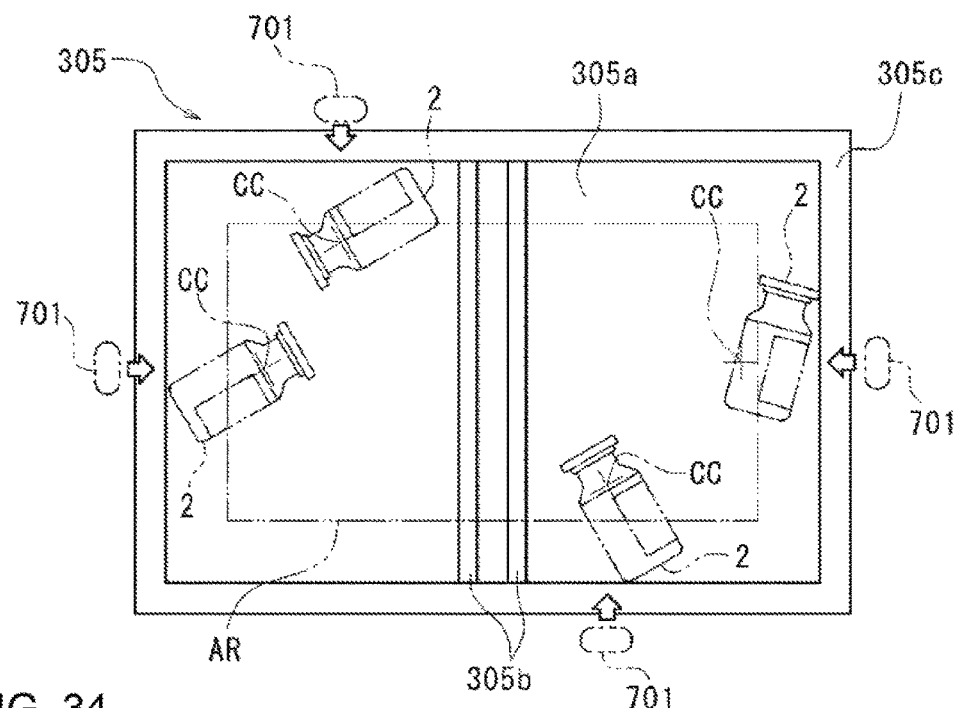
FIG. 33 is a planar view of a temporarily placing part which shows a state that the returned medicine protrudes from an analysis range.

Further, an analysis range AR for analyzing the position, the direction, the shape and the size of the returned medicine 2 based on the image of the camera 307 is defined on the positioning plate 305B (the placing surface 305a). The analysis range AR is defined at a position on the placing surface 305a separating from the frame body 305c toward the center side by a predetermined distance. Namely, in a state that the returned medicine 2 is placed on the placing surface 305a and positioned by the protruding portions 305b, the entire of the returned medicine 2 is normally positioned within the analysis range AR. However, there is a case where the returned medicine 2 is arranged so that the axial line of the returned medicine 2 is inclined with respect to an extending direction of the protruding portions 305b when the returned medicine 2 is transferred from the returned goods tray 4 to the temporarily placing part 301. This case is caused when a detection error of the picking position of the returned medicine 2 in the returned goods tray 4 or a direction error of the axial direction occurs, for example. Referring to FIG. 33 showing a planar view of the temporarily placing part 301, in this case, the returned medicine 2 is not positioned by the protruding portions 305b and rolls down from the protruding portions 305b to the peripheral frame body 305c. As a result, the returned medicine 2 protrudes out of the analysis range AR and the entire of the returned medicine 2 is not positioned within the analysis range AR. This results in that the control device 1000 cannot accurately analyze the shape and the size of the returned medicine 2.

Figure 34:
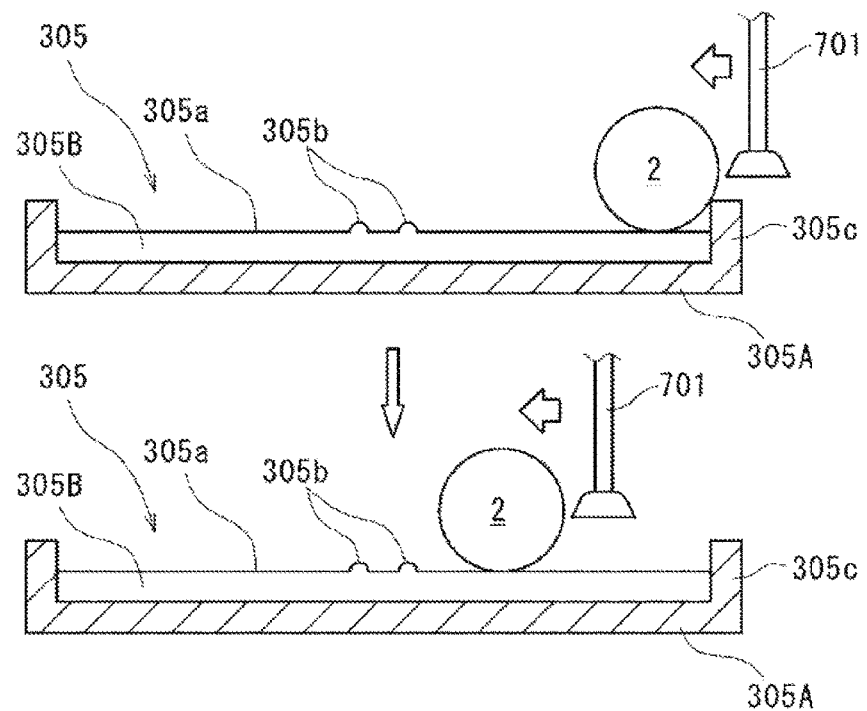
FIG. 34 is an explanatory view showing a method for transferring the returned medicine into the analysis range by using a transferring part.

Referring to FIG. 34 showing a lateral cross-sectional view of the temporarily placing part 301, in order to respond this case, the control device 1000 is configured to drive the orthogonal type robot 700 to transfer the returned medicine 2 toward the center side of the analysis range AR with the suctioning nozzle 701 and analyze the direction of the returned medicine 2 in the analysis range AR to re-position the returned medicine 2 between the protruding portions 305b. Hereinafter, with reference to a flow chart diagram of FIG. 35, description will be given to one example of the flow for determining whether or not the returned medicine 2 transferred to the temporarily placing part 301 is positioned by the protruding portions 305b and re-positioning the returned medicine 2 in the case where the returned medicine 2 is not positioned by the protruding portions 305b.

Figure 35:
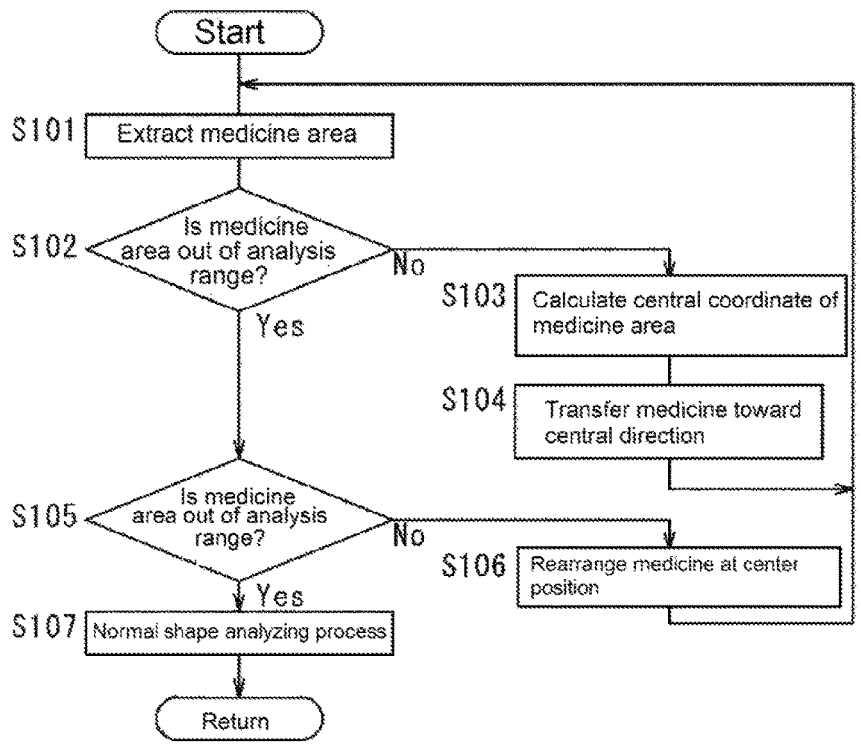
FIG. 35 is a flow chart diagram showing a flow from a step of determining whether or not the returned medicine is positioned on the temporarily placing part to a step of re-positioning the returned medicine in the case where the returned medicine is not positioned.

First, as shown in FIG. 35, at a step S101, the control device 1000 extracts a medicine area as an area in which the returned medicine 2 is to be positioned based on the image of the camera 307.

Next, at a step S102, the control device 1000 determines whether or not an entire of the medicine area is positioned within the analysis range AR. In the case where the entire of the medicine area is positioned within the analysis range AR, the process shifts to a step S105. In the case where the entire of the medicine area is not positioned within the analysis range AR, the process shifts to a step S103.

Next, at the step S103, the control device 1000 analyzes an area of the medicine area positioned within the analysis range AR to calculate a central coordinate CC of this area.

Next, at a step S104, the control device 1000 controls the orthogonal type robot 700 to transfer the returned medicine 2 so that the entire of the returned medicine 2 is positioned within the analysis range AR. Specifically, as shown in FIGS. 33 and 34, the returned medicine 2 is pushed from the outer side to the center portion of the base plate 305A by the suctioning nozzle 701 to transfer the returned medicine 2 to the central coordinate CC calculated at the step S103.

On the other hand, in the case of determining that the entire of the medicine area is positioned within the analysis range AR at the step S102, the control device 1000 determines whether or not the returned medicine 2 is positioned by the protruding portions 305b based on the image of the camera 307 at a step S105. Namely, at the step S105, the control device 1000 determines whether or not the returned medicine 2 is positioned at a center position of a backlight based on the image of the camera 307. In the case where the returned medicine 2 is positioned at the center of the backlight, the process shifts to a step S107. In the case where the returned medicine 2 is not positioned at the center of the backlight, the process shifts to a step S106.

At the step S106, the control device 1000 detects the direction of the returned medicine 2 based on the image of the camera 307 and controls the orthogonal type robot 700 to suction the returned medicine 2 with the suctioning nozzle 701 and position the returned medicine 2 between the protruding portions 305b. At this time, the returned medicine 2 is placed so that the central axial line A of the returned medicine 2 is directed along the extending direction of the protruding portions 305b. With this configuration, the returned medicine 2 is positioned by the protruding portions 305b.

After the returned medicine 2 is transferred into the analysis range AR at the step S104 and after the returned medicine 2 is positioned by the protruding portions 305b at the step S106, the medicine area is again extracted at the step S101.

Then, in the case of determining that the medicine area is positioned within the analysis range AR at the step S102 and determining that the returned medicine 2 is positioned at the center of the backlight at the step S105, the control device 1000 performs a normal shape analyzing process for subjecting the returned medicine 2 positioned on the placing surface 305a by the protruding portions 305b to an analyzing process for the shape and the size of the returned medicine 2 base on the image of the camera 307 at the step S107.

In this regard, the positioning portion formed on the semi-transparent plate 305 is not limited to the pair of linear protruding portions 305b shown in FIG. 32 as long as it can position the returned medicine 2 with respect to the semi-transparent plate 305 (that is the optical axis OA1 of the camera 307). For example, the uneven portion for positioning the returned medicine 2 may be a groove.

Further, the semi-transparent plate 305 may be constituted of one semi-transparent plate instead of constituting the semi-transparent plate 305 with the base plate 305A and the positioning plate 305B. In this case, the uneven portion for positioning the returned medicine 2 is formed on the one plate. However, in the case where the semi-transparent plate 305 is constituted of the base plate 305A and the positioning plate 305B, by preparing a plurality of positioning plates including different uneven portions having different shapes for positioning the returned medicine 2, this enables the returned medicine supplying apparatus 1 to treat medicines having a more variety of shapes and sizes.

In the case where the control device 1000 determines that the shape and the size of the returned medicine 2 identified on the temporarily placing part 301 of the identifying part 300 are the shape and the size of the medicine to be treated, the returned medicine 2 is conveyed to the label reading part 302 adjacent to the temporarily placing part 301 as shown in FIG. 13 by the orthogonal type robot 700.

On the other hand, the returned medicine 2 whose shape is determined to be the shape of the medicine not to be treated or the returned medicine 2 whose size is determined to be the size of the medicine not to be treated even if the shape of the returned medicine 2 is determined to be the shape of the medicine to be treated is transferred and placed onto the non-stored medicine arrangement boxes 401, 402 of the non-stored medicine arrangement part 400 or the returned goods tray 4 for the non-stored medicine as the non-stored medicine 2'.

(Decision of the Suctioning Position)

Next, description will be given to the method for calculating the suctioning position for the returned medicine 2 (the position where the returned medicine 2 is suctioned by the suctioning nozzle 701 of the orthogonal type robot 700 or the suctioning nozzle 801 of the scalar type robot 800) based on the image photographed by the camera 307 of the temporarily placing part 301 (namely, based on the information on the shape and the size of the returned medicine 2 obtained as described above) with reference to FIGS. 36 to 38.

Figure 36:
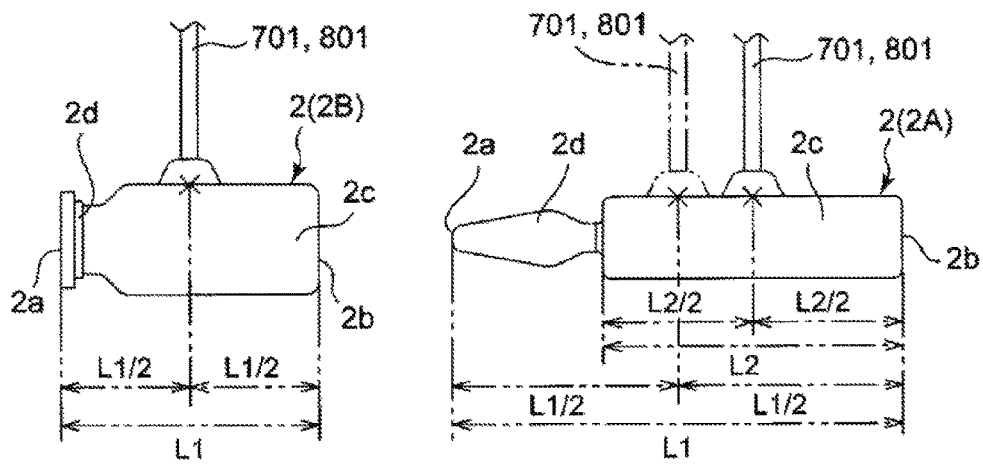
FIG. 36 is a schematic view showing a concept of a suctioning position.

Referring to FIG. 36, since the vial 2B has a relatively small protruding amount of the head portion 2d from the body portion 2c and a small difference between the diameters of the body portion 2c and the head portion 2d, a weight balance at the time of suctioning the vial 2B with the suctioning nozzle 701 or 801 is good when a substantially intermediate position of the length (total length L1) is set as a suctioning position SP. Namely, in the case of suctioning the vial 2B, by setting the substantially intermediate position of the total length L1 as the suctioning position SP, it is possible to stabilize the holding for the vial 2B by the suctioning nozzle 701 or 801.

Keeping referring to FIG. 36, since the ampule 2A has a relatively large protruding amount of the head portion 2d from the body portion 2c and a large difference between the diameters of the body portion 2c and the head portion 2d, a weight balance at the time of suctioning the ampule 2A with the suctioning nozzle 701 or 801 is not good when a substantially intermediate position of the length (total length L1) is set as the suctioning position SP. In the case of suctioning the ampule 2A, by setting not the substantially intermediate position of the total length L1 but a substantially intermediate position of a length L2 of the body portion 2c as the suctioning position SP, the weight balance at the time of suctioning the ampule 2A with the suctioning nozzle 701 or 801 becomes good. Namely, in the case of suctioning the ampule 2A, by setting the substantially intermediate position of the length L2 of the body portion 2c as the suctioning position SP, it is possible to stabilize the holding for the ampule 2A by the suctioning nozzle 701 or 801. This point can be applied to the case of suctioning the resin ampule 2C.

For the reasons stated above, the suctioning position SP for the returned medicine 2 is calculated based on the image photographed by the camera 307 of the temporarily placing part 301 according to the following procedures.

Figure 38:
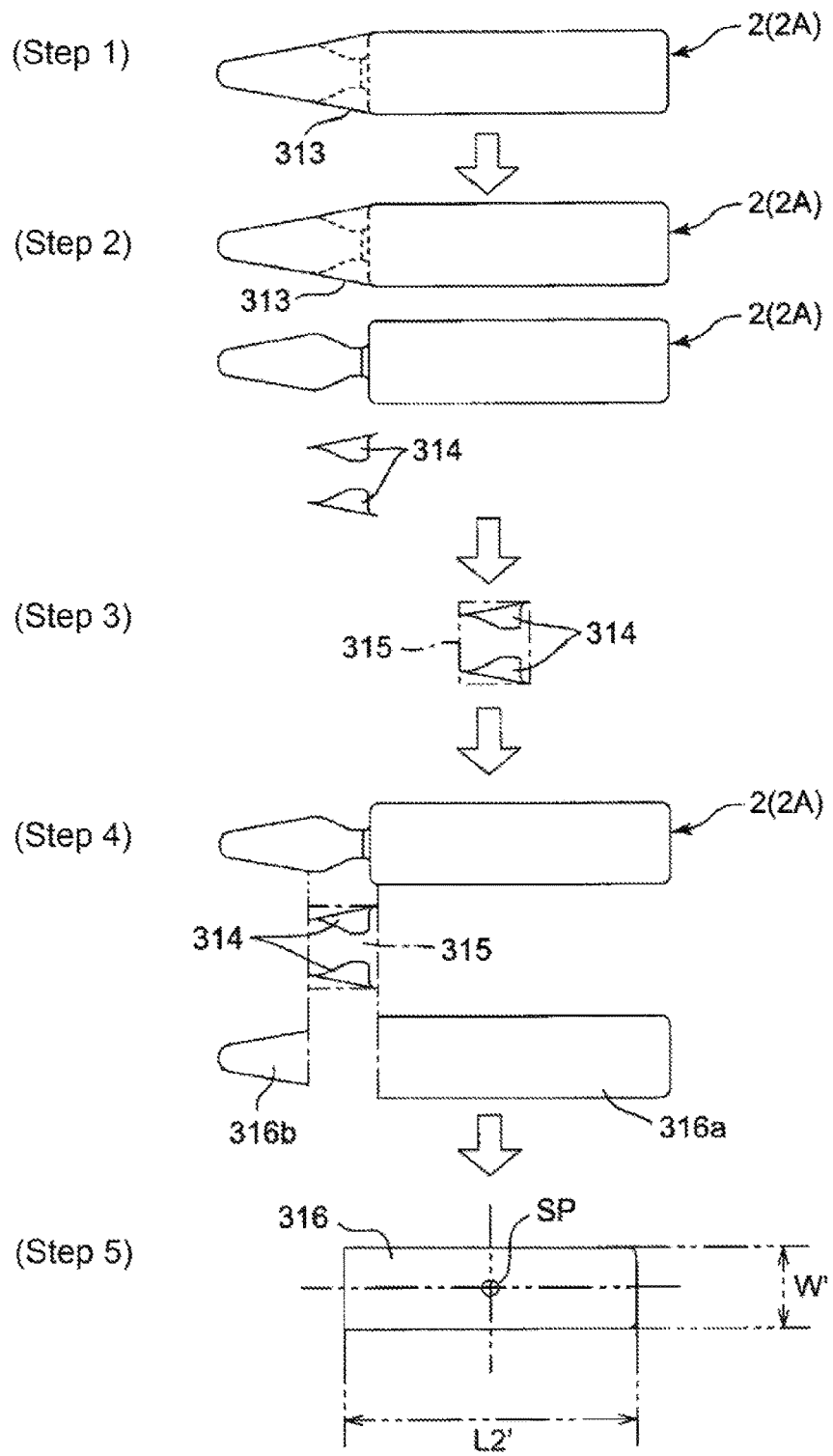
FIG. 38 is a schematic view showing a method for deciding the suctioning position in the case where the degree of convexity is high.

First, an envelope (or a circumscribing rectangle) 313 with respect to an external profile shape of the image (the image of the returned medicine 2 in planar view) photographed by the camera 307 is defined (a step 1 in FIGS. 37 and 38). Further, a degree of convexity is calculated from this envelope 313 (the step 1 in FIGS. 37 and 38). A value of the degree of convexity approaches to 1 as a ratio of straight lines in the envelope 313 surrounding the returned medicine 2 increases. Namely, this means the fact that the difference between the diameters of the body portion 2c and the head portion 2d becomes small and a difference between the diameter of a neck portion of the body portion 2c connecting the body portion 2c and the head portion 2d and the diameter of the head portion 2d becomes small as the value of the degree of convexity (an maximum value thereof is 1) increases.

If the calculated value of the degree of convexity is equal to or more than a predetermined threshold value (for example, the threshold value can be set to be in the range of 0.8 to 0.9), it is possible to determines that the returned medicine 2 photographed by the camera 307 has a shape which can be estimated to be the vial 2B. Thus, a position located at an intermediate position of the total length L1 and an intermediate position of the width W is set as the suctioning position SP (a step 2 in FIG. 37).

If the calculated value of the degree of convexity is less than the predetermined threshold value described above, it is possible to determine that the returned medicine 2 photographed by the camera 307 has a shape which can be estimated to be the ampule 2A (or the resin ampule 2C), the following process is performed for setting an intermediate position of the length L2 of the body portion 2c as the suctioning point SP.

First, the envelope (or the circumscribing rectangle) 313 is compared with the external profile shape of the image of the returned medicine 2 to extract a waist portion 314 corresponding to the neck portion (a portion whose diameter partially reduces) between the body portion 2c and the head portion 2d (a step 2 in FIG. 38).

Next, a rectangular area 315 surrounding the extracted waist portion 314 with straight lines is created (a step 3 in FIG. 38).

After that, two areas 316a, 316b are created by removing the rectangular area 315 from the external profile shape of the image of the returned medicine 2 (a step 4 in FIG. 38). These areas 316a, 316b correspond to areas other than the waist portion 314 of the external profile shape of the image of the returned medicine 2. Further, one of these areas 316a, 316b corresponds to the body portion 2c of the returned medicine 2 and the other of these areas 316a, 316b corresponds to the head portion 2d of the returned medicine 2. Square measures of the areas 316a, 316b are compared with each other to remain one whose square measure is larger (corresponding to the body portion 2c) as a target to be processed and remove the other whose square measure is smaller (corresponding to the head portion 2d) from the target to be processed. In this example, since the square measure of the area 316a is larger than the square measure of the area 316b, the area 316a remains as the target to be processed.

Finally, a position located at an intermediate position of a length L2' of the area 316a (corresponding to the length L2 of the body portion 2c of the ampule 2A) and an intermediate position of a width W' (corresponding to the width W of the body portion 2c of the ampule 2A) is set as the suctioning position SP (a step 5 in FIG. 38).

According to the described procedures, it is possible to automatically decide the suctioning position SP at which the returned medicine 2 can be stably held by the suctioning nozzle 701 or 801 based on the image photographed by the camera 307 of the temporarily placing part 301. As a result, the orthogonal type robot 700 can convey the returned medicine 2 placed on the semi-transparent plate 305 of the temporarily placing part 301 to the label reading part 302 in a state that the axial line A of the returned medicine 2 is parallel to the horizontal direction, thereby safely placing the returned medicine 2 on the endless belt 308 of the label reading part 302 of the identifying part 300 with avoiding that the tip end of the head portion 2d of the returned medicine 2 collides against the parts of the label reading part 302. Further, although details will be described below, the orthogonal type robot 700 can place the returned medicine 2 on the endless belt 308 so that the base end 2b of the returned medicine 2 placed on the endless belt 308 faces a stopper 317 of the label reading part 302.

Figure 39:
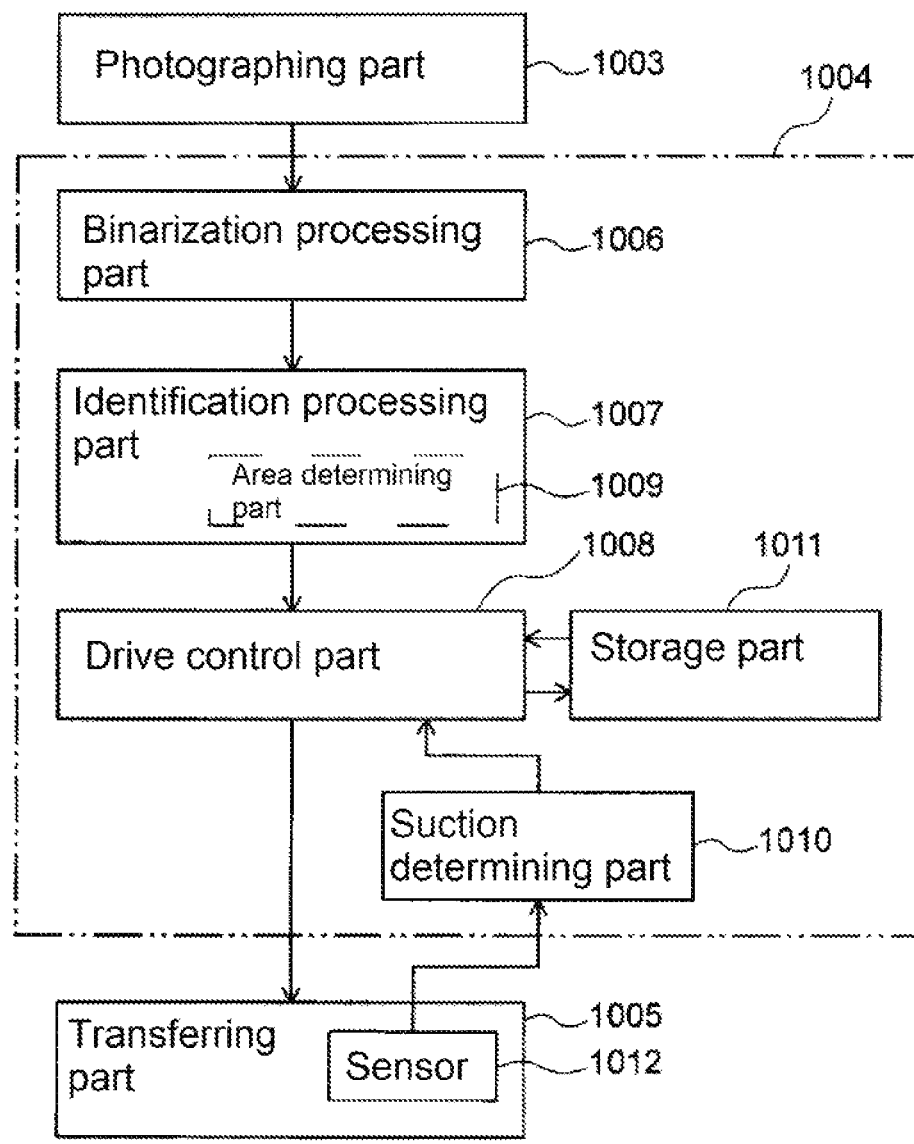
FIG. 39 is a schematic view of the identifying part.

FIG. 39 is a schematic view of the identifying part 300. The identifying part 300 includes a photographing part 1003, a control operation part 1004 and a transferring part 1005. The photographing part 1003 includes the camera 304 and a part having a function of transmitting image data photographed by the camera 304. The control operation part 1004 is contained in the control device 1000 and constituted of hardware containing a storage device such as a CPU (Central Processing Unit), a RAM (Random Access Memory) and a ROM (Read Only Memory) and software implemented on the hardware. The transferring part 1005 includes the orthogonal type robot 700.

Specifically, the image data photographed by the camera 304 in the photographing part 1003 is transmitted to the control operation part 1004 and the control operation part 1004 drives and controls the orthogonal type robot 700 of the transferring part 1005 based on this image data to suction and hold the returned medicines 2 in the returned goods tray 4 one by one and transfer the returned medicines 2 onto the semi-transparent plate 305 of the temporarily placing part 301 (see FIG. 13). The control operation part 1004 includes a binarization processing part 1006, an identification processing part 1007 and a drive control part 1008.

Figure 40A:
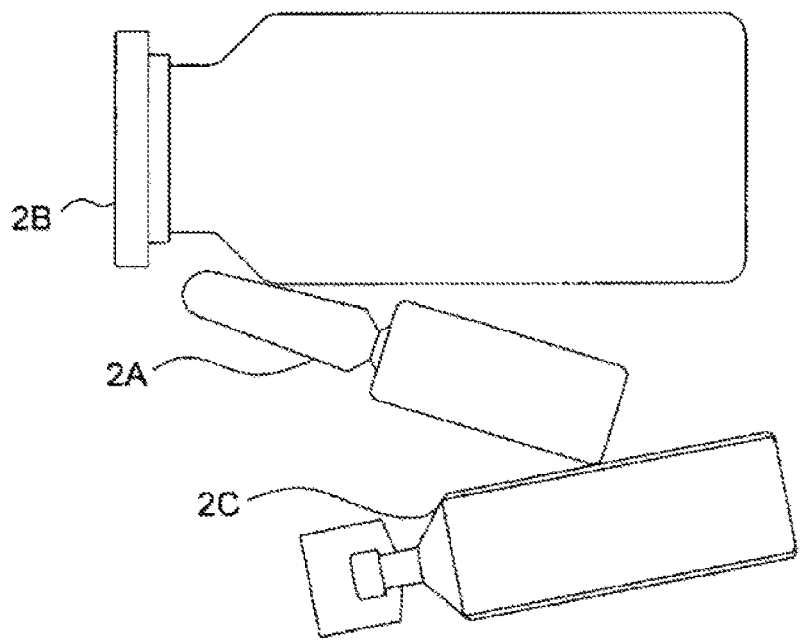
FIG. 40A is a schematic view showing an original image for explaining the binarization process.
Figure 40B:
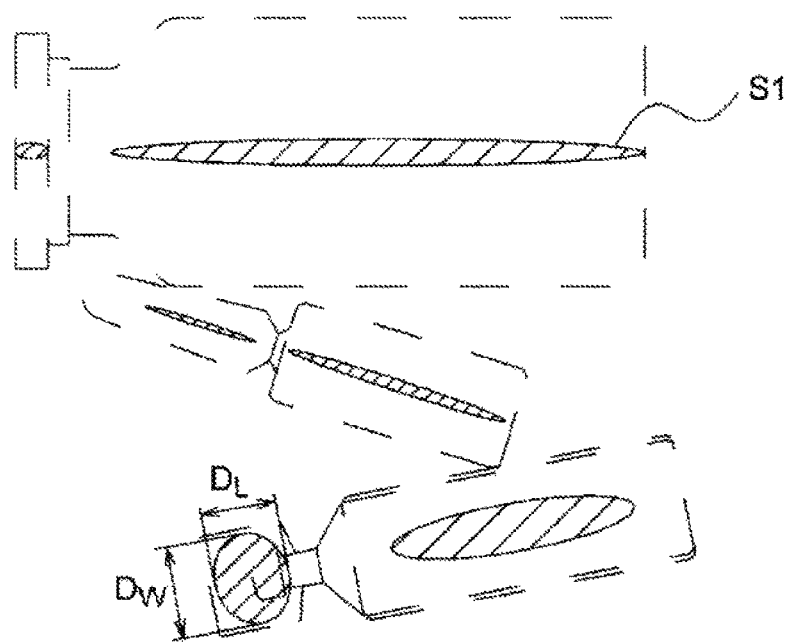
FIG. 40B is a schematic view showing a binarized image for explaining the binarization process.

The binarization processing part 1006 receives the image data photographed by the camera 304 of the photographing part 1003 and binarizes the image data to create a binarized image (a first binarized image). Each of FIGS. 40A and 40B is a schematic planar view for illustrating an example of the binarized image binarized by using an original image photographed by the camera 304 and a predetermined threshold value (for example, the predetermined threshold value is 125). In the case where the returned medicine 2 has a columnar shape and its surface is a curved surface as three returned medicines 2 shown in FIG. 40A, an area strongly reflecting illumination light from the upper side becomes an elongated shape. Thus, an elongated reflecting area S1 can be identified in the binarized image as shown in FIG. 40B.

In the binarization process, a detection of the reflecting area S1 is performed multiple times with changing the threshold value. In this embodiment, the reflecting area S1 is detected three times with gradually decreasing the threshold value in three stages. In this case, by setting the threshold value to be high (for example, to be 245) at the first stage, it is possible to detect only a portion positioned at a highest position of the columnar shape of the returned medicine 2. Thus, even in the case where the profile shape of each of the returned medicines 2 is unclear such as the case where the returned medicines 2 make contact with each other and the case where the returned medicines 2 are partially overlapped with each other, it is possible to detect the elongated reflecting area S1 of each of the returned medicines 2 as different areas and accurately detect the position and the like of each of the returned medicines 2 based on the reflecting area S1 of each of the returned medicines 2. Next, in the process at the second stage, the threshold value is decreased to a value lower than the threshold value at the first stage (for example, the threshold value at the second stage is 125) and the binarization process is performed to detect the returned medicines 2 whose color is slightly dark and which cannot be detected at the first stage. In the process at the third stage, the threshold value is set to be a low level (for example, the threshold value at the third stage is 75) as long as the returned medicines 2 whose color is darkest (for example, a brown bottle and the like) can be detected and the remaining medicines are detected. In the case of detecting a plurality of reflecting areas S1, by controlling so as to preferentially transfer the returned medicine 2 having the largest square measure of the reflecting area S1, it is possible to suction the returned medicines 2 from the returned medicine 2 which has a big size and can be easily suctioned in turn. Further, at the time of calculating a centroid position of the detected area, it may be possible to detect a direction of a minimum circumscribing rectangle of the area to detect the direction of the returned medicine 2 at the same time. In this regard, the same image may be utilized in the process at each of the multiple stages. Alternatively, different images individually and again photographed may be utilized in the process at each of the multiple stages.

The identification processing part 1007 detects the position, the direction (that is a direction in the X-Y plane in which the axial line A extends and which does not contain a direction in which the tip end 2a and the base end 2b are directed) and a substantially intermediate position of each of the returned medicines 2 based on the binarized image. Normally, in the shape of each of the returned medicines 2, the width W is shorter than the length L1 (see FIG. 8). Thus, the position and the like of each of the returned medicines 2 in the returned goods tray 4 is identified from the position and the like of each of the detected reflecting areas S1.

There is a case where it is preferable that the returned medicine 2 is suctioned at the intermediate position of the body portion due to a positional relationship with respect to the centroid. For example, it is preferable that the resin ampule 2C shown in FIG. 40A is suctioned at the intermediate position of the body portion. However, in the case where the returned medicine 2 has a plane portion at the head portion as the resin ampule 2C, there is a case where the illumination light is strongly reflected on the head portion and the reflecting area S is formed by this reflected light. In this case, in order to prevent the orthogonal type robot 700 from mistakenly suctioning the head portion, it is preferable that the identification processing part 1007 includes an area determining part 1009 for determining a head area as an identification excluded area based on the binarized image and removes this area from the target whose position is to be detected.

Specifically, the reflecting area S1 of the columnar portion of the returned medicine 2 is the elongated area. Namely, a length of the elongated area is equal to or more than a predetermined value, a width of the elongated area is less than a predetermined value or a ratio of the length with respect to the width is equal to or more than a predetermined value. In contrast, the reflecting area S1 of the head portion of the resin ampule 2C shown in FIG. 40A is an area whose width $D_W$ is large and whose length $D_L$ is small and a ratio of the length $D_L$ with respect to the width $D_W$ is small. Thus, in the determination process of the area determining part 1009, when the length $D_L$ of the reflecting area S1 is less than the predetermined value, the width $D_W$ is equal to or more than the predetermined value or the ratio of the length $D_L$ with respect to the width $D_W$ is less than the predetermined value, the area determining part 1009 determines this area as the identification excluded area. The predetermined values used herein may be decided according to the size of the resin ampule 2C to be used. By determining the head portion as the identification excluded area as described above, it is possible to accurately identify the body portion to be suctioned. The data of the position and the like of each of the returned medicines 2 detected in this process are transmitted to the drive control part 1008.

The drive control part 1008 performs control for driving the orthogonal type robot 700 to transfer the returned medicine 2 onto the semi-transparent plate 305 of the temporarily placing part 301 (see FIG. 13) based on the information on the position and the like of each of the returned medicines 2 detected by the identification processing part 1007. Since it is required to automatically identify the size of the returned medicine 2, the label information adhering to the surface of the returned medicine 2 and the like at the time of transferring the returned medicine 2, it is necessary that the returned medicine 2 is laid on its side in the returned goods tray 4. Thus, in the case where the returned medicine 2 which is not laid on its side exists in the returned goods tray 4, the drive control part 1008 performs control for driving the orthogonal type robot 700 to lay the returned medicine 2 on its side.

The process for identifying whether or not the returned medicine 2 is laid on its side in the returned goods tray 4 is performed by the identification processing part 1007 based on the image photographed by the camera 304 or the binarized image obtained by binarizing this image. Specifically, when the returned medicine 2 which is not laid on its side is photographed from the upper side by the camera 304, the planar view of the returned medicine 2 which is not laid on its side is a substantially circular shape unlike the other returned medicines 2 which are laid on their sides. Thus, it is possible to determine that the returned medicine 2 is laid on its side through a shape identification process. Alternatively, since the returned medicine 2 which is not laid on its side has a smaller square measure in the planar view compared with the other returned medicines 2 which are laid on their sides, it may be possible to determine that the returned medicine 2 is not laid on its side when the square measure of the returned medicine 2 is equal to or smaller than a predetermined square measure. As described above, it is possible to identify whether or not the returned medicine 2 is laid on its side in the returned goods tray 4 based on the image photographed by the camera 304 or the binarized image.

Figure 41A:
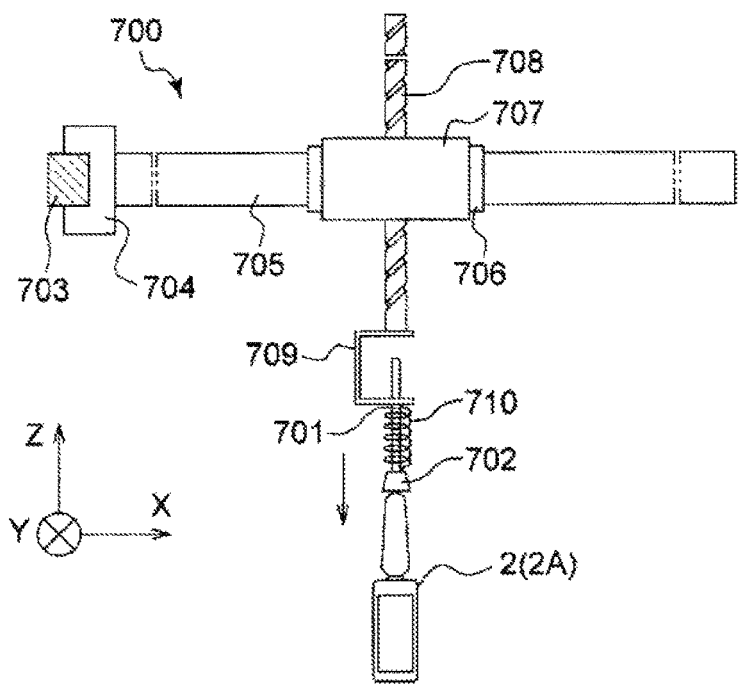
FIG. 41A is an explanatory view for a method of laying the returned medicine on its side by using the transferring part.
Figure 41B:
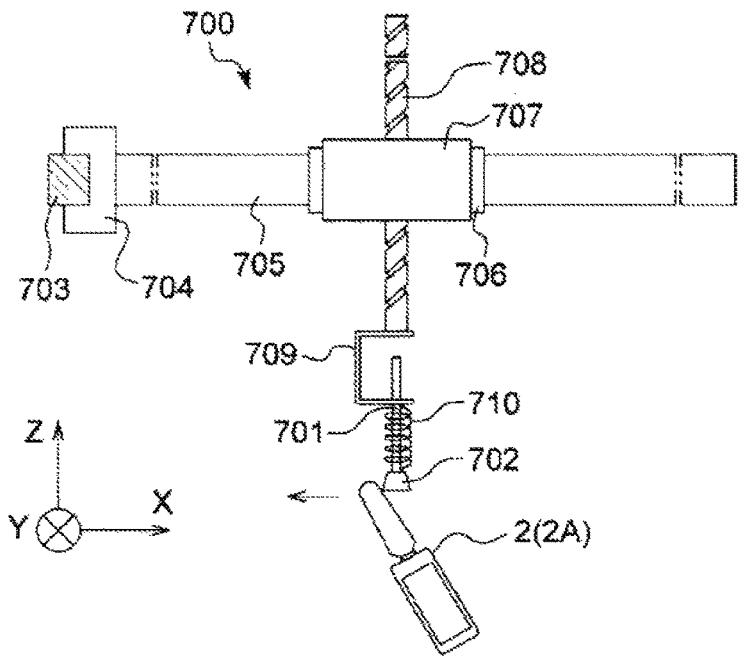
FIG. 41B is another explanatory view for the method of laying the returned medicine on its side by using the transferring part.

Next, detailed description will be given to a method for allowing the drive control part 1008 to control the orthogonal type robot 700 to lay the returned medicine 2 on its side in the case where the returned medicine 2 determined not to be laid on its side exists. First, for the returned medicine 2 which is identified not to be laid on its side, the drive control part 1008 drives the orthogonal type robot 700 to push the suctioning pad 702 onto the returned medicine 2 from the upper side as shown in FIG. 41A to measure the height of the returned medicine 2. In order to measure the height, the position sensor mounted on the carriage 706 (not shown in the drawings) may be used. Next, after the contact between the suctioning pad 702 and the returned medicine 2 is released by moving the suctioning pad 702 to the upper side, the suctioning pad 702 is moved to the horizontal direction by about several millimeters (for example, about 20 mm). Next, the suctioning pad 702 is downwardly moved to a position lower than a top position of the measured height of the returned medicine 2 by about several millimeters (for example, about 5 mm) and then the suctioning pad 702 is horizontally moved toward the returned medicine 2 to press the upper portion of the returned medicine 2 as shown FIG. 41B to lay the returned medicine 2 on its side. Further, generally, since the height of the returned medicine 2 which is not laid on its side is higher than the height of the returned medicine 2 which is laid on its side, it may be possible to determine that the returned medicine 2 is not laid on its side only in the case where the measured height of the returned medicine 2 is equal to or more than a predetermined value.

Figure 42:
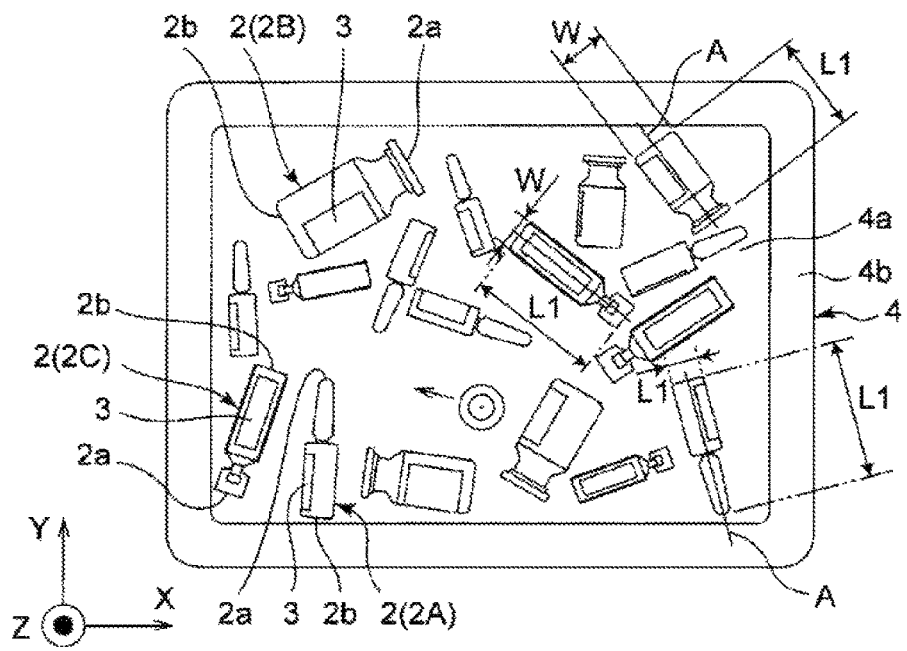
FIG. 42 is a view showing a direction in which each of the returned medicines is laid on its side in an operation shown in FIG. 41B.

FIG. 42 is a view showing a direction in which the returned medicine 2 is to be laid on its side. As indicated by an arrowed line in FIG. 42, it is preferable that the direction in which the returned medicine 2 is to be laid on its side is a direction in which the identification processing part 1007 determines that the other returned medicines 2 do not exist. With this configuration, by preliminarily checking a direction in which the other returned medicines 2 do not exist around the returned medicine 2 which is not laid on its side, it is possible to lay the returned medicine 2 on its side to a safe direction in which the transferring part 1005 can easily suction the returned medicine 2. In the case where the direction in which the returned medicine 2 is to be laid is not taken into account, there is a possibility that the laid returned medicine 2 makes contact with the other medicines 2 and is broken or a possibility that the returned medicines 2 adhere to each other due to the label seals on their surfaces of the returned medicines 2 depending on the direction in which the returned medicine 2 is laid on its side. In order to prevent these cases, it is effective to preliminarily check that the other returned medicines 2 do not exist in the direction in which the returned medicine 2 is to be laid on its side. By allowing all of the returned medicines 2 to be laid on their sides in the returned goods tray 4 as described above, the suctioning nozzle 701 of the orthogonal type robot 700 can suction and hold the returned medicines 2 in the returned goods tray 4 one by one to transfer and place the returned medicines 2 onto the semi-transparent plate 305 of the temporarily placing part 301 (see FIG. 13). At this time, the suctioning nozzle 701 can adjust the direction of the suctioned and held returned medicine 2 by utilizing the rotation of the suctioning nozzle 701 around the axial line thereof (around the Z axis).

When the orthogonal type robot 700 suctions the returned medicine 2 to lift up the returned medicine 2, there is a case where the suctioning fails due to the detection error of the position of the returned medicine 2 or a teaching error of the orthogonal type robot 700. Thus, in order to determine success and failure of the suctioning, it is preferable that the control operation part 1004 includes a suction determining part 1010. The suction determining part 1010 determines whether or not the suctioning is successfully performed based on a pressure sensor 1012 for measuring pressure inside the suctioning nozzle 701. When the suctioning is successfully performed, since an opening portion of the suctioning pad 702 is closed by the returned medicine 2, air suctioning into the suctioning nozzle 701 is not performed and thus the pressure inside the suctioning nozzle 701 reduces. Thus, in the case where an output from the pressure sensor 1012 becomes less than a predetermined value after the suctioning operation is performed by the orthogonal type robot 700, the suction determining part 1010 determines that the suctioning is successfully performed. In the case where the output from the pressure sensor 1012 is equal to or more than the predetermined value after the suctioning operation is performed by the orthogonal type robot 700, the suction determining part 1010 determines that the suctioning fails.

In the case where the suction determining part 1010 determines that the suctioning fails, it is preferable that the suctioning operation is repeated a plurality of times by changing the suctioning position and a suctioning angle within predetermined ranges around the suctioning position where the suctioning has been already performed. Examples of such an operation include methods for specifying the suctioning position shown as examples 1 to 8 in the following table 1.

TABLE 1

| | |
|---|---|
| Example 1 | Coordinate position specified by the image processing |
| Example 2 | Position shifting to the right side of the width W direction of the returned medicine 2 by about several millimeters |
| Example 3 | Position shifting to the left side of the width W direction of the returned medicine 2 by about several millimeters |
| Example 4 | Position shifting to the right side of the width W direction of the returned medicine 2 by about several millimeters more than the example 2 |

TABLE 1-continued

Example 5  Position shifting to the left side of the width W direction of the returned medicine 2 by about several millimeters more than the example 3
Example 6  Position sifting to the upper side of the length L direction of the returned medicine 2 by about several millimeters
Example 7  Position sifting to the lower side of the length L direction of the returned medicine 2 by about several millimeters
Example 8  Position rotated at the position of the example 1 by 90 degrees In the case of concretely setting a value of the shift of the suctioning position in each step, it is preferable to take account of the returned medicine 2. The suctioning with respect to the small returned medicine 2 is more likely to fail. The size of the returned medicine 2 used in this embodiment has a diameter of about 10 mm and a length of about 35 mm at the minimum. Thus, it is preferable that the value in each step is set based on this size to fall within the range that the value in the width W direction does not exceed 10 mm and the value in the length L direction does not exceed 35 mm.

As described above, since the suctioning operation is again performed by changing the suctioning position even if the suctioning operation fails, it is possible to improve a success rate of the suctioning operation for the returned medicine 2. Especially, in the case of suctioning the returned medicine 2 having the small size, it is required to perform the position detection and the suctioning operation with high accuracy. By preliminarily setting the operation for suctioning such a small returned medicine 2 by changing the suctioning position according to the size of the returned medicine 2, it is possible to more improve the success rate of the suctioning operation. Further, since it is unnecessary to again perform the image recognition and the binarization process for performing the suctioning operation even if the suctioning fails, it is possible to efficiently suction and transfer the medicine.

In the case where the binarization processing part 1006 performs the binarization process on the images in descending order of the luminance value to detect the position and the like of the returned medicine 2, there is a case where the same position coordinate is repeatedly detected once the suctioning fails and the failure of the suctioning is repeated. Thus, it is preferable that the control operation part 1004 includes a storage part 1011 for storing the failure of the suctioning and a coordinate area in the binarized image determined by the suction determining part 1010 and the control operation part 1004 performs control in which the suctioning is not temporarily performed in this coordinate area. Alternatively, it may be possible to store the failure of the suctioning and the coordinate area in the binarized image determined by the suction determining part 1010 into a host system (not shown in the drawings).

Figure 43:
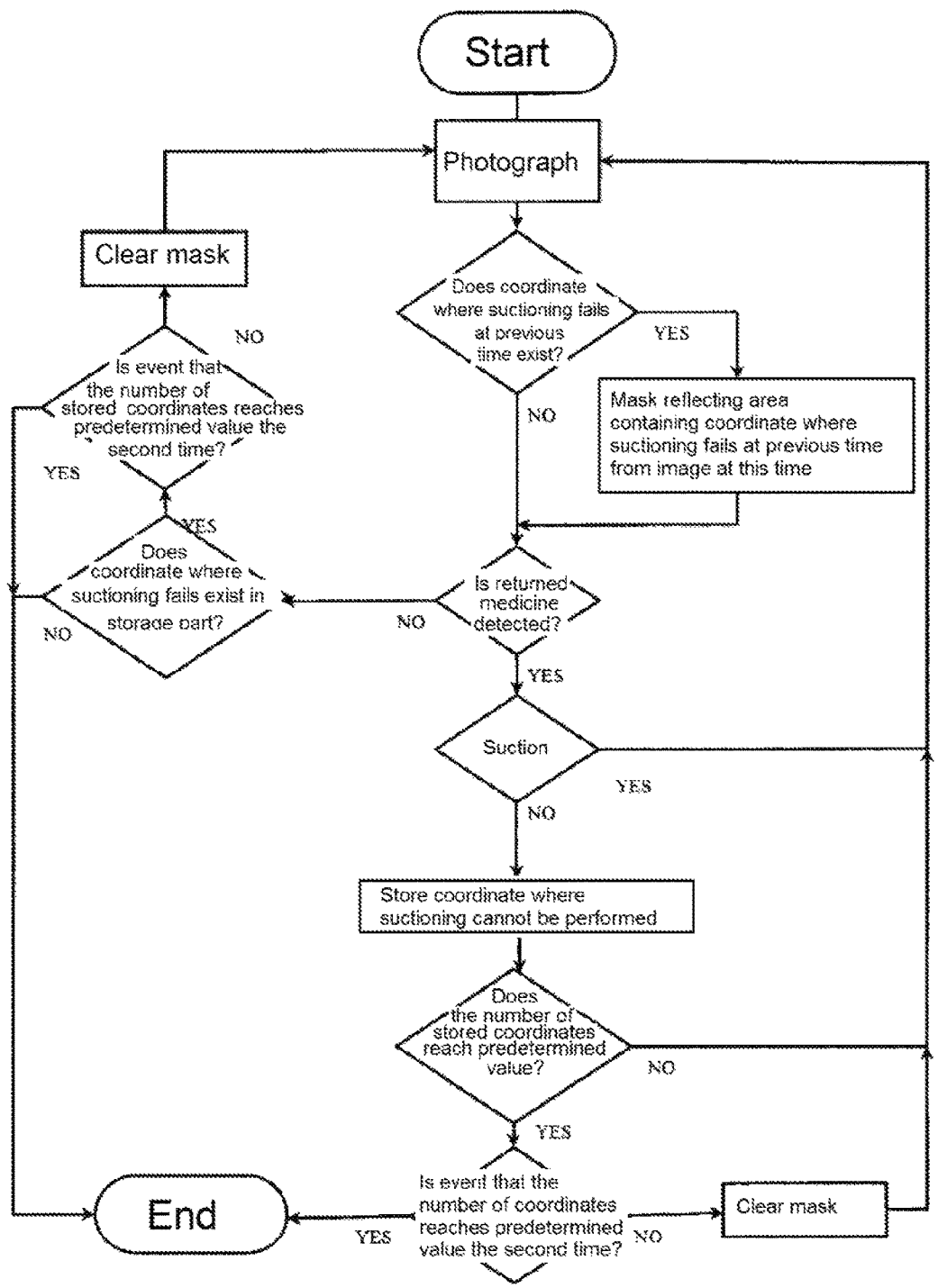
FIG. 43 is a flow chart showing a part of a process performed by an identifying part 300.

FIG. 43 is a flow chart illustrating a part of the process performed by the identifying part 300 in this embodiment. Once the process is started, the photographing is performed by the camera 304 to create the binarized image. In the case where a coordinate area which is stored in the storage part 1011 and where the suctioning fails at a previous time exists, the reflecting area S1 (see FIG. 40B) containing this coordinate area is masked with respect to the binarized image. In the case where the coordinate area where the suctioning fails at the previous time does not exist, this masking process is not performed. Then, the suctioning operation is performed in the case where the returned medicine 2 is detected in the binarized image. When the suction determining part 1010 determines that the suctioning is successfully performed, the photographing is again performed. On the other hand, when the suction determining part 1010 determines that the suctioning fails, a coordinate area where the suctioning fails is stored into the storage part 1011. In the case where the number of the stored coordinates is less than a predetermined value, the process returns to the photographing. In the case where the number of the stored coordinates reaches the predetermined value and the event where the number of the stored coordinates reaches the predetermined value is the second time, the process ends. On the other hand, in the case where the number of the stored coordinates reaches the predetermined value and the event that the number of the stored coordinates reaches the predetermined value is not the second time, the mask is cleared and the process returns to the photographing to start an identification operation. In the case of determining that the suctioning fails, it may be possible to search positions around the suctioning position as described in the above table 1 to perform the suctioning operation. In the case of repeating this process and the returned medicine 2 is not detected any more in the binarized image or the case where the coordinate area where the suctioning fails is not stored in the storage part 1011, the process completes. In the case where the coordinate area where the suctioning fails is stored in the storage part 1011, if the event that all of the stored coordinates are stored is the second time, the process ends. On the other hand, if the event that all of the stored coordinates are stored is not the second time, the mask is cleared and the process returns to the photographing to start the identification operation. The identification operation means the photographing, the binarization process, the masking process, the detection of the returned medicine 2 and an operation for storing the coordinate area where the suctioning fails into the storage part 1011.

Since the coordinate areas in the binarized image where the suctioning fails are temporarily removed from the target whose position is to be detected as described above, it is possible to detect the positions of the other medicines without repeatedly detecting the coordinate areas where the suctioning fails. Especially, in the case of suctioning a large ampule, there is a possibility that even a coordinate area where the suctioning fails once is repeatedly detected a plurality of times. By removing this suctioning position from the target to be identified, it is possible to reduce the number of the failures of the suctioning, thereby improving efficiency of the suctioning.

Further, the control device 1000 is configured to obtain the information on the shape and the size of the returned medicine 2 based on the image photographed by the camera 307. Namely, the control device 1000 serves as a part of the identifying part 300 for identifying the shape and the size of the returned medicine 2.

Further, the control device 1000 is configured to perform an image processing on the image of the camera 307 in which the returned medicine 2 is shown in order to obtain the information on the shape and the size of the returned medicine 2 (the control device 1000 includes an image processing part). For example, as the image processing performed on the image of the camera 307, the edge detecting process for detecting the edges of the form of the returned medicine 2 shown in the image of the camera 307 and the binarization process for binarizing the image of the camera 307 to obtain the binarized image (a second binarized image) are performed. Based on the image subjected to the edge detecting process and the binarized image, the control device 1000 obtains the information on the shape and the size of the returned medicine 2.

(Identification of the Type and the Expiration Date of the Medicine)

As described above, the type and the expiration date of the returned medicine 2 are identified by the label reading part 302 of the identifying part 300 (the information on the type and the expiration date is obtained). For this purpose, as shown in FIG. 14, the label reading part 302 includes the endless belt 308 on which the returned medicine 2 is to be placed and the roller 309 which makes contact with the returned medicine 2 placed on the endless belt 308 to rotate the returned medicine 2 around the axial line A of the returned medicine 2. The label reading part 302 further includes a belt driving part (not shown in the drawings) for driving the endless belt 308 and a roller driving part (not shown in the drawings) for driving the roller 309. Each of the belt driving part and the roller driving part is, for example, a motor and controlled by the control device 1000.

As shown in FIG. 44 which is a front view of the label reading part 302, the roller 309 is arranged on the upper side of the endless belt 308 through a space (for example, a space of 1 mm). Further, as shown in FIG. 14, the travelling direction F of the endless belt 308 non-orthogonally crosses the extending direction of the rotational center line Rc of the roller 309 (the Y direction). For example, in this embodiment, an angle formed between the extending direction of the rotational center line Rc of the roller 309 and the travelling direction F of the endless belt 308 is in the range of 5 to 15 degrees.

The travelling direction F of the endless belt 308 is a direction in which the returned medicine 2 placed on the endless belt 308 approaches to the roller 309. On the other hand, the rotational direction of the roller 309 is a rotational direction whose rotational speed becomes reverse with respect to the X-direction component of the travelling direction F of the endless belt 308 in the facing area where the roller 309 faces the endless belt 308.

Further, in this embodiment, the endless belt 308 and the roller 309 are driven and controlled by the control device 1000 through the belt driving part and the roller driving part so that a movement speed of the endless belt 308 and the rotational speed of the roller 309 are equal to each other in the facing area between the endless belt 308 and the roller 309.

According to the endless belt 308 and the roller 309 as described above, the returned medicine 2 placed on the endless belt 308 is conveyed by the endless belt 308 and makes contact with the roller 309. With this configuration, the returned medicine 2 is kept in a state that the returned medicine 2 makes contact with the roller 309 and positioned in the X direction.

In this regard, the returned medicine 2 (in particular, the ampule 2A and the resin ampule 2C) is preferably placed on the endless belt 308 by the orthogonal type robot 700 in a state that the direction of the returned medicine 2 is directed so that the base end 2b of the returned medicine 2 faces the stopper 317 when the returned medicine 2 makes contact with the roller 309. If the ampule 2A or the resin ampule 2C is placed on the endless belt 308 in a state that the direction thereof is directed so that the tip end 2a (the head portion 2d) thereof is positioned on the side of the stopper 317, there is a possibility that a corner of the body portion 2c on the side of the base end 2b makes contact with the roller 309 in first when the conveying by the endless belt 308 is started and the direction of the ampule 2A or the resin ampule 2C is changed on the endless belt 308 by reaction of this contact, and thereby the head portion 2d thereof gets into a space between the endless belt 308 and the roller 309. Thus, in the case where there is the possibility that the head portion 2d of the returned medicine 2 gets into the space between the endless belt 308 and the roller 309, the returned medicine 2 is preferably placed on the endless belt 308 by the orthogonal type robot 700 in a state that the direction of the returned medicine 2 is directed so that the base end 2b thereof faces the stopper 317 when the returned medicine 2 makes contact with the roller 309.

Since the travelling direction F of the endless belt 308 and the extending direction of the rotational center line Rc of the roller 309 non-orthogonally cross each other as shown in FIG. 14, the returned medicine 2 which has contacted with the roller 309 is guided by the roller 309 and moved in the extending direction of the rotational center line Rc of the roller 309 (the Y direction). Finally, one end portion of the returned medicine 2 in the extending direction of the axial line A thereof makes contact with the stopper 317, and thereby the returned medicine 2 is positioned in the extending direction of the rotational center line Rc of the roller 309 (the Y direction). As a result, the returned medicine 2 is positioned with respect to the label reading part 302.

Due to the stopper 317 and the arrangement of the roller 309 with respect to the endless belt 308 in which the travelling direction F of the endless belt 308 and the extending direction of the rotational center line Rc of the roller 309 non-orthogonally cross each other, the returned medicine 2 is kept in a state that the returned medicine 2 is positioned with high accuracy.

If the travelling direction F of the endless belt 308 and the extending direction of the rotational center line Rc of the roller 309 orthogonally cross each other, there is a possibility that the returned medicine 2 which has contacted with the roller 309 is moved in the extending direction of the rotational center line Rc of the roller 309 and separated from the stopper 317. With taking account of this possibility, the travelling direction F of the endless belt 308 and the extending direction of the rotational center line Rc of the roller 309 non-orthogonally cross each other in order to keep this contacting state between the stopper 317 and the returned medicine 2.

Since the returned medicine 2 is kept in a state that the returned medicine 2 is positioned with the high accuracy, the returned medicine 2 can be kept in a field of view of the camera 311 of the label reading part 302 and the barcode of the label 3 of the returned medicine 2 can be kept in a state that the barcode is set in a readable area of the barcode reader 312, for example. As a result, it is possible to ensure high identification accuracy with respect to the type and the expiration date of the returned medicine 2 by the camera 311 and the barcode reader 312.

Figure 45A:
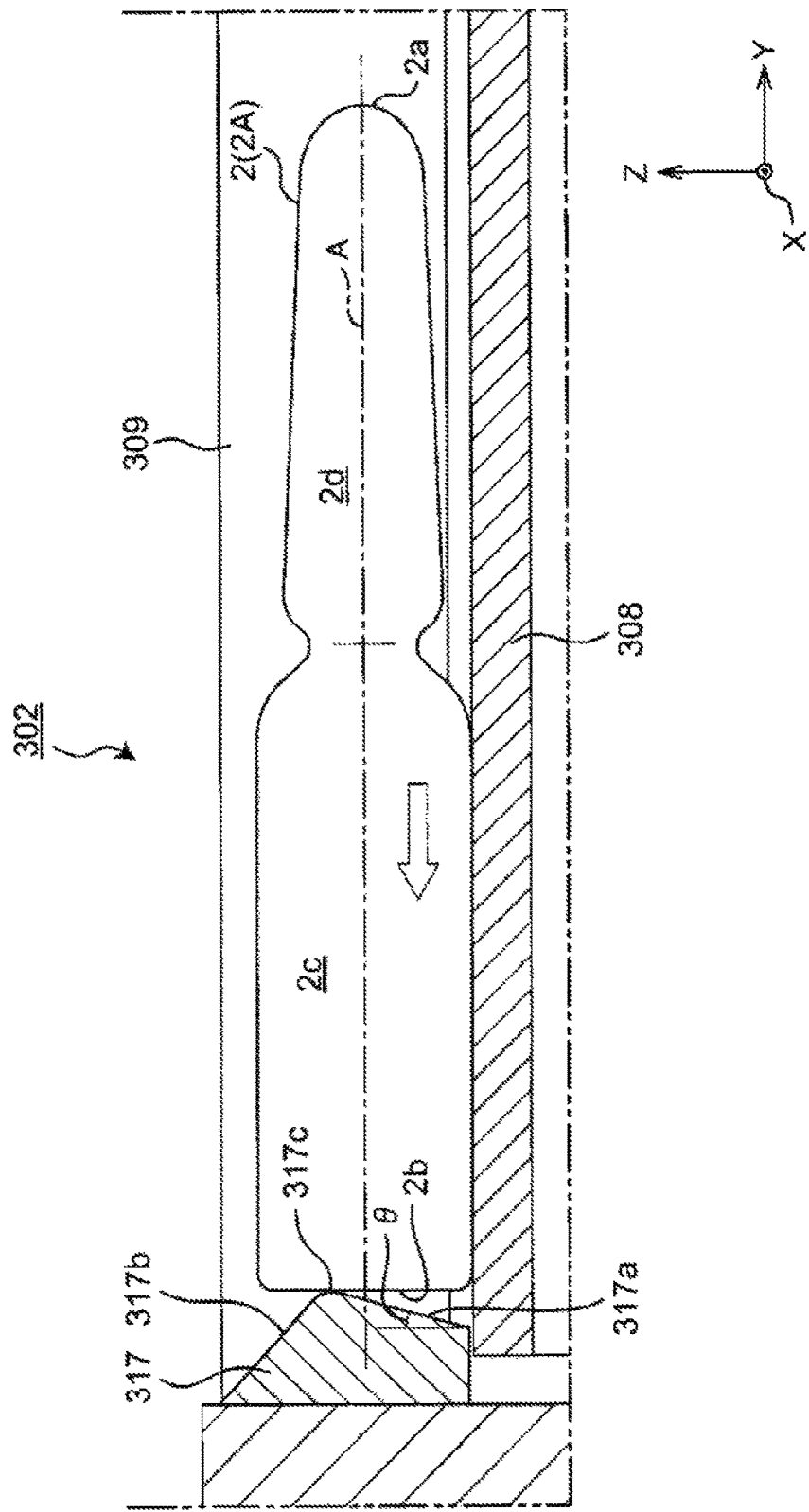
FIG. 45A is a cross-sectional view of the label reading part in a state that the returned medicine makes contact with a stopper.

FIG. 45A shows the label reading part 302 viewed from a direction perpendicular to the rotational center line Rc of the roller 309 and parallel to the endless belt 308, that is viewed from the X-axis direction in FIG. 14.

As shown in FIG. 45A, a contact portion of the stopper 317 contacting with the returned medicine 2 is not a plane surface perpendicular to the axial line A of the returned medicine 2 in a state that the returned medicine 2 makes contact with the roller 309 (the contact portion is not a plane surface parallel to the Z-X plane).

Specifically, the contact portion of the stopper 317 contacting with the returned medicine 2 is an edge portion 317c formed between two plane surface portions 317a, 317b. The plane surface portion 317a is an overhang surface inclined with respect to a normal line of the surface of the endless belt 308 contacting with the returned medicine 2 by an angle θ (namely, the plane surface portion 317a is inclined with respect to the vertical direction (the Z direction) by the angle θ) so as to face the endless belt 308. For example, the angle θ is 15 degrees. As shown in FIG. 14, the edge portion 317*c* between the two plane surface portions 317*a*, 317*b* is perpendicular to the rotational center line Rc of the roller 309 and extends parallel to the surface of the endless belt 308, that is the edge portion 317*c* extends in the X direction. In this regard, a tip end of the edge portion 317*c* of the stopper 317 is subjected to a rounding work.

The edge portion 317*c* extending in the X direction line-contacts with the base end 2*b* of the returned medicine 2. With this configuration, the returned medicine 2 which has contacted with the endless belt 308 and the roller 309 being rotating can be rotated around the axial line A thereof in a state that the axial line A thereof is kept to be parallel to the surface of the endless belt 308 and the rotational center line Rc of the roller 309.

Figure 45B:
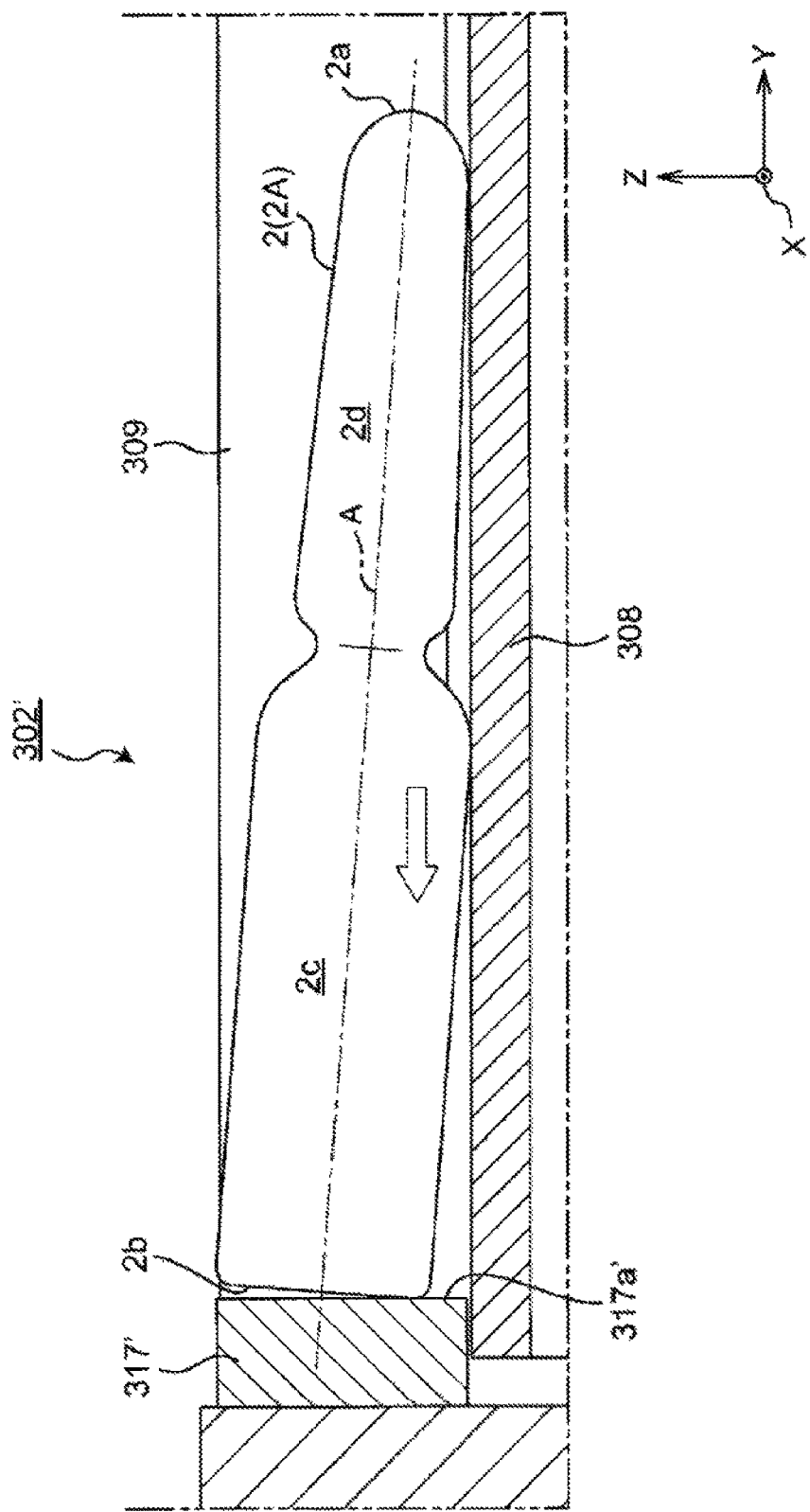
FIG. 45B is a cross-sectional view of the label reading part in a state that the returned medicine makes contact with the stopper in a comparative example.

In order to describe this matter more specifically, it is assumed that a contacting portion of a stopper 317' contacting with the returned medicine 2 is a plane surface portion 317*a*' as shown in FIG. 45B showing a comparative example. Further, as shown in FIG. 45B, it is assumed that the centroid of the returned medicine 2 is positioned on the side of the head portion 2*d* and thus the returned medicine 2 makes contact with the plane surface portion 317*a*' of the stopper 317' in an inclined state (in a state that the axial line A is not parallel to the surface of the endless belt 308 and the rotational center line Rc of the roller 309). In this regard, the inclination as describe above is likely to occur in the case where the returned medicine 2 has a light weight and a small size and the sizes of the body portion 2*c* and the head portion 2*d* are similar.

As shown in FIG. 45B, the returned medicine 2 in the inclined state is conveyed toward the stopper 317' by the rotations of the endless belt 308 and the roller 309 (conveyed in a white-outlined arrowed line direction) and makes contact with the plane surface portion 317*a*' of the stopper 317' of the label reading part 302'. Since the returned medicine 2 is in the inclined state, an edge of the base end 2*b* of the returned medicine 2 makes contact with the plane surface portion 317*a*' of the stopper 317'.

When the returned medicine 2 is rotated by the endless belt 308 and the roller 309 in a state that the edge of the base end 2*b* has contacted with the plane surface portion 317*a*' of the stopper 317', strong friction occurs between the edge of the base end 2*b* and the plane surface portion 317*a*' of the stopper 317' (compared with a case where the returned medicine 2 is not inclined and an entire of the base end 2*b* thereof makes contact with the plane surface portion 317*a*' of the stopper 317'). This friction is caused by the fact that the returned medicine 2 has been biased toward the stopper 317' by the rotations of the endless belt 308 and the roller 309.

When the friction occurs between the edge of the base end 2*b* of the returned medicine 2 and the plane surface portion 317*a*' of the stopper 317', the base end 2*b* is rolled on the plane surface portion 317*a*' of the stopper 317'.

Description will be given to this rolling by exemplifying a tire of an automobile which is easy to understand. The tire of the automobile has a portion contacting with a ground and another portion of the tire which is adjacent to this portion subsequently makes contact with the ground due to the rotation of the tire, and thereby the tire can be rolled on the ground.

In the same manner as this mechanism of the tire, the edge of the base end 2*b* has a portion contacting with the plane surface portion 317*a*' of the stopper 317' and another portion of the edge of the base end 2*b* which is adjacent to this portion subsequently makes contact with the plane surface portion 317*a*' due to the rotation of the returned medicine 2, and thereby the base end 2*b* can be rolled on the plane surface portion 317*a*' of the stopper 317'.

When the base end 2*b* is rolled on the plane surface portion 317*a*' of the stopper 317', a relative position of the returned medicine 2 with respect to the stopper 317' changes and the returned medicine 2 is finally separated from the stopper 317' and the roller 309. The separated returned medicine 2 is conveyed by the endless belt 308 and again makes contact with the roller 309. Then, the returned medicine 2 is conveyed toward the stopper 317' by the endless belt 308 and the roller 309 and again makes contact with the plane surface portion 317*a*' of the stopper 317'. If the returned medicine 2 is in the inclined state when the returned medicine 2 again makes contact with the plane surface portion 317*a*' of the stopper 317', the base end 2*b* thereof is again rolled on the plane surface portion 317*a*' of the stopper 317' and the returned medicine 2 is again separated from the stopper 317' and the roller 309. Such a loop is repeated until the inclination of the returned medicine 2 is accidentally resolved. As a result, in the label reading part 302, it delays or becomes impossible to start the identification of the expiration date and the barcode written on the label.

With taking account of this problem caused on such a returned medicine 2 which is likely to be inclined, the stopper 317 of the label reading part 302 in this embodiment is configured to make contact with the returned medicine 2 through the edge portion 317*c* of the stopper 317 as shown in FIG. 45A.

Namely, even if the returned medicine 2 is inclined and a portion of the edge of the base end 2*b* thereof makes contact with the edge portion 317*c*, another portion of the edge which is adjacent to this portion of the edge contacting with the edge portion 317*c* cannot make contact with the stopper 317 when the returned medicine 2 is rotated. Further, the overhang surface 317*a* is inclined with respect to the normal line of the surface of the endless belt 308 (that is the Z direction) by the angle θ so as to face the surface of the endless belt 308 in order to avoid that the edge of the base end 2*b* of the inclined returned medicine 2 makes contact with the overhang surface 317*a* of the stopper 317.

By using the stopper 317 having such a configuration, the returned medicine 2 whose base end 2*b* makes contact with the edge portion 317*c* in the inclined state can be rotated by the rotations of the endless belt 308 and the roller 309 to self-resolve the inclination of the returned medicine 2. As a result, the returned medicine 2 can be rotated around the axial line A thereof in a state that the axial line A is kept to be parallel to the surface of the endless belt 308 and the rotational center line Rc of the roller 309.

Further, by keeping the returned medicine 2 in a state that the returned medicine 2 is positioned with the high accuracy, the suctioning position SP for the returned medicine 2 in a state that the returned medicine 2 has contacted with the stopper 317 can be also kept in a state that the suctioning position SP is positioned with high accuracy. Since the suctioning position SP with respect to the returned medicine 2 is calculated as described above, it is also possible to calculate a suctioning position SP with respect to the stopper 317 (that is a suctioning position SP with respect to the label reading part 302) which has contacted with the returned medicine 2. As a result, it is possible to position the suctioning nozzle 801 of the scalar type robot 800 at the suctioning position SP with respect to the label reading part 302 with high accuracy. This allows the scalar type robot 800 to suction and hold the returned medicine 2 at the suctioning position SP for the returned medicine 2 kept in a state that the returned medicine 2 has been positioned with respect to the label reading part 302 with high accuracy, thereby safely conveying the returned medicine 2 to the storing part 500 from the label reading part 302.

The returned medicine 2 keeps on being rotated around the axial line A by the roller 309 while the returned medicine 2 is kept in a state that the returned medicine 2 has been positioned with respect to the label reading part 302. The label 3 of the returned medicine 2 being rotated is photographed by the camera 311 and read by the barcode reader 312.

As shown in FIG. 44, the camera 311 for photographing the label 3 of the returned medicine 2 and the barcode reader 312 for reading the barcode written on the label 3 are arranged on the upper side of the returned medicine 2 which has been positioned and rotated by the endless belt 308 and the roller 309.

On the label 3, the expiration date of the returned medicine 2 and the barcode indicating the type of the returned medicine 2 are written.

The control device 1000 is configured to obtain the information on the expiration date of the returned medicine 2 based on the image which is photographed by the camera 311 and in which the label 3 is shown (the control device 1000 includes an OCR part for identifying the expiration date written on the label 3). Further, the control device 1000 is configured to obtain the information on the type of the returned medicine 2 based on the barcode read by the barcode reader 312. Namely, the control device 1000 serves as a part (a second medicine information obtaining part) of the identifying part 300 for identifying the type and the expiration date of the returned medicine 2.

As described above, in the case where the information on the type and the expiration date of the returned medicine 2 is contained in the barcode written on the label 3 (for example, in the case where the barcode indicating the expiration date is printed on the label 3), it is possible to obtain the information containing the type and the expiration date of the returned medicine 2 from the barcode read by the barcode reader 312. As a result, this makes it possible to omit the camera 311.

In this regard, since the type and the expiration date of the returned medicine 2 are identified from the label 3 of the returned medicine 2 in a state that the returned medicine 2 has been rotated by the roller 309 as described above, there is a possibility that the identification of the type and the expiration date fails. For responding to this problem, the identifying operation may be repeated until the number of the failures of the identification operation reaches a predetermined number of times or a predetermined time passes due to the repeat of the identifying operation (until the process time-outs), for example. For example, in the case where the OCR part cannot identify the expiration date written on the label 3 shown in the image photographed by the camera 311, a new image is photographed by the camera 311. The OCR part performs the identifying operation on the expiration date of the label 3 shown in the newly photographed image. In the case where the identifying operation fails the predetermined number of times (for example, the predetermined number of times is 18) or the process time-outs, the returned medicine 2 is treated as the non-stored medicine whose label 3 cannot be read (the returned medicine 2 is stored into the non-stored medicine arrangement boxes 401, 402 of the non-stored medicine arrangement part 400).

Further, the control device 1000 is configured to control the rotational speed of the roller 309 based on an outer diameter of the returned medicine 2 set on the label reading part 302.

The reason for this matter will be explained below. In the case where the outer diameter of the returned medicine 2 is relatively small and the rotational speed of the roller 309 is relatively high, a rotational speed of the returned medicine 2 is high. Thus, there is a possibility that the barcode reader 312 cannot accurately read the barcode of the label 3 adhering to an outer peripheral surface of the returned medicine 2. For responding to this problem, the control device 1000 controls the roller driving part so as to decrease the rotational speed of the roller 309 as the outer diameter of the returned medicine 2 reduces. In order to enable this control, the control device 1000 is configured to calculate the outer diameter of the returned medicine 2 based on the shape and the size (the size in the extending direction of the axial direction A) of the returned medicine 2 obtained from the image of the camera 307 of the temporarily placing part 301 of the identifying part 300.

As shown in FIG. 44, the camera 311 is arranged on the upper side of the label reading part 302 so that an optical axis OA2 thereof extends in the vertical direction (the Z-axis direction). On the other hand, an extending direction of an optical axis OA3 of laser emitted from the barcode reader 312 toward the barcode of the label 3 of the returned medicine 2 (that is an irradiation direction of the laser) is inclined with respect to the vertical direction. The reason for this matter will be explained with reference to FIG. 46.

As described above, the returned medicine supplying apparatus 1 is configured to treat different medicines having a variety of shapes and sizes. Therefore, the different returned medicines 2 having different outer diameters are set on the label reading part 302 as shown in FIG. 46.

Figure 46:
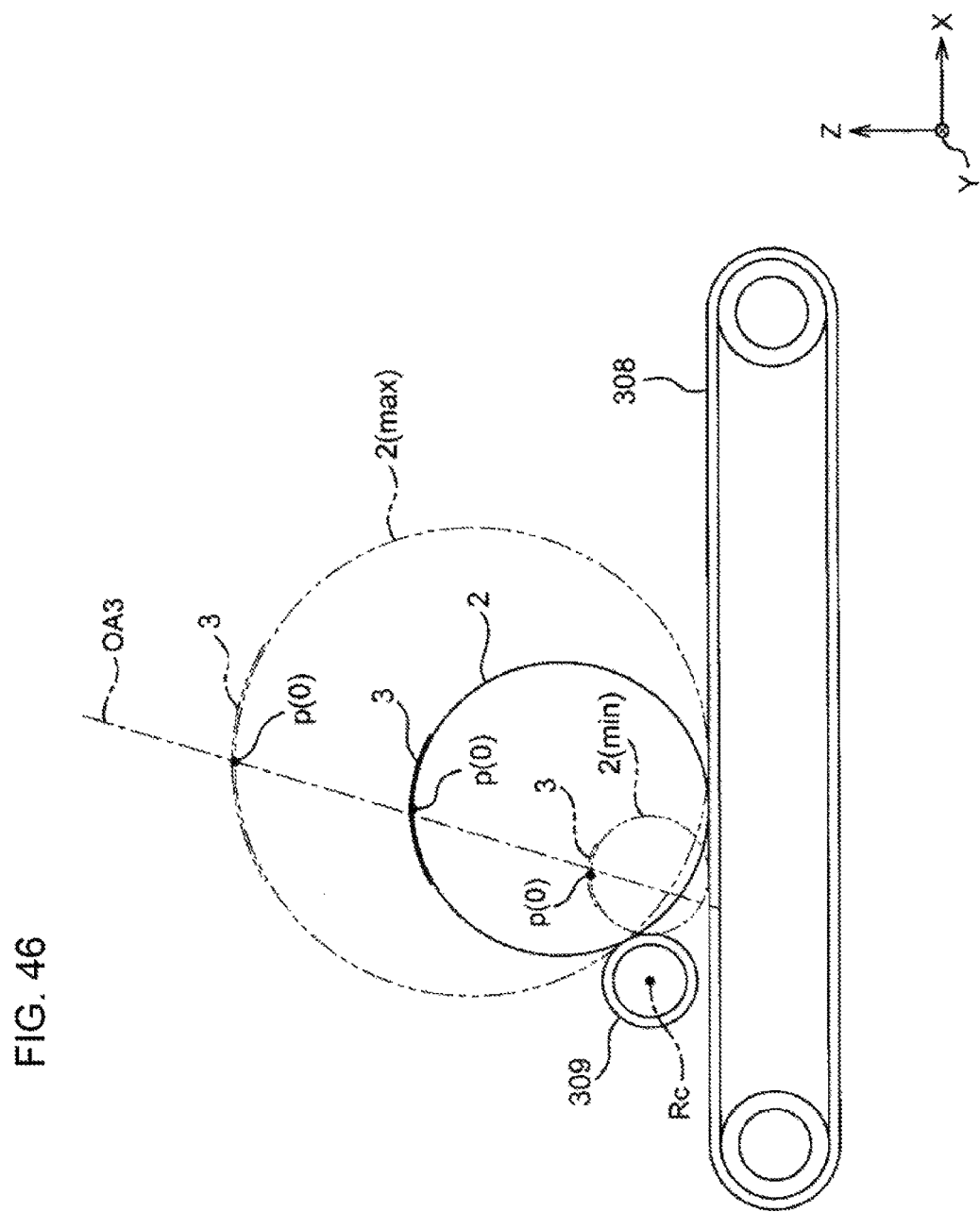
FIG. 46 is a view for explaining a laser irradiation direction deciding method of a label reading device in the label reading part.

In FIG. 46, each of the returned medicines 2 is illustrated with a cross-sectional shape (a cross-sectional shape of the body portion 2c to which the label 3 thereof adheres). A returned medicine 2(max) has a maximum outer diameter among a plurality of medicines to be treated by the returned medicine supplying apparatus 1. On the other hand, a returned medicine 2(min) has a minimum outer diameter. Thus, the irradiation direction of the laser of the barcode reader 312 of the label reading part 302 is set so as to be capable of accurately reading a barcode of the returned medicine 2(max) having the maximum outer diameter and a barcode of the returned medicine 2(min) having the minimum outer diameter.

For example, as shown in FIG. 46, it is assumed that the plurality of returned medicines 2(min), 2, 2(max) having the different outer diameters are provided and the label 3 of each of the returned medicines 2(min), 2, 2(max) is directed toward the upper direction. In this case, a regression line is calculated in a plane perpendicular to the rotational center line Rc of the roller 309 (that is, in FIG. 46) based on points p(0) of angular positions positioned at 0 degree on the outer peripheral surfaces of the returned medicines 2(min), 2, 2(max) which have contacted with the endless belt 308 and the roller 309. The point p(0) of the angular position at 0 degree is positioned on a cross-sectional outer peripheral surface of the returned medicine 2, positioned at the angular position at 0 degree from the axial line A and positioned at a highest position. The regression line is a line drawn so as to make distances between the points p(0) of the angular positions at 0 degree of the returned medicines 2(min), 2, 2(max) minimum and the regression line is obtained by the least-square method. The irradiation direction of the laser of the barcode reader 312 is set so that this obtained regression line becomes parallel to the optical axis OA3 of the laser (or the regression line coincides with the optical axis OA3 of the laser). With this configuration, it is possible to accurately read the barcode on the label 3 of each of the returned medicines 2 with substantially equal accuracy when the labels 3 of the plurality of returned medicines 2 having the different outer diameters are directed toward the upper direction.

In this embodiment, the optical axis OA3 of the laser of the barcode reader 312 is parallel to the regression line and passes through the point p(0) of the angular position at 0 degree of the returned medicine 2(max) having the maximum outer diameter as shown in FIG. 46.

Further, the function of the barcode reader 312 is not limited to the function of reading the barcode of the label 3 when the label 3 is directed toward the upper direction.

Figure 47:
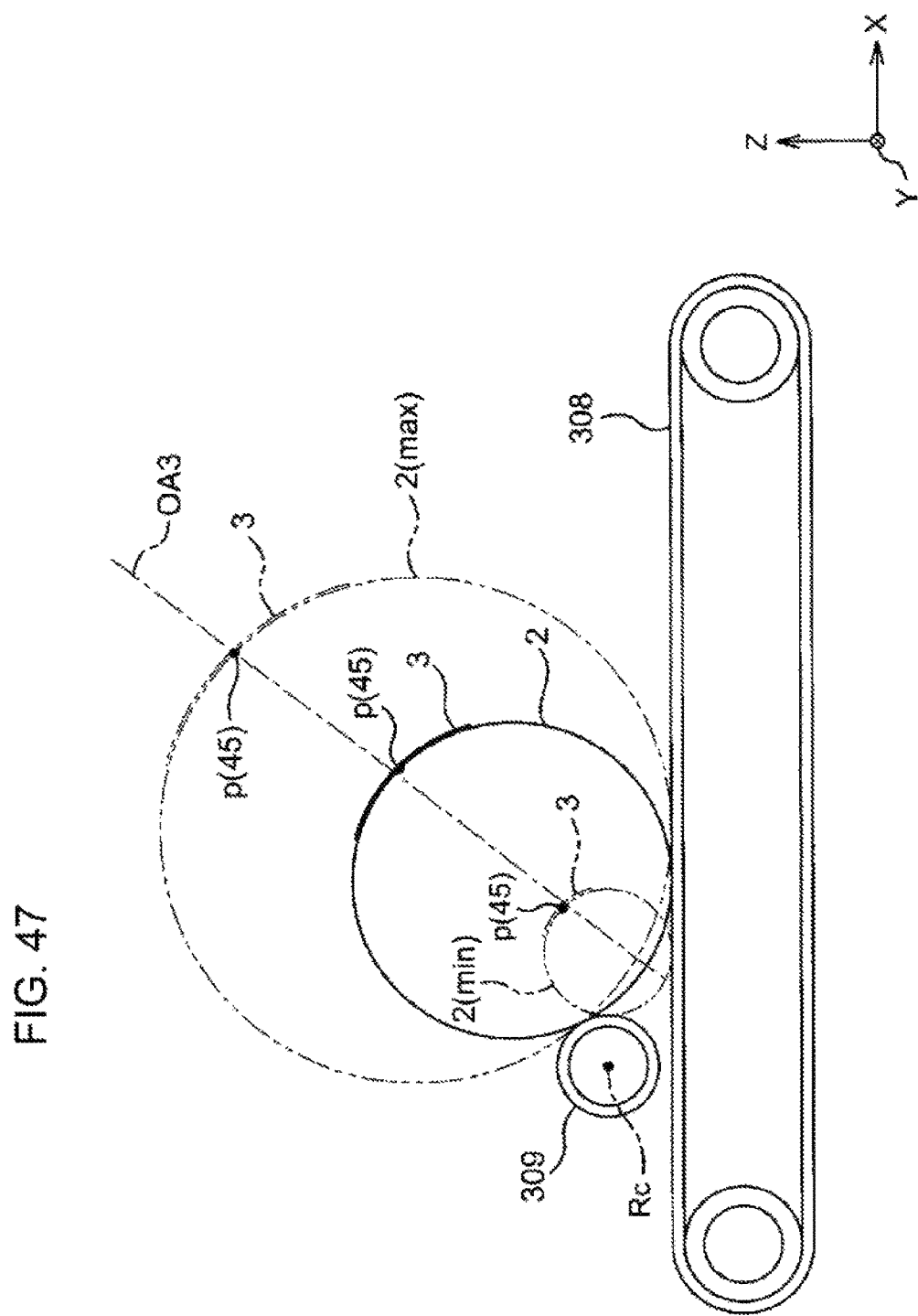
FIG. 47 is a view showing another example in which a laser irradiation direction of the label reading device is different.

For example, as shown in FIG. 47, the barcode reader 312 may read the barcode of the label 3 in a state that the label 3 is directed toward a direction inclined with respect to the upper direction by 45 degrees. In this case, the regression line is calculated in the plane perpendicular to the rotational center line Rc of the roller 309 based on points p(45) of angular positions at 45 degrees on the outer peripheral surfaces of the returned medicines 2(min), 2, 2(max) which have contacted with the endless belt 308 and the roller 309. Then, the irradiation direction of the laser of the barcode reader 312 is set so that the optical axis OA3 of the laser becomes parallel to the regression line (or the optical axis OA3 of the laser coincides with the regression line). With this configuration, it is possible to accurately read the barcode on the label 3 of each of the returned medicines 2 with substantially equal accuracy when the labels 3 of the plurality of returned medicines 2 having the different outer diameters are directed toward the direction inclined with respect to the upper direction by 45 degrees.

After the identification of the type and the expiration date of the returned medicine 2 completes in the label reading part 302, the endless belt 308 and the roller 309 are stopped. At this time, the returned medicine 2 on the endless belt 308 is allowed to be in a state that the barcode of the label 3 thereof is directed toward the upper side or the diagonally upward direction of 45 degrees as described above. It is checked whether or not the returned medicine 2 is in a state that the barcode is directed toward the upper direction or the diagonally upward direction depending on whether or not the barcode reader 312 can read the barcode of the returned medicine 2. The scalar type robot 800 transfers the returned medicine 2 from the label reading part 302 to the storing part 500 with keeping the state that the barcode is directed toward the upper direction or the diagonally upward direction of 45 degrees.

The reason for this matter will be explained below. As described above, the scalar type robot 800 transfers the returned medicine 2 from the storing tray 5 of the storing part 500 to the dispensing tray 8 based on the prescription data. At this time, by referring to the medicine master storing the type of the returned medicine 2 and the storing area for the returned medicine 2 in a state that the type of the returned medicine 2 is associated with the storing area for the returned medicine 2, the storing area for the returned medicine 2 contained in the prescription data is identified. Then, the scalar type robot 800 suctions and holds the returned medicine 2 stored in the identified storing area.

At this time, the barcode of the returned medicine 2 existing in the identified storing area is read by the barcode reader 812 mounted on the scalar type robot 800 before the returned medicine 2 is suctioned. With this configuration, it is confirmed that the returned medicine 2 existing in the identified storing area is the returned medicine 2 contained in the prescription data. For enabling this confirmation operation, that is for enabling the barcode reader 812 of the scalar type robot 800 to read the barcode of the returned medicine 2 stored in the storing tray 5, the returned medicine 2 is stored in the storing tray 5 in a state that the barcode is directed toward the upper direction or the diagonally upward direction of 45 degrees. Then, the returned medicine 2 on the endless belt 308 is allowed to be in the state that the barcode of the label 3 thereof is directed toward the upper direction or the diagonally upward direction of 45 degrees for this purpose after the identification of the type and the expiration date completes in the label reading part 302.

In this regard, in the case of suctioning the resin ampule 2C as shown in FIG. 29, there is a possibility that a connecting burr (a connecting fin) of the resin ampule 2C is positioned at the highest position when the resin ampule 2C is in a state that the barcode is directed toward the diagonally upward direction. In this case, there is a possibility that the suctioning nozzle 801 of the scalar type robot 800 cannot accurately suction the resin ampule 2C from the upper side due to this connecting burr.

For responding to this problem, it is required to first confirm whether or not the returned medicine 2 existing in the label reading part 302 is a returned medicine having a connecting burr. For enabling this confirmation operation, the medicine master stores the information on the type of medicines and information related to presence/absence of the connecting burr in a state that the information on the type of medicines is associated with the information related to the presence/absence of the connecting burr.

When it is confirmed that the returned medicine 2 in the label reading part 302 is the medicine having the connecting burr based on the type of the returned medicine 2 identified by the label reading part 302 and the medicine master, the endless belt 308 and the roller 309 are again driven from a stopped state to rotate the returned medicine 2 by an optimum amount so that the connecting burr is not positioned at the highest position, that is the suctioning nozzle 801 can suction a portion on which the connecting burr does not exist.

The control device 1000 is configured to obtain the information on the type and the expiration date of the returned medicine 2 in the label reading part 302 through the camera 311 and the barcode reader 312 to determine whether or not the obtained type and the obtained expiration date are the type and an expiration date of the medicine to be treated.

For example, if the type of the returned medicine 2 is a type preliminarily designated by the user as the type of the medicine to be treated by the returned medicine supplying apparatus 1, the returned medicine 2 is determined to be the medicine to be treated. Specifically, if the identified type is a type stored in the medicine master, the returned medicine 2 is determined to be the medicine to be treated. If the identified type is not the type stored in the medicine master, the returned medicine 2 is determined to be the medicine not to be treated.

Further, in the case where the expiration date has not expired or a sufficient time remains by the expiration date, the returned medicine 2 is determined to be the medicine to be treated. On the other hand, in the case where the expiration date has already expired or the number of remaining days by the expiration date is several days (for example, 2 or 3 days), the returned medicine 2 is determined to be the medicine not to be treated.

When the control device 1000 determines that the type and the expiration date of the returned medicine 2 identified by the label reading part 302 of the identifying part 300 are the type and the expiration date of the medicine to be treated, the returned medicine 2 is transferred to the storing part 500 by the scalar type robot 800 as described above.

On the other hand, the returned medicine 2 whose at least one of the type and the expiration date is determined to be the type and the expiration date of the medicine not to be treated is transferred from the label reading part 302 to the non-stored medicine arrangement boxes 401, 402 of the non-stored medicine arrangement part 400 as the non-stored medicine 2' (finally, the returned medicine 2 is transferred and placed onto a returned goods tray 4' for the non-stored medicine).

Finally, a plurality of non-stored medicines 2' are stored in the returned goods tray 4' for the non-stored medicine of the non-stored medicine arrangement part 400. At this time, it is preferable that the non-stored medicines 2' are stored in the returned goods tray 4' for the non-stored medicine in a state that the non-stored medicines 2' are organized.

Figure 48:
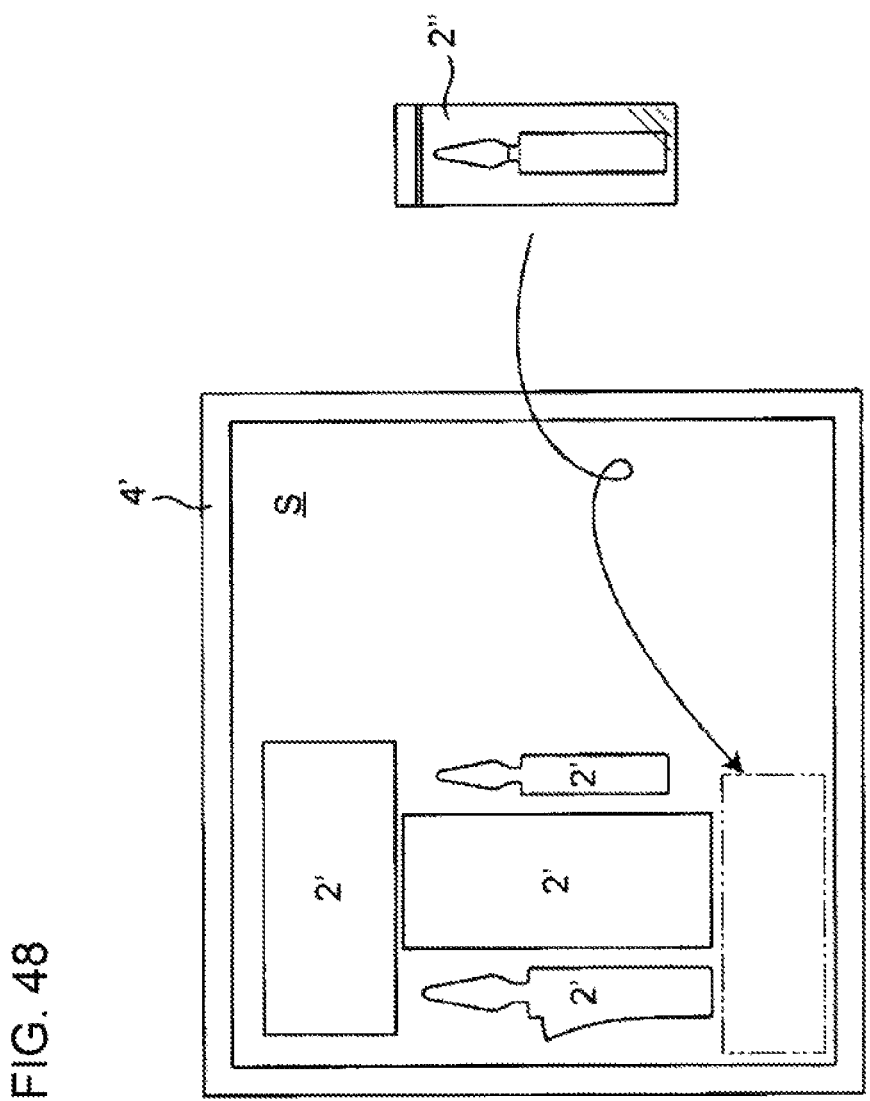
FIG. 48 is a view for explaining an organizing method for a plurality of non-stored medicines.

FIG. 48 shows the plurality of non-stored medicines 2' stored in the returned goods tray 4' for the non-stored medicine.

As shown in FIG. 48, the plurality of non-stored medicines 2' are stored in the returned goods tray 4' for the non-stored medicine in a state that the non-stored medicines 2' are organized, for example, in a state that the non-stored medicines 2' are not overlapped with each other. Description will be given to a method for storing the plurality of non-stored medicines 2' into the returned goods tray 4' for the non-stored medicine in a state that the non-stored medicines 2' are organized as shown in FIG. 48.

The control device 1000 is configured to calculate a vacant space S for storing the non-stored medicine 2' before the non-stored medicine 2' is stored in the returned goods tray 4' for the non-stored medicine.

The vacant space S of the returned goods tray 4' for the non-stored medicine is extracted (calculated) by performing an image processing on the image of the returned goods tray 4' for the non-stored medicine photographed by the camera 304 (an additional photographing part) of the identifying part 300. For this purpose, the returned goods tray 4' for the non-stored medicine is transferred and placed onto the table 203 of the elevating part 200 and arranged on the lower side of the camera 304.

When the vacant space S is calculated, the control device 1000 decides a storing area (a storing position) in the vacant space S for a non-stored medicine 2" to be newly stored in the returned goods tray 4' for the non-stored medicine. Description will be given to one example of a method for deciding this storing area.

For example, the control device 1000 decides a temporarily storing area which is larger than a shape of the non-stored medicine 2" (the shape identified on the temporarily placing part 301) and has a similarity shape similar to the shape of the non-stored medicine 2". For example, a temporarily storing area having a size being 120% of the shape of the non-stored medicine 2" is decided. The control device 1000 searches the vacant space S to find a position at which this temporarily storing area can be arranged. If the position at which the temporarily storing area can be arranged exists in the vacant space S, this position is decided as the storing area for the non-stored medicine 2".

On the other hand, in the case where the position at which the temporarily storing area can be arranged cannot be found in the vacant space S, the control device 1000 changes a direction of this temporarily storing area (a longitudinal direction of the temporarily storing area). Then, the control device 1000 searches the vacant space S to find a position at which the temporarily storing area whose direction has been changed can be arranged.

In the case where a position for arranging the temporarily storing area cannot be found after the direction of the temporarily storing area has been changed once, the control device 1000 again changes the direction of the temporarily storing area to another direction. The changing of the direction of the temporarily storing area is repeated until the position for arranging the temporarily storing area is found.

In the case where the position for arranging the temporarily storing area cannot be found even if the direction of the temporarily storing area is changed to every direction, the control device 1000 decreases the size of the temporarily storing area. For example, the size of the temporarily storing area is changed to a size being 115% of the shape of the non-stored medicine 2". Then, the control device 1000 searches the vacant space S to find the position at which the temporarily storing area whose size has been changed can be arranged.

The changing of the direction of the temporarily storing area whose size has been changed is also repeated until the position for arranging the temporarily storing area is found.

In the case where the position for arranging the temporarily storing area cannot be found even after the size has been changed once, the control device 1000 again decreases the size of the temporarily storing area. The changing of the size of the temporarily storing area is repeated until the size of the temporarily storing area is decreased to the same size as the shape of the non-stored medicine 2" due to the changing of the size.

In the case where the position for arranging the temporarily storing area cannot be found even after the size of the temporarily storing area is decreased to the same size as the shape of the non-stored medicine 2", the control device 1000 determines that a space for storing the returned medicine 2' does not exist in the returned goods tray 4' for the non-stored medicine and reports it to the user. For example, the control device 1000 may report it to the user through the display 1002 of the control panel 1001.

Due to such a heuristic searching method, the vacant space S is searched to find the storing area for the non-stored medicine 2". As a result, it is possible to store the plurality of non-stored medicines 2" in the returned goods tray 4' for the non-stored medicine in a state that the non-stored medicines 2" are organized.

Next, description will be given to one example of the described flow from the identification of the shape and the like of the returned medicine 2 to the conveying of the returned medicine 2 based on the identifying result with reference to FIGS. 49A and 49B.

Figure 49A:
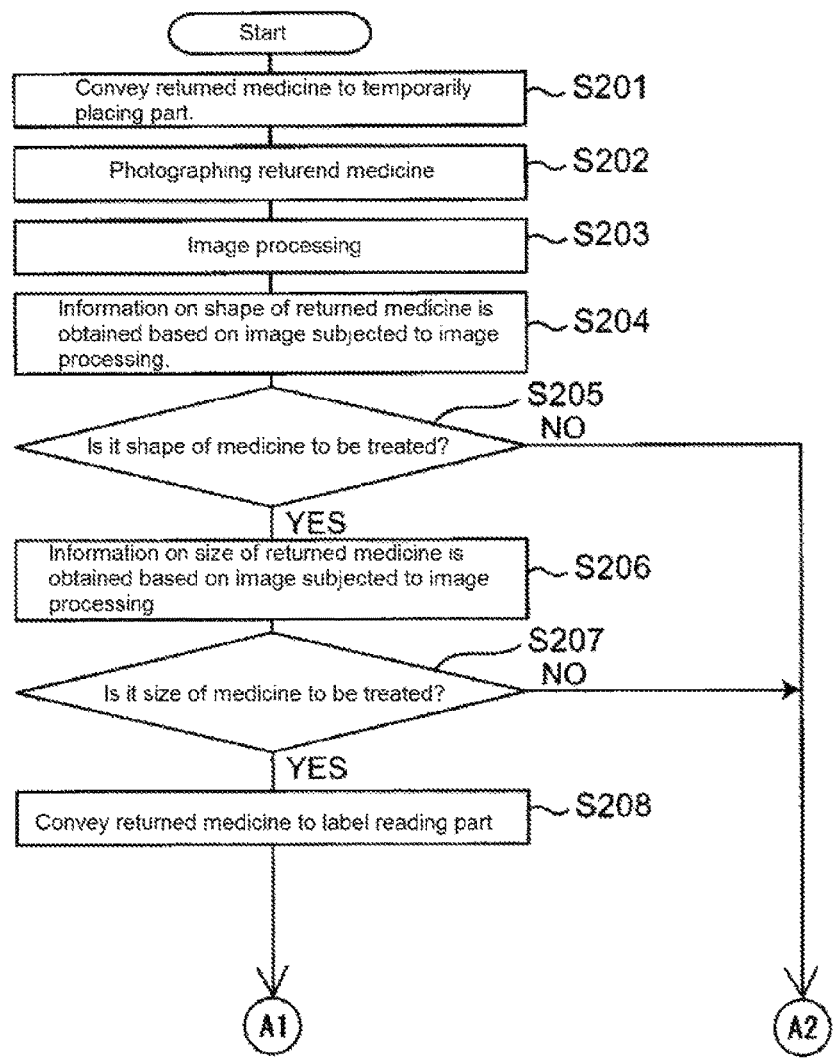
FIG. 49A is a flow chart diagram showing a first half part of a flow for arranging the returned medicine from the temporarily placing part of the identifying part to the storing part or the non-stored medicine arrangement part.
Figure 49B:
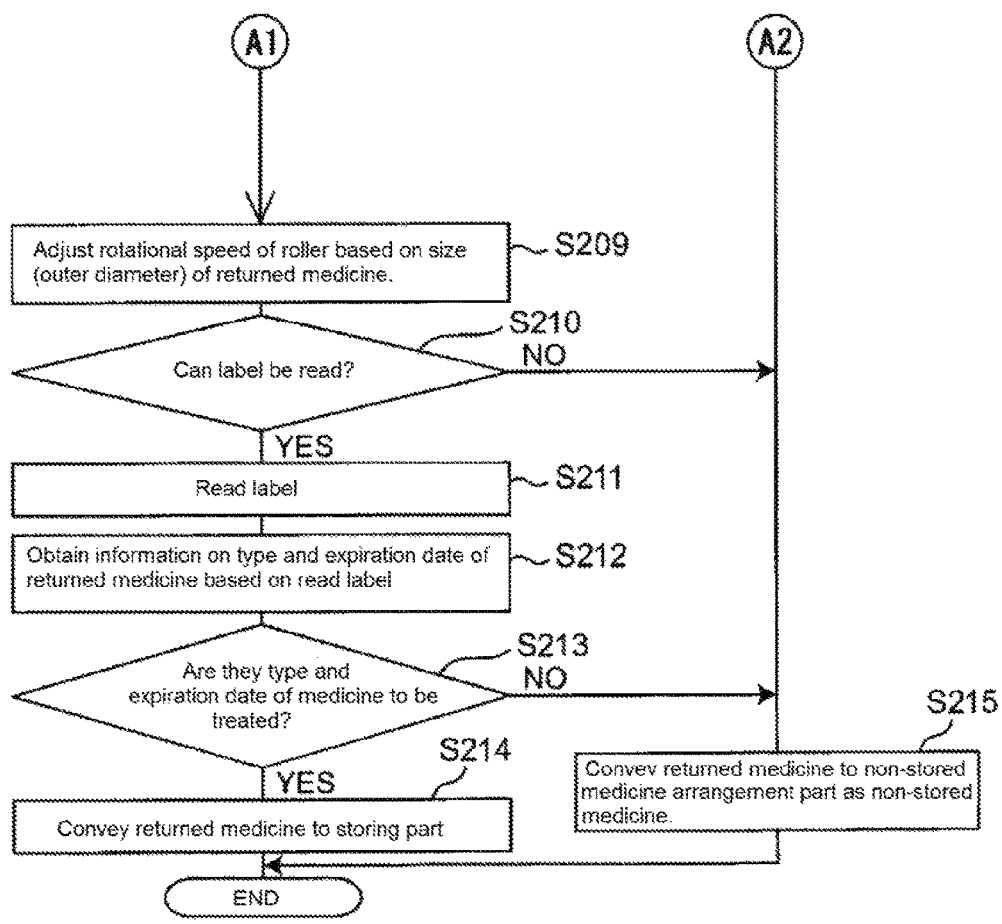
FIG. 49B is a flow chart diagram showing a latter half part of the flow for arranging the returned medicine from the temporarily placing part of the identifying part to the storing part or the non-stored medicine arrangement part.

First, as shown in FIG. 49A, at a step S201, the returned medicine 2 is conveyed (placed) onto the semi-transparent plate 305 (the medicine placing plate) in the temporarily placing part 301 of the identifying part 300 by the orthogonal type robot 700.

Next, at a step S202, the returned medicine 2 placed on the semi-transparent plate 305 is photographed by the camera 307 arranged on the upper side of the returned medicine 2.

At a step S203, the image of the camera 307 photographed at the step S202 is subjected to the image processing (the edge detecting process and the binarization process) by the control device 1000.

At a step S204, the control device 1000 obtains the information on the shape of the returned medicine 2 placed on the semi-transparent plate 305 of the temporarily placing part 301 based on the image of the camera 307 subjected to the image processing at the step S203.

At a step S205, the control device 1000 determines whether or not the shape of the returned medicine 2 placed on the semi-transparent plate 305 of the temporarily placing part 301 is the shape of the medicine to be treated based on the information on the shape of the returned medicine 2 obtained at the step S204. In the case where the shape of the returned medicine 2 is the shape of the medicine to be treated, the process shifts to a step S206. In the case where the shape of the returned medicine 2 is not the shape of the medicine to be treated (in the case where the shape of the returned medicine 2 is the shape of the medicine not to be treated), the process shifts to a step S215.

At the step S206, the control device 1000 obtains the information on the size of the returned medicine 2 placed on the semi-transparent plate 305 of the temporarily placing part 301 based on the image of the camera 307 subjected to the image processing at the step S203.

At a step S207, the control device 1000 determines whether or not the size of the returned medicine 2 placed on the semi-transparent plate 305 of the temporarily placing part 301 is the size of the medicine to be treated based on the information on the size of the returned medicine 2 obtained at the step S206. In the case where the size of the returned medicine 2 is the size of the medicine to be treated, the process shifts to a step S208. In the case where the size of the returned medicine 2 is not the size of the medicine to be treated (in the case where the size of the returned medicine 2 is the size of the medicine not to be treated), the process shifts to the step S215.

At the step S208, the returned medicine 2 on the temporarily placing part 301 is conveyed to the label reading part 302 by the orthogonal type robot 700. Due to this conveying, the returned medicine 2 is set in the label reading part 302.

As shown in FIG. 48B, at a step S209, the control device 1000 adjusts the rotational speed of the roller 309 of the label reading part 302 which makes contact with the returned medicine 2 to rotate the returned medicine 2 based on the size (the outer diameter) of the returned medicine 2 obtained at the step S206.

At a step S210, the control device 1000 determines whether or not the label 3 of the returned medicine 2 can be accurately read by the camera 311 or the barcode reader 312. In the case where the expiration date or the barcode indicating the type of the returned medicine 2 which are written on the label 3 can be accurately read, the process shifts to a step S211. In the case where the expiration date or the barcode cannot be accurately read, for example, in the case where the expiration date or the barcode is partially effaced, the process shifts to the step S215.

At the step S211, the label 3 of the returned medicine 2 is accurately read by the camera 311 or the barcode reader 312 in the label reading part 302.

At a step S212, the control device 1000 obtains the information on the type and the expiration date of the returned medicine 2 based on the label 3 of the returned medicine 2 read at the step S211.

At a step S213, the control device 1000 determines whether or not the type and the expiration date of the returned medicine 2 set in the label reading part 302 are the type and the expiration date of the medicine to be treated based on the information on the type and the expiration date of the returned medicine 2 obtained at the step S212.

Namely, the control device 1000 determines whether or not the type of the returned medicine 2 is the type stored in the medicine master and determines whether or not the expiration date has not expired or a sufficient time remains by the expiration date. In the case where both of the type and the expiration date are the type and the expiration date of the medicine to be treated, the process shifts to a step S214. In the case where at least one of the type and the expiration date is not the type or the expiration date of the medicine to be treated, the process shifts to the step S215.

At the step S214, the returned medicine 2 in the label reading part 302 is conveyed to the storing part 500 by the scalar type robot 800 as the medicine to be treated. Namely, the returned medicine 2 whose shape, size, type and expiration date are the shape, the size, the type and the expiration date of the medicine to be treated is stored in the storing part 500.

At the step S215, the returned medicine 2 whose shape is determined to be the shape of the medicine not to be treated at the step S205, the returned medicine 2 whose size is determined to be the size of the medicine not to be treated at the step S207, the returned medicine 2 whose label 3 is determined that the label 3 cannot be read at the step S210 or the returned medicine 2 whose at least one of the type and the expiration date is the type or the expiration date of the medicine not to be treated at the step S213 is conveyed (stored) in the non-stored medicine arrangement part 400 as the non-stored medicine 2'.

Although the present invention is described with reference to the above embodiments, the present invention is not limited thereto.

Figure 50:
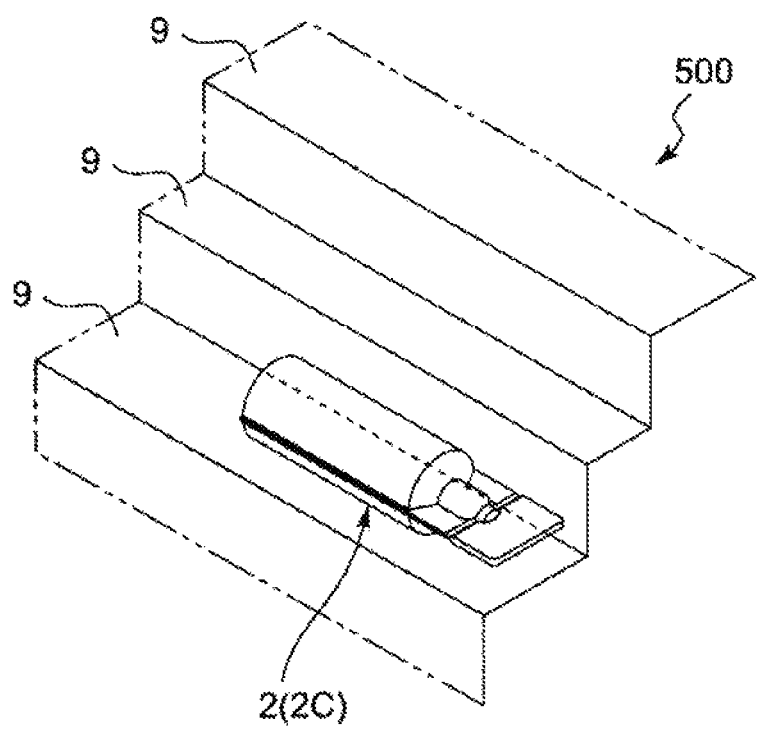
FIG. 50 is a schematic partial perspective view of an alternative of the storing part.

For example, the storing tray is not limited to these of the described embodiments. For example, it may be possible to arrange a member which can be deformed when the returned medicine 2 is arranged on the bottom portion of the tray main body 5a of the storing tray 5 so as to keep the direction and the posture of the arranged returned medicine 2. Namely, the storing tray 5 may be a member which can planarly store the returned medicine 2 so as to keep the direction and the posture of the returned medicine 2 in a different manner differing from these of the described embodiments. Further, the storing part 500 may include a plurality of step portions 9 each on which the returned medicine 2 can be arranged as shown in FIG. 50.

In the described embodiments, the orthogonal type robot 700 and the scalar type robot 800 hold the returned medicine 2 by using the suctioning nozzles 701, 801. However, these robots may releasably hold the returned medicine 2 by using not the suctioning but a mechanical manner.

Further, in the described embodiments, the returned medicine 2 whose expiration date has expired or whose time does not sufficiently remain by the expiration date is treated as the medicine not to be treated, that is the non-stored medicine 2', the present invention is not limited thereto. For example, the returned medicine 2 whose expiration date has expired may be treated as the medicine to be treated and stored in the storing tray 5 of the storing part 500. With this configuration, it is possible to collectively treat a plurality of returned medicines 2 whose expiration dates have expired at one time.

For example, the user gives an instruction for transferring the plurality of returned medicines 2, whose expiration dates have expired and which are stored in the storing part 500, to one of the returned goods trays 4 to the returned medicine supplying apparatus 1 through the control panel 1001. With this configuration, it is possible to collectively recover (dispose of) the plurality of returned medicines 2 whose expiration dates have expired and which are stored in the one of the returned goods trays 4 at one time.

Namely, in the case where the returned medicine 2 whose expiration date has expired is treated as the medicine not to be treated (the non-stored medicine), the returned medicine whose shape, size or type is the shape, the size or the type of the medicine not to be treated is contained in the returned goods tray 4' for the non-stored medicine in addition to the returned medicine 2 whose expiration date has expired. Although the returned medicine not to be treated cannot be treated by the returned medicine supplying apparatus 1, there is a possibility that this returned medicine can be used at another place if the expiration date of the returned medicine has not expired. Thus, in the case where the returned medicine 2 whose expiration date has expired is treated as the medicine not to be treated, it is impossible to collectively treat the non-stored medicines 2' in the returned goods tray 4' for the non-stored medicine at one time.

Thus, by treating the returned medicine 2 whose expiration date has expired and which cannot be used at the other place as the returned medicine to be treated, it is possible to collectively treat only the returned medicines whose expiration dates have expired at one time.

Regarding this matter, it may be possible to store the returned medicine 2 whose expiration date written on the label 3 cannot be identified by the label reading part 302, that is the returned medicine 2 whose number of the failures of the identification reaches the predetermined number of times or whose predetermined time passes due to the repeat of the identifying operation (the returned medicine 2 for which the process time-outs) into the storing tray 5 of the storing part 500. Then, it may be possible to re-try the identification of the expiration date for an expiration date unclear medicine whose expiration date cannot be identified.

For example, this rarely occurs, but there is a case where the label 3 is not shown in the photographed image of the camera 311 in a state that the label 3 can be identified when the illumination light from the lighting part 310 shown in FIG. 13 is reflected on the returned medicine 2 in the label reading part 302. In this case, when such a returned medicine 2 is once stored in the storing tray of the storing part 500 and then again returned to the label reading part 302, there is a possibility that the expiration date written on the label 3 can be identified.

The reason for this matter will be described below. When the returned medicine 2 is set to the label reading part 302 at the first time, that is when the returned medicine 2 is set to the label reading part 302 from the returned goods tray 4 through the temporarily placing part 301, the direction of the label 3 of the returned medicine 2 is arbitrary (in the temporarily placing part 301, since the shape and the size of the returned medicine 2 are identified as described above, the direction of the label 3 is not taken into account). Thus, the identification of the expiration date written on the label 3 is started from the state that the direction of the label 3 is arbitrary.

On the other hand, the returned medicine 2 stored in the storing tray 5 of the storing part 500 is in a state that the label 3 is directed toward the upper direction as described above. Thus, when the scalar type robot 800 transfers and places the returned medicine 2 stored in the storing tray 5 onto the label reading part 302, the returned medicine 2 is set to the label reading part 302 in a state that the label 3 is directed toward the upper side. Therefore, it is possible to start the identification of the expiration date written on the label 3 from the state that the label 3 is directed toward the upper direction.

There is a case where such a difference of the directions of the label 3 at the time of starting the identification affects whether or not the identification of the expiration date written on the label 3 completes before the number of the failures of the identification reaches the predetermined number of times or before the process time-outs. Thus, although the identification may fail when the returned medicine 2 is set to the label reading part 302 from the returned goods tray 4 through the temporarily placing part 301, that is when the identification operation is started from the state that the direction of the label 3 is arbitrary, there is a case where this identification is successfully performed when the returned medicine 2 is transferred and placed onto the label reading part 302 from the storing tray 5, that is when the identification operation is started from the state that the label 3 is directed toward arbitral directions. With taking account of this matter, it may be possible to store the returned medicine 2 whose expiration date written on the label 3 cannot be identified by the label reading part 302, that is the returned medicine 2 whose number of the failures of the identification reaches the predetermined number of times or whose predetermined time passes due to the repeat of the identifying operation (the returned medicine 2 for which the process time-outs) into the storing tray 5 of the storing part 500.

Further, in the described embodiments, in the case where the returned medicine 2 is the medicine to be treated, the returned medicine 2 is stored into the storing tray 5 of the storing part 500 through the returned goods tray 4, the temporarily placing part 301 of the identifying part 300 and the label reading part 302 in this order. Alternatively, the returned medicine 2 may be stored into the storing part 500 through the label reading part 302 without passing through the temporarily placing part 301.

Specifically, the temporarily placing part 301 is provided with assuming a case where the shape and the size of the returned medicine 2 returned through the returned goods tray 4 are the shape and the size of the medicine which cannot be treated by the returned medicine supplying apparatus 1.

However, in the case where most of the returned medicines 2 (which are directly stored into the apparatus of the present invention from a box delivered from a user, a medicine manufacturer or the like to which information and precautions are completely informed immediately after the box has been opened and which are returned to the apparatus of the present invention through the returned goods tray 4) are treated as the medicine to be treated by the returned medicine supplying apparatus 1, it is a significant waste of time to subject all of such returned medicines 2 to the identification of the shape and the size on the temporarily placing part 301.

For responding to this matter, the returned medicine 2 in the returned goods tray 4 is first transferred and placed to the label reading part 302 of the identifying part 300 (the returned medicine 2 is placed on the endless belt 308 of the label reading part 302) by the orthogonal type robot 700. Next, the returned medicine 2 on the endless belt 308 is photographed by the camera 311 before the endless belt 308 and the roller 309 are driven. Based on this photographed image, the direction of the returned medicine 2 on the endless belt 308 is identified. Then, it is determined whether or not this identified direction is directed so that the base end 2b of the returned medicine 2 is positioned on the side of the stopper 317. In the case where the direction is not directed as described above, the direction is changed by the orthogonal type robot 700.

In this regard, it is also possible to identify the direction of the returned medicine 2 based on the image photographed by the camera 304 arranged on the upper side of the returned goods tray 4 if the returned medicine 2 exists in the returned goods tray 4, that is if the returned goods tray 4 is placed on the table 203 of the elevating part 200. The direction of the returned medicine 2 in the returned goods tray 4 is identified based on the image of the camera 304 and then the orthogonal type robot 700 places the returned medicine 2 on the endless belt 308 of the label reading part 302 based on this identifying result so that the base end 2b of the returned medicine 2 is position on the side of the stopper 317.

The type and the expiration date of the returned medicine 2 directly transferred to the label reading part 302 from the returned goods tray 4 are identified by the camera 311 and the barcode reader 312.

Based on the identified type, the information on the shape and the size of the returned medicine 2 is obtained. Specifically, the control device 1000 includes a size information master for storing the type, the shape and the size of the returned medicine 2 in a state that the type, the shape and the size are associated with each other. By referring to the information stored in this size information master, the control device 1000 can obtain the shape and the size corresponding to the type of the returned medicine 2 identified by the label reading part 302. Then, based on the obtained shape and the obtained size, the storing area for the returned medicine 2 is defined in the storing part 500.

In the case where the information on the shape and the size corresponding to the type identified by the label reading part 302 does not exist in the size information master, the returned medicine 2 in the label reading part 302 is transferred to the temporarily placing part 301 in order to obtain the information on the shape and the size of the returned medicine 2. Then, the information on the shape and the size of the returned medicine 2 is obtained on the temporarily placing part 301 as described above. The obtained information on the shape and the size of the returned medicine 2 is stored in the size information master in a state that the information on the shape and the size of the returned medicine 2 is associated with the type of the returned medicine 2. Further, based on the shape and the size of the returned medicine 2, the storing area for the returned medicine 2 is defined in the storing part 500.

In this regard, it may be possible to update association information for the type, the shape and the size of the returned medicine 2 stored in the size information master or add new association information for a type, a shape and a size of a new returned medicine 2 through a network environment or the like. For example, based on information on a medicine supplied from a supplier, it may be possible to add association information for a type, a shape and a size of this new returned medicine 2 into the size information master through a PC (personal computer) connected to a network environment. With this configuration, it becomes unnecessary to transfer the returned medicine 2 from the label reading part 302 to the temporarily placing part 301 to obtain the information on the shape and the size of the returned medicine 2 on the temporarily placing part 301 or necessity of this operation becomes low.

Although the present invention is described by exemplifying the returned medicine supplying apparatus, the present invention is not limited to the medicine supplying apparatus for treating the returned medicine. Namely, the medicine supplied from the receiving part is not limited to the returned medicine.

What is claimed is:

1. A medicine sorting apparatus, comprising:
    an identifying part which identifies a direction, a posture and at least a size and a type of characteristics including a shape, a size, a type and an expiration date of a medicine;
    a storing part which stores and sorts the medicines so that each of the medicine is taken from the storing part, wherein a storing area is defined for each of the medicines in the storing part according to, at least in part, the size of each of the medicines identified by the identifying part, and wherein each of the medicines are arranged, at the time of storing the medicines in the storing part, in a state that the storing area is associated with identification information of each of the medicines; and
    a determination processing part which determines whether or not the medicine is a target to be treated based on the characteristics of the medicine identified by the identifying part; wherein the identifying part includes:
    a photographing part which photographs the medicine;
    a first medicine information obtaining part which obtains information on the shape and the size of the medicine based on an image photographed by the photographing part;
    a label reading part which reads a label of the medicine; and
    a second medicine information obtaining part which obtains information on the type and the expiration date of the medicine based on a reading result of the label reading part, and
    wherein the medicine sorting apparatus further comprises a medicine conveying part which conveys the medicine from the photographing part to the label reading part when the shape and the size of the medicine obtained by the first medicine information obtaining part are a shape and a size of a medicine to be treated.

2. The medicine sorting apparatus according to claim 1, wherein the medicine sorting apparatus is configured to store the medicine into a non-stored medicine arrangement part as a non-stored medicine when the determination processing part determines that the medicine is not the target to be treated.

3. The medicine sorting apparatus according to claim 1, further comprising,
    a medicine placing plate including a placing surface on which the medicine to be photographed by the photographing part is to be placed, the medicine placing plate through which light transmits; and
    a lighting part which emits light toward the medicine placing plate, the lighting part facing the photographing part through the medicine placing plate.

4. The medicine sorting apparatus according to claim 3, wherein the first medicine information obtaining part is configured to calculate an actual length of the medicine in a longitudinal direction thereof based on a longitudinal direction length and a width direction length of the medicine in the image photographed by the photographing part and a distance between the photographing part and the medicine placing plate.

5. A medicine sorting apparatus, comprising:
    an identifying part including:
    a photographing part which photographs each of medicines;

a binarization processing part which performs a binarization process on an image photographed by the photographing part to create a binarized image; and an identification processing part having a first identification processing function of identifying at least a direction of each of the medicines based on the binarized image; wherein the identification processing part further has a second identification processing function of identifying a posture and a shape and a size of each of the medicines based on the binarized image created from the image photographed by the photographing part, and a storing part which stores the medicines so that each of the medicines is taken from the storing part by arranging the medicines in the storing part in a state that a storing area defined for each of the medicines at the time of storing the medicines is associated with identification information of each of the medicines, wherein the medicine sorting apparatus treats each of the medicines identified by the first identification processing function as a storing target medicine;

wherein the storing part stores the medicines so that each of the medicines is taken from the storing part by arranging the medicines in the storing part in a state that the storing area defined for each of the medicines according to at least the size identified by the second identification processing function at the time of storing each of the medicines is associated with the identification information of each of the medicines.

6. The medicine sorting apparatus according to claim 5, wherein the identification processing part further includes an area determining part which determines an identification excluded area based on a size of a reflecting area in the binarized image, and wherein the identification processing part does not identify the medicines in an area determined as the identification excluded area by the area determining part.

7. The medicine sorting apparatus according to claim 5, wherein the identifying part further includes:

a transferring part which transfers one of the medicines in the identifying part; and a drive control part which drives the transferring part when the identification processing part determines that one of the medicines is not laid on its side, and to perform a control operation which pushes the transferring part toward said medicine to lay the one of the medicines on its side.

8. The medicine sorting apparatus according to claim 7, wherein the drive control part drives the transferring part toward a direction in which the identification processing part determines that other medicines do not exist to perform the control operation laying the one of the medicines on its side.

9. A medicine sorting apparatus, comprising:

an identifying part which identifies characteristics including, a shape and a type, or a size and a type, of a medicine;

a storing part which stores the medicine so that the medicine be taken from the storing part by arranging the medicine in the storing part in a state that a storing area defined for the medicine according to at least the size of the medicine identified by the identifying part at the time of storing the medicine is associated with identification information of the medicine; and a determination processing part which determines whether or not the medicine is a target to be treated based on at least the shape or the size of the characteristics of the medicine identified by the identifying part, and wherein the identifying part includes:

a photographing part which photographs the medicine;

a first medicine information obtaining part which obtains information on the shape and/or the size of the medicine based on an image photographed by the photographing part;

a label reading part which reads a label of the medicine; and a second medicine information obtaining part which obtains information on the type of the medicine based on a reading result of the label reading part, and wherein the medicine sorting apparatus further comprises a transferring part transferring the medicine from the photographing part to the label reading part when the shape and/or the size of the medicine obtained by the first medicine information obtaining part are to be treated.

* * * * *